US008053007B2

(12) United States Patent
Innocenzi

(10) Patent No.: US 8,053,007 B2
(45) Date of Patent: Nov. 8, 2011

(54) COMPOSITIONS AND METHODS FOR FORTIFYING A BASE FOOD TO CONTAIN THE COMPLETE NUTRITIONAL VALUE OF A STANDARD EQUIVALENT UNIT OF THE NUTRITIONAL VALUE OF ONE SERVING OF FRUITS AND VEGETABLES ("SFV") FOR HUMAN CONSUMPTION

(75) Inventor: Mark Innocenzi, Farmers Branch, TX (US)

(73) Assignee: Mark Innocenzi, Franklin Lakes, NJ (US)

( * ) Notice: Subject to any disclaimer, the term of this patent is extended or adjusted under 35 U.S.C. 154(b) by 0 days.

(21) Appl. No.: 12/759,511

(22) Filed: Apr. 13, 2010

(65) Prior Publication Data

US 2011/0250318 A1 Oct. 13, 2011

(51) Int. Cl.
A23L 1/30 (2006.01)
(52) U.S. Cl. ............................................. 426/73; 426/72
(58) Field of Classification Search ............... 426/73, 426/72, 231, 311, 240, 590; 424/1, 439, 424/442
See application file for complete search history.

(56) References Cited

U.S. PATENT DOCUMENTS

| | | | |
|---|---|---|---|
| 4,588,717 A | 5/1986 | Mitchell | |
| 5,976,548 A | 11/1999 | Hsia et al. | |
| 6,039,978 A | 3/2000 | Bangs et al. | |
| 6,241,996 B1 | 6/2001 | Hahn | |
| 6,468,568 B1 * | 10/2002 | Leusner et al. | 426/72 |
| 6,500,463 B1 * | 12/2002 | van Lengerich | 424/499 |
| 6,887,493 B2 * | 5/2005 | Shefer et al. | 424/490 |
| 6,998,143 B1 * | 2/2006 | Sher et al. | 426/74 |
| 7,763,292 B2 | 7/2010 | Gutierrez-Uribe et al. | |
| 2003/0077378 A1 * | 4/2003 | Lou et al. | 426/651 |
| 2005/0010416 A1 | 1/2005 | Anderson et al. | |
| 2005/0191386 A1 | 9/2005 | Adams | |
| 2006/0024394 A1 | 2/2006 | Gutierrez-Uribe et al. | |
| 2006/0229504 A1 | 10/2006 | Johnson, Jr. | |
| 2008/0177572 A1 | 7/2008 | Fuhrman et al. | |
| 2008/0248172 A1 * | 10/2008 | Balentine et al. | 426/231 |
| 2009/0157220 A1 | 6/2009 | Walker et al. | |
| 2010/0239712 A1 | 9/2010 | Brooks et al. | |
| 2010/0262434 A1 | 10/2010 | Shaya | |

OTHER PUBLICATIONS

Amazing Grass: http://www.amazinggrass.com/index.html; published May 27, 2007.*
Begin: Food Fortification in West Africa Assessment of Opportunities and Strategies; The Micronutrient Initiative Oct. 2002.*
Krebs-Smith et al., "The Dietary Guidelines: Surveillance Issues and Research Needs"—Choose a Variety of Fruits and Vegetables Daily: Understanding the Complexities, The Journal of Nuitrition, 2001.
Haytowitz et al., Key Foods: Setting Priorities for Nutrient Analysis; Journal of Food Composition and Analysis 9, Article No. 0041, pp. 331-364, 1996.
Ganry, "Current Status of Fruits and Vegetables Production and Consumption in Francophone African Countries—Potential Impact on Health", Proceedings IInd IS on Human Effects of F&V, ISHS, 2009.
Drewnowski, "Concept of a nutritious food: toward a nutrient density score", American Journal of Clinical Nutrition, 82:721-32, 2005.
Schiff: Fruits and Vegetables Harvest: published Feb. 25, 2007; Blend—http://web.archive.org/web/20070225100412/ http://www.schiffvitamins.com/product_detail.asp?id=186.

* cited by examiner

*Primary Examiner* — Humera Sheikh
*Assistant Examiner* — Patricia George
(74) *Attorney, Agent, or Firm* — Beverly W. Lubit; Greenberg Traurig LLP

(57) ABSTRACT

The described invention provides a method to determine a standard equivalent unit of nutrition in one serving of a weighted composition comprising a basket of fruits and vegetables representing at least 85% of all fruits and vegetables consumed in a defined geographical area; a method to fortify a base food so that the base food contains a standard equivalent unit of nutrition present in at least one serving comprising (i) at least one fruit; (ii) at least one vegetable, or (iii) at least one fruit and at least one vegetable; and a nutritional supplement or food additive comprising a set of nutritive components wherein the set of nutritive components provides at least one standard equivalent unit of nutrition present in one serving of a composition comprising at least one fruit and at least one vegetable.

17 Claims, No Drawings

COMPOSITIONS AND METHODS FOR FORTIFYING A BASE FOOD TO CONTAIN THE COMPLETE NUTRITIONAL VALUE OF A STANDARD EQUIVALENT UNIT OF THE NUTRITIONAL VALUE OF ONE SERVING OF FRUITS AND VEGETABLES ("SFV") FOR HUMAN CONSUMPTION

FIELD OF THE INVENTION

The described invention relates to human nutrition. More particularly, it relates to nutritional fortification compositions and methods for fortifying food with the complete nutritional value of a standard equivalent unit of fruits and vegetables for human consumption.

BACKGROUND

It generally is recognized that the American diet is unbalanced in that it does not contain adequate amounts of necessary nutrients required to help maintain or improve health. Often, processed foods containing high calories, saturated fats, sodium and refined sugar are consumed in excess, while beneficial foods, such as fruits and vegetables, which are high in potassium, fiber, certain fats, vitamins, minerals, and anti-oxidants, are under-consumed. The United States Department of Agriculture estimates that less than 30% of all children and adults consume the recommended 5 to 7 servings of fruits and vegetables per day. Consequently, obesity and other health problems related to the diet are common.

Efforts to improve the American diet and eating habits towards healthier foods generally have failed. Societal drivers such as working couple families, lack of time for proper meal preparation, and lack of knowledge, contribute to resistance towards healthier eating habits. Additionally, consumers often are required to sacrifice taste, to switch from a familiar brand product, or to completely change their behavior to improve their nutritional intake. Further, the ubiquity of marketing for Quick Serve Restaurants and "junk" foods influences the general population's psyche and behavior.

A novel way to improve the American diet is through fortification of everyday foods and beverages, including quick serve restaurant preparations, with the complete nutrition of fruits and vegetables. This can be especially effective if the consumer is not required to sacrifice taste, change brand, or substantially change behavior in any way. The described invention provides methods and compositions for fortification of base foods with the complete nutrition of fruits and vegetables of common foods and beverages, including those from Quick Serve Restaurant preparations, to improve the American diet The described invention further provides methods for determining the complete nutritional value of a standard equivalent unit of fruits and vegetables for human consumption, and fortification products which contain all the individual nutritional components of nutrition equal to multiple standard equivalent units of fruits and vegetables.

I. Nutrition Basics why Balanced Nutrition is Important

Foods are grouped together when they share similar nutritional properties. The food groups in an American diet generally include grains (including, but not limited to, whole wheat bread and rolls, whole wheat pasta, pita bread, cereals, oatmeal, brown rice); fruits (including, but not limited to, apples, apricots, bananas, dates, grapes, oranges, grapefruit, grapefruit juice, mangoes, melons, peaches, pineapples, raisins, strawberries, tangerines); vegetables (including, but not limited to, broccoli, carrots, collards, green beans, green peas, kale, lima beans, potatoes, spinach, squash, sweet potatoes, tomatoes); fat-free or low-fat milk and milk products (including, but not limited to, fat-free (skim) or low-fat (1%) milk or buttermilk, fat-free, low-fat or reduced-fat cheese, fat-free or low-fat regular or frozen yogurt); lean meats, poultry and fish (including, but not limited to, beef, poultry, pork, game meats, fish, shellfish); nuts, seeds, and legumes (including, but not limited to, almonds, hazelnuts, mixed nuts, peanuts, walnuts, sunflower seeds, peanut butter, kidney beans, lentils, split peas).

A healthy eating plan provides information regarding how much a person should consume from each food group to stay within the person's calorie needs and promote good health.

Health professionals recognize the benefits associated with a healthful eating plan based on the Dietary Guidelines for Americans, which has been published every 5 years since 1980 by the United States Department of Health and Human Services (HHS) and the Department of Agriculture (USDA). The Guidelines provide authoritative advice for people two years of age and older about how good dietary habits can promote health and reduce risk for major chronic diseases. They serve as the basis for Federal food and nutrition education programs.

Two examples of eating plans are identified by the Dietary Guidelines for Americans 2005: (1) the USDA Food Guide, offered through MyPyramid.gov and (2) DASH Eating plan (Dietary Approaches to Stop Hypertension). MyPyramid.gov was developed to help individuals create meal plans specific to their needs and takes into account a person's sex, age, height, weight, and physical activity level. The DASH eating plan was developed by researchers funded by the National Institutes of Health (NIH) to learn if certain nutrients in foods would help reduce blood pressure. Studies reported that this eating plan, particularly when combined with eating less sodium, lowered blood pressure. Although the plan was developed to help lower blood pressure, it may offer a healthy approach to eating that can benefit most adults. Both the USDA Food Guide and DASH Eating Plan are healthy eating plans that (1) focus on fruits, vegetables, whole grains, and low-fat or fat-free milk and milk products; (2) include lean meats, poultry, fish, beans, eggs, and nuts; (3) are low in saturated fats, trans fats, cholesterol, salt (sodium), and added sugars; and (4) can provide information regarding a person's daily calorie needs.

Food Components

Food is any substance, usually composed of carbohydrates, fats, proteins, vitamins and minerals, and water, that can be eaten or drunk by an animal, including humans, for nutrition or pleasure.

Water

Water ($H_2O$) is a ubiquitous chemical substance that is essential for terrestrial life. Water assists in regulating body temperature, lubrication of joints, protection of organs, and in eliminating body wastes. Water can dissolve many different substances, imparting varying tastes and odors; pure water is tasteless and odorless. Healthy individuals meet their fluid needs by drinking when thirsty and drinking fluids with meals. Fluids also may be obtained through foods such as broth soups.

Dietary Fat

Fats are essential constituents of food for many animals, with a calorific value per weight twice that of carbohydrates. In many animals, excess carbohydrates and proteins are converted into fats for storage. Mammals store fats in specialized connective tissues (adipose tissues), which not only act as energy reserves but also insulate the body and cushion its organs.

Fat, in the broadest sense, is a mixture of lipids (meaning biological molecules soluble in apolar solvents, but only slightly soluble in water), mainly triglycerides (meaning lipids containing three fatty acid molecules linked to a molecule of glycerol). More specifically, the term "fat" refers to a lipid mixture that is solid at room temperature; lipid mixtures that are liquid at room temperature are referred to as "oils." Fats are insoluble in water.

A "fatty acid" is chemically denoted as R—COOH, where R is a chain of carbon atoms. The common fatty acids of biologic origin are linear carbon chains with an even number of carbon atoms, e.g., n-tetradecanoate, or myristate, with 14 carbon atoms; n-hexadecanoate, or palmitate, with 16 carbon atoms; and n-octadecanoate, or stearate, with 18 carbon atoms. Fatty acids have four major physiologic roles. (1) They are building blocks of phospholipids and glycolipids, which are important components of biological membranes; (2) many proteins are modified by the covalent attachment of fatty acids, which targets them to membrane locations; (3) fatty acids are fuel molecules, which are stored as triacylglycerols (also called neutral fats or triglycerides), which are uncharged esters of glycerol; and (4) fatty acid derivatives serve as hormones and intracellular messengers. Essential fatty acids, or EFAs, are fatty acids that cannot be constructed within an organism from other components by any known chemical pathways, and therefore must be obtained from the diet.

A saturated fat is "saturated" with hydrogen atoms, i.e., every carbon atom in the carbon chain is attached to two hydrogen atoms except at the end of the chain, which bears three hydrogen atoms. There are several kinds of naturally occurring saturated fatty acids, which differ by the number of carbon atoms, ranging from 3 carbons (propionic acid) to 36 carbons (hexatricontanoic acid). Examples of foods containing a high proportion of saturated fat include dairy products (especially cream and cheese), animal fats such as suet, tallow, lard and fatty meat, coconut oil, cottonseed oil, palm kernel oil, and chocolate. Diets high in saturated fat have been correlated with an increased incidence of atherosclerosis and coronary heart disease.

An "unsaturated fat" is a fat or fatty acid in which there are one or more double bonds in the fatty acid chain. Where double bonds are formed, hydrogen atoms are eliminated. Since the carbon atoms in an unsaturated fat are double-bonded to each other, there are fewer bonds connected to hydrogen, resulting in fewer hydrogen atoms A fat molecule is "monounsaturated" if it contains one double bond, and "polyunsaturated" if it contains more than one double bond.

The terms "cis" and "trans" refer to the arrangement of the substituents of carbon atoms across a double bond. In the cis arrangement, the substituents are on the same side of the double bond The rigidity of the double bond freezes its conformation and, in the case of the cis isomer, causes the chain to bend and restricts the conformational freedom of the fatty acid. The more double bonds the chain has in the cis configuration, the less flexibility it has. In the trans arrangement, the substituents are bound to opposite sides of the double bond. As a result, they do not cause the chain to bend much, and their shape is similar to straight saturated fatty acids. In most naturally-occurring unsaturated fatty acids, each double bond has three n carbon atoms after it, for some n, and all are cis bonds.

A trans fatty acid or "trans fat" is an unsaturated fatty acid molecule that contains a trans double bond between carbon atoms. Trans fats may be monounsaturated or polyunsaturated, but are never saturated. Most fatty acids in the trans configuration (trans fats) are not found in nature and are the result of human processing (e.g., hydrogenation). The process of hydrogenation adds hydrogen atoms to cis-unsaturated fats, eliminating a double bond and resulting in a more saturated fat that has a higher melting point, which makes it attractive for baking and extends shelf-life. However, the process frequently has a side-effect of turning some cis-unsaturated fats into trans-unsaturated fats. Trans fats from partially hydrogenated oils are more harmful than naturally occurring oils.

Cholesterol is a waxy steroid that modulates the fluidity of eukaryotic membranes and is the precursor of steroid hormones, such as progesterone, testosterone, estradiol and cortisol. It is a component of all eukaryotic plasma membranes, and is essential for the growth and viability of cells in higher organisms. However, high serum levels of cholesterol cause disease and death by contributing to the formation of atherosclerotic plaques in arteries throughout the body. Low density lipoprotein (LDL), the major carrier of cholesterol in blood, transports cholesterol to peripheral tissues and regulates de novo cholesterol synthesis at these sites. High-density lipoprotein (HDL), picks up cholesterol released into the plasma from dying cells and from membranes undergoing turnover. It is believed that the consumption of trans fats increases the risk of coronary heart disease by raising levels of "bad" low-density lipoprotein (LDL) cholesterol and lowering levels of "good" high-density lipoprotein (HDL) cholesterol.

Major dietary sources of cholesterol include cheese, egg yolks, beef, pork, poultry and shrimp. Total fat intake, especially saturated fat and trans fat, plays a larger role in the level of cholesterol in blood than does the intake of cholesterol itself.

It generally is recommended that most of the intake of dietary fat should come from unsaturated sources (i.e., polyunsaturated fats and monosaturated fats). For example, nuts, vegetable oils, and fish are sources of unsaturated fats. However, some studies have reported that polyunsaturated oils, such as soya, canola, sunflower and corn, degrade easily to toxic compounds and trans fat when heated.

The Dietary Guidelines for Americans 2005 recommend a total fat intake within a certain limit. This limit is defined as a percentage of a person's total calorie needs. It recommends that children ages 2 to 3 have a total fat limit 30% to 35% of total calories; children and adolescents ages 4 to 18 have a total fat limit of 25% to 35% of total calories; and adults ages 19 and older have a total fat limit of 20% to 35% of total calories. Trans fats, saturated fats and cholesterol are less healthy than polyunsaturated and monounsaturated fats.

Few Americans consume less than 20% of calories from fat. Fat intake that exceeds 35% of calories are associated with increased saturated fat intake and increased calorie intake. To decrease the risk of elevated LDL cholesterol in the blood, most Americans need to decrease the intake of saturated fat and trans fat, and many need to decrease their dietary intake of cholesterol. It especially is important for men to meet this recommendation, since men tend to have higher intake of dietary cholesterol. Population-based studies of American diets show that intake of saturated fat is more excessive than intake of trans fats and cholesterol. Therefore, it is most important for Americans to decrease their intake of saturated fat. However, intake of all three should be decreased to meet recommendations.

Studies have reported that the estimated average daily intake of trans fats in the United States is about 2.6% of total energy intake. Processed foods and oils provide approximately 80% of trans fats in the diet, compared to 20% that occur naturally in food from animal sources. Trans fat content of certain processed foods has changed and is likely to continue to change as the food industry reformulates products. The food industry has an important role in decreasing trans fatty acid content of the food supply since trans fatty acids produced in the partial hydrogenation of vegetable oils account for more than 80% of total intake. Limited consumption of foods made with processed sources of trans fats provides the most effective means of reducing intake of trans fats.

Carbohydrates

A carbohydrate is an organic compound with general formula $C_m(H_2O)_n$, and related compounds with the same basic structure but modified functional groups. In food science, and in many informal contexts, the term "carbohydrate" often means any food that is particularly rich in starch (such as cereals, bread and pasta) or sugar (such as candy, jams, and desserts).

For dietary purposes, carbohydrates can be classified as simple (monosaccharides and disaccharides) or complex (oligosaccharides and polysaccharides). The term "complex carbohydrates" also may be used to denote fruit, vegetables, and whole grains. Carbohydrates are part of a healthy diet. Dietary guidelines generally recommend that complex carbohydrates, nutrient-rich simple carbohydrate sources (such as fruit), and dairy products make up the bulk of carbohydrate consumption. The Acceptable Macronutrient Distribution Range (AMDR) for carbohydrates is 45% to 65% of total calories. Carbohydrates supply energy to the body in the form of glucose, which is the only energy source for red blood cells and is the preferred energy source for the brain, central nervous system, placenta, and fetus. Sugars can be present naturally in foods (for example, the fructose in fruit or the lactose in milk) or added to the food. Added sugars, sometimes referred to as "caloric sweeteners," are sugars and syrups added to foods at the table, during processing, or during preparation (e.g, high fructose corn syrup in sweetened beverages and baked products). Although the body's response to sugars does not depend on whether they naturally are present in a food or added to the food, added sugars supply calories but few or no nutrients. Consequently, it is important to choose carbohydrates wisely. Foods in the basic food groups that provide carbohydrates (for example, fruits, vegetables, grains and milk) are important sources of many nutrients. Consumption of added sugars provides calories while providing little, if any, of the essential nutrients. The greater the consumption of foods containing large amounts of added sugars, the more difficult it is to consume enough nutrients without gaining weight.

Dietary Fiber

Dietary fiber is composed of nondigestable carbohydrates. Diets rich in dietary fiber have a number of beneficial effects, including a decreased risk of coronary heart disease and improvement in laxation.

The recommended dietary fiber intake is 14 g per 1000 calories consumed. Some Americans find it challenging to achieve this level of intake. Increasing the proportion of fruit that is eaten in the form of whole fruit rather than juice is desirable to increase fiber intake as it generally is recommended that the majority of servings from the fruit group should come from whole fruit rather than juice. However, inclusion of some juice, such as, for example, orange juice, can help meet recommended levels of potassium intake.

Legumes, such as, for example, dry beans and peas, are especially rich in fiber and it is recommended they be consumed several times per week. Legumes are considered part of both the vegetable food group and the meat and beans food group as they contain nutrients found in each of these food groups.

It is important to consume at least half the recommended grain servings as whole grains for all ages, at each calorie level, to meet the fiber recommendation. Consuming at least three ounce-equivalents of whole grains per day may reduce the risk of coronary heart disease, may help with weight maintenance, and may lower risk for other chronic diseases.

Dietary fiber also is important for laxation. Since constipation may affect up to 20% of people over 65 years of age, older adults should choose to consume foods rich in dietary fiber.

Carbohydrate intake by children need special considerations with regard to obtaining sufficient amounts of fiber, to avoiding excessive amounts of calories from added sugars, and to preventing dental caries. Several cross-sectional surveys on U.S. children and adolescents have reported inadequate dietary fiber intake, which could be improved by increasing consumption of whole fruits, vegetables, and whole-grain products. Sugars may improve the palatability of foods and beverages that otherwise might not be consumed, however, beverages with caloric sweeteners, sugars and sweets, and other sweetened foods that provide little or no nutrients are associated negatively with diet quality and can contribute to excessive energy intake, affirming the importance of reducing added sugars intake substantially from current levels.

Sugars

The simplest carbohydrates are sugars (monosaccharides, such as, for example, glucose and fructose, and disaccharides, for example, sucrose), which are soluble compounds. Monosaccharides are the simplest carbohydrates in that they cannot be hydrolyzed to smaller carbohydrates.

Under current regulations, food labels contain a Nutrition Facts Panel, which provides the amount of total sugars in the product, but does not list added sugars separately. It is recommended that individuals examine the ingredient list to ascertain whether a food contains added sugars. Ingredients are listed in order of performance, by weight (i.e., the ingredient with the greatest contribution to the product weight is listed first and the ingredient contributing the least amount is listed last). Added sugars that may appear on food labels include, but are not limited to, brown sugar, corn sweetener, corn syrup, dextrose, fructose, fruit juice concentrates, glucose, high-fructose corn syrup, honey, invert sugar, lactose, maltose, malt syrup, molasses, raw sugar, sucrose, sugar and syrup.

Individuals who consume food or beverages high in added sugars tend to consume more calories than those who consume food or beverages low in added sugars; they also tend to consume lower amounts of micronutrients. Some studies have reported a positive association between the consumption of calorically sweetened beverages and weight gain. Accordingly, decreased intake of such foods, especially beverages with caloric sweeteners, is recommended to reduce calorie intake, to help achieve a recommended nutrient intake, and to achieve weight control.

Sugars and starches contribute to dental caries by providing a substrate for bacterial fermentation in the mouth. Thus, the frequency and duration of consumption of starches and sugars can be important factors for dental hygiene. To help reduce the risk of dental cares, fluoridated water and/or fluoride-containing dental hygiene products are recommended. Most prepackaged bottled water is not fluoridated. With the increase in consumption of bottled water, there is concern that Americans may not be getting enough fluoride for maintenance of oral health.

Protein

Proteins are large complex molecules or polypeptides composed of amino acids. Proteins are essential parts of organisms and participate in virtually every process within cells. Most microorganisms and plants can biosynthesize all standard 20 amino acids, the building blocks of proteins, An essential amino acid is an amino acid required by an organism but that cannot be synthesized de novo from other compounds, and therefore must be supplied in the diet, while the others are termed nonessential. These designations refer to the needs of an organism under a particular set of conditions. Using the basic set of 20 amino acids, the essential amino acids for humans are histidine, isoleucine, leucine, lysine, methionine, phenylalanine, threonine, tryptophan, and valine, and the nonessential amino acids are alanine, arginine, asparagine, aspartate, cysteine, glutamate, glutamine, glycine, proline, serine and tryosine.

In animals, amino acids are obtained by consumption of foods containing protein. Ingested proteins are broken down through digestion, which typically involves denaturation of the protein through exposure to acid and hydrolysis by proteases. Some ingested amino acids are used for protein biosynthesis, while others are converted to glucose through gluconeogenesis, or fed into the citric acid cycle, which completes the metabolic breakdown of glucose molecules to carbon dioxide. Proteins are found in, for example, meats, poultry, fish, legumes (dry beans and peas), tofu, eggs, nuts and seeds, milk and milk products, and grains. It generally is recommended that 10% to 35% of the daily caloric intake come from protein. Table 1 shows the recommended dietary allowances (RDA) for different age groups.

TABLE 1

Recommended Dietary Allowance for Protein
Recommended Dietary Allowance for Protein

|  | Grams of Protein Needed Each Day |
| --- | --- |
| Children ages 1-3 | 13 |
| Children ages 4-8 | 19 |
| Children ages 9-13 | 34 |
| Girls ages 14-18 | 46 |
| Boys ages 14-18 | 52 |
| Women ages 19-70+ | 46 |
| Men ages 19-70+ | 56 |

Tryptophan

For many organisms, the amino acid tryptophan (Trp, W) is an essential amino acid. Tryptophan functions as a biochemical precursor for several compounds including serotonin (a neurotransmitter), niacin and auxin (a phytohormone). Tryptophan is a routine constituent of most protein-based foods or dietary proteins. It particularly is plentiful in foods such as, for example, chocolate, oats, durians, mangoes, dried dates, milk, yogurt, cottage cheese, red meat, eggs, fish, poultry, sesame, chickpeas, sunflower seeds, pumpkin seeds, spirulina, and peanuts.

Threonine

Threonine (Thr, T) is an essential amino acid for humans. It promotes normal growth by helping to maintain the proper protein balance in the body. It also supports the cardiovascular, liver, immune and central nervous systems. Threonine is plentiful in foods such as, for example, cottage cheese, poultry, fish, meat, lentils and sesame seeds.

Isoleucine

Isoleucine (Ile, I) is an essential amino acid for humans. Isoleucine promotes muscle recovery after physical exercise and functions in, for example, the formation of hemoglobin, blood sugar regulation, and blood clot formation.

Leucine

Leucine (Leu, L) is an essential amino acid for humans. Leucine, when provided as a dietary supplement to aged rats, has been reported to slow the degradation of muscle tissue by increasing the synthesis of muscle proteins. Leucine is utilized in the liver, adipose tissue, and muscle tissue. In adipose and muscle tissue, leucine is used in the formation of sterols, and the combined usage of leucine in these two tissues is seven-fold greater than its use in the liver. Leucine toxicity may cause delirium, and neurologic compromise.

Lysine

Lysine (Lys, K) is an essential amino acid for humans; it is the limiting amino acid (meaning the essential amino acid found in the smallest quantity in a particular foodstuff) in all cereal grains, but is plentiful in all legumes. Foods that contain significant amounts of lysine include, but are not limited to, red meat, eggs, soybean, lentil, spinach, buckwheat, and other foods rich in protein.

Methionine

Methionine (Met, M) is an essential amino acid for humans. Methionine is an intermediate in the biosynthesis of cysteine, carnitine, taurine, lecithin, phosphatidylcholine, and other phospholipids, and is used in a variety of biochemical pathways. Improper conversion of methionine can lead to atherosclerosis. High levels of methionine can be found in sesame seeds, Brazil nuts, fish, meats, and some other plant seeds. Most fruits and vegetables contain very little methionine.

Cysteine

Cysteine (Cys, C) is a nonessential amino acid. The thiol group of cysteine, because of its high reactivity, has numerous biological functions. If a sufficient quantity of methionine is available, cysteine usually can be synthesized by the human body under normal physiological conditions. Cysteine is found in most high-protein foods including, but not limited to, pork, chicken, turkey, duck, eggs, milk, onions, broccoli, and oats.

Phenylalanine

Phenylalanine (Phe, F) is an essential amino acid for humans. L-phenylalanine is biologically converted into L-tyrosine, which in turn is converted to L-3,4-dihydrooxyphenylalanine (L-DOPA), which is further converted into catecholamines, such as dopamine, norepinephrine and epinephrine. Phenylalanine is found naturally in the breast milk of mammals.

Tyrosine

Tyrosine (Tyr, Y) is a nonessential amino acid that can be synthesized in the body from the essential amino acid phenylalanine and may be found in many proteins that are part of signal transduction processes. It functions as a receiver of phosphate groups that are transferred to a target protein by way of protein kinases. Phosphorylation of the hydroxyl group of tyrosine changes the activity of the target protein. Tyrosine is a precursor to neurotransmitters and increases plasma neurotransmitter levels (particularly dopamine and norepinephrine). Tyrosine is found in many high protein food products, such as, but not limited to, soy products, chicken, turkey, fish, peanuts, almonds, avocados, bananas, milk, cheese, and yogurt.

Valine

Valine (Val, V) is an essential amino acid for humans. Valine has a stimulating effect and is needed for muscle metabolism, repair and growth of tissue, and maintaining the nitrogen balance in the body. Dietary sources include, but are not limited to, cottage cheese, fish, poultry, peanuts, sesame seeds, and lentils.

Arginine

Arginine (Arg, R) is a conditionally nonessential amino acid for humans, meaning that most of the time it can be manufactured by the human body, and does not need to be obtained directly through the diet. Because the biosynthetic pathway does not produce sufficient arginine, some arginine must be consumed through diet. Arginine has an important role in cell division, in the healing of wounds, in removing ammonia from the body, in immune function, and in the release of hormones. Dietary sources of arginine include, but are not limited to, dairy products, beef, pork, poultry, peanuts, nuts, seeds, oatmeal, wheat germ and flour, and chick peas.

Histidine

Histidine (His, H), which is considered an essential amino acid in human infants, is a precursor for histamine and carnosine biosynthesis. It plays a role in the growth and repair of tissue, in the maintenance of myelin sheaths, and in the production of red and white blood cells. Dietary sources of histidine include, but are not limited to, dairy, meat, poultry, fish, rice, wheat and rye.

Alanine

Alanine (Ala, A) is a nonessential amino acid. It has an important role in the glucose/alanine cycle between tissues and liver, which enables pyruvate and glutamate to be removed from muscle and to find their way to the liver. Glucose is regenerated from pyruvate and then returned to muscle. Dietary sources of alanine include, but are not limited to, meat, seafood, dairy products, eggs, fish, beans, nuts, soy, seeds, legumes and whole grains.

Aspartic Acid

Aspartic acid (Asp, D) is a nonessential amino acid that plays a role in the biosynthesis of inositol, the precursor to the purine bases. The carboxylate anion of aspartic acid, aspartate, is a metabolite in the urea cycle and participates in gluconeogenesis. Dietary sources of aspartic acid include, but are not limited to, meat, sprouting seeds, oat flakes, avocado, asparagus, Glutamic Acid Glutamic acid (Glu, E) is a nonessential amino acid. The carboxylate anions and salts of glutamic acid are known as "glutamates." Glutamate is a key molecule in cellular metabolism. Further, glutamate is the most abundant excitatory neurotransmitter in the vertebrate nervous system. Due to its role in synaptic plasticity, glutamate is involved in cognitive functions such as learning and memory in the brain. Dietary sources of glutamic acid include, but are not limited to, meats, poultry, fish, eggs, and diary products.

Glycine

Glycine (Gly, G) is a nonessential amino acid. Glycine plays a role as a constituent of purines and as an inhibitory neurotransmitter in the central nervous system. Dietary sources of glycine include high-protein foods such as, but not limited to, fish, meat, beans, and dairy products.

Proline

Proline (Pro, P) is an essential amino acid for humans. Proline is biosynthetically derived from L-glutamate. Proline improves skin texture and aids collagen formation. Dietary sources of proline include, but are not limited to, meats.

Serine

Serine (Ser, S) is a nonessential amino acid. Serine plays a role in the biosynthesis of purines and pyrimidines, and is the precursor to several amino acids (including glycine and cysteine), sphingolipids, and folate. Serine also plays a role in the catalytic function of many enzymes including, but not limited to, chymotrypsin and trypsin. Dietary sources of serine include, but are not limited to, meats, dairy products, soy products, and peanuts.

Vitamins and Minerals

Vitamins

The term "vitamin" as used herein, refers to any of various organic substances essential in minute quantities to the nutrition of most animals act especially as coenzymes and precursors of coenzymes in the regulation of metabolic processes. Vitamins have diverse biochemical functions, including function as hormones (for example, vitamin D), antioxidants (for example, vitamin C and vitamin E), and mediators of cell signaling, regulation of cell growth, tissue growth and differentiation (for example, vitamin A). The largest number of vitamins, the B complex vitamins, which is the largest in number, function as precursors for enzyme cofactor biomolecules (co-enzymes) that help act as catalysts and substrates in metabolism.

Vitamin A

The term Vitamin A refers to a group of compounds that play an important role in vision, bone growth, reproduction, cell division, and cell differentiation. In general, there are two categories of vitamin A, depending on whether the food source is an animal or plant.

Vitamin A found in foods that come from animals is referred to as "pre-formed vitamin A." It is absorbed in the form of retinol, one of the most active forms of vitamin A. Sources include, but are not limited to, liver and whole milk Retinol can be further converted to retinal and retinoic acid.

Vitamin A that is found in colorful fruits and vegetables is referred to as "provitamin A carotenoid," which can be converted to retinol. In the U.S., approximately 26% of vitamin A consumed by men and 34% of vitamin A consumed by women is in the form of provitamin A carotenoids. Common provitamin A carotenoids found in foods that come from plants are beta-carotene, alpha-carotene and beta-cryptoxanthin. Among these, beta-carotene is most efficiently converted to retinol. Of the 563 identified carotenoids, fewer than 10% can be made into vitamin A in the body. Lycopene, lutein and zeaxanthin are carotenoids that do not have vitamin A activity but that have other health promoting properties. The Institutes of Medicine encourages consumption of all carotenoid-rich fruits and vegetables for their health-promoting benefits.

Retinol is found in foods derived from animals such as, but not limited to, whole eggs, milk, and liver. Most fat-free milk and dried nonfat milk solids sold in the U.S. are fortified with vitamin A to replace the amount lost when the fat is removed. Provitamin A carotenoids are abundant in darkly colored fruits and vegetables. The 2000 National Health and Nutrition Examination Survey (NHANES) indicated that major dietary contributors of retinol are milk, margarine, eggs, beef liver and fortified breakfast cereals, whereas major contributors of provitamin A carotenoids are carrots, cantaloupes, sweet potatoes, and spinach.

Vitamin A in foods derived from animals is well absorbed and used efficiently by the body. Vitamin A in foods derived from plants is not as well absorbed as are animal sources of vitamin A.

Dietary animal sources of vitamin A include, but are not limited to, liver (beef), liver (chicken), milk and cheese. Dietary plant sources of vitamin A (from beta-carotene) include, but are not limited to, carrot juice, carrots, spinach, kale, cantaloupe, apricots, papaya, mango, peas, peaches and tomato juice.

Recommendations for vitamin A are provided in the DRIs developed by the Institute of Medicine (IOM). Table 2 shows the RDAs for vitamin A.

TABLE 2

Recommended Dietary Allowances for Vitamin A
Recommended Dietary Allowances for Vitamin A

| Age (years) | Children (μg RAE) | Males (μg RAE) | Females (μg RAE) | Pregnancy (μg RAE) | Lactation (μg RAE) |
|---|---|---|---|---|---|
| 1-3 | 300 (1000 IU) | | | | |
| 4-8 | 400 (1320 IU) | | | | |
| 9-13 | 600 (2000 IU) | | | | |
| 14-18 | | 900 (3000 IU) | 700 (2310 IU) | 750 (2500 IU) | 1200 (4000 IU) |
| 19+ | | 900 (3000 IU) | 700 (2310 IU) | 770 (2565 IU) | 1300 (4300 IU) |

Insufficient information is available to establish an RDA for vitamin A for infants. Instead, AIs have been established based on the amount of vitamin A consumed by healthy infants fed breastmilk. AIs for vitamin A for infants aged 0 months to 6 months is 400 (1320 IU) and for those aged 7 months to 12 months is 500 (1650 IU).

The NHANES III survey (1988-1994) found that most Americans consume recommended amounts of vitamin A. More recent NHANES data (1999-2000) show average adult intake to be about 3,300 IU per day.

There is no RDA for beta-carotene or other provitamin A carotenoids. The IOM states that consuming 3 mg to 6 mg of beta-carotene daily (equivalent to 833 IU to 1,667 IU vitamin A) will maintain blood levels of beta-carotene in the range associated with a lower risk of chronic diseases. A diet that provides five or more servings of fruits and vegetables per day and includes some dark green and leafy vegetables and deep yellow or orange fruits should provide sufficient beta-carotene and other carotenoids.

Vegetarians who do not consume eggs and dairy foods need provitamin A carotenoids to meet their need for vitamin A. They should include a minimum of five servings of fruits and vegetables in their daily diet and regularly choose dark green leafy vegetables and orange and yellow fruits to consume recommended amounts of vitamin A.

Vitamin B

The Vitamin B complex is an important group of water-soluble vitamins that participate in many chemical reactions in the body.

Thiamine

Thiamine (vitamin B1) plays a role in converting carbohydrates into energy, and is essential for the functioning of the heart, muscles, and nervous system.

Thiamine is found in products such as, but not limited to, fortified breads, cereal, pasta, whole grains (especially wheat germ), lean meats (especially pork), fish, dried beans, peas, and soybeans. Dairy products, fruits, and vegetables are not very high in thiamine, but when consumed in large amounts, they become a significant source.

A deficiency of thiamine can cause weakness, fatigue, psychosis, and nerve damage. Thiamine deficiency in the U.S. often is seen in those who abuse alcohol. Brain damage may occur in severe thiamine deficiency. Table 3 shows the Food and Nutrition Board recommendations for dietary intake for thiamine. Specific recommendations for each vitamin depend on age, gender, and other factors (such as pregnancy). Adults, pregnant and lactating women need higher levels of thiamine than young children.

TABLE 3

Recommended Dietary Intake for Thiamine
Recommended Dietary Intake for Thiamine

| | mg/day |
|---|---|
| Infants | |
| 0-6 months | 0.2 |
| 7-12 months | 0.3 |
| Children | |
| 1-3 years | 0.5 |
| 4-8 years | 0.6 |
| 9-13 years | 0.9 |
| Adolescents and Adults | |
| Males age 14 and older | 1.2 |
| Females age 14-18 years | 1.0 |
| Females age 19 and older | 1.1 |

Riboflavin

Riboflavin (vitamin B2) works with other B vitamins and plays a role in body growth, red blood cell production, and assists in releasing energy from carbohydrates.

Dietary food sources of riboflavin include, but are not limited to, lean meats, eggs, legumes, nuts, green leafy vegetables, and dairy products. Breads and cereals often are fortified with riboflavin.

Symptoms of significant deficiency syndromes include sore throat, swelling of mucous membranes, mouth or lip sores, anemia, and skin disorders.

Table 4 shows the Food and Nutrition Board recommendations for dietary intake for riboflavin. Specific recommendations for each vitamin depend on age, gender, and other factors (such as pregnancy). Adults, pregnant and lactating women need higher levels of thiamine than young children.

TABLE 4

Recommended Dietary Intake for Riboflavin
Recommended Dietary Intake for Riboflavin

| | mg/day |
|---|---|
| Infants | |
| 0-6 months | 0.3 |
| 7-12 months | 0.4 |
| Children | |
| 1-3 years | 0.5 |
| 4-8 years | 0.6 |
| 9-13 years | 0.9 |
| Adolescents and Adults | |
| Males age 14 and older | 1.3 |
| Females age 14-18 years | 1.0 |
| Females age 19 and older | 1.1 |

Niacin

Niacin (vitamin B3) assists in the functioning of the digestive system, skin, and nerves, and is important for the conversion of food to energy.

Niacin is in various products including, but not limited to, dairy products, poultry, fish, lean meats, nuts, and eggs. Legumes and enriched breads and cereals also supply some niacin. A deficiency in niacin may lead to pellagra, whose symptoms include inflamed skin, digestive problems, and mental impairment. Large doses of niacin may cause liver damage, peptic ulcers, and skin rashes; even normal doses of niacin may be associated with skin flushing.

Table 5 shows the Food and Nutrition Board recommendations of dietary intake for niacin. Specific recommendations for each vitamin depend on age, gender, and other factors (such as pregnancy). Adults, pregnant and lactating women need higher levels of thiamine than young children.

TABLE 5

Recommended Dietary Intake for Niacin

|  | mg/day |
|---|---|
| Infants | |
| 0-6 months | 2.0 |
| 7-12 months | 4.0 |
| Children | |
| 1-3 years | 6.0 |
| 4-8 years | 8.0 |
| 9-13 years | 12 |
| Adolescents and Adults | |
| Males age 14 and older | 16 |
| Females age 14 and older | 14 |

Pantothenic Acid

Pantothenic acid (vitamin B5) is essential to growth and have important roles in metabolism. They are found in foods that are good sources of B vitamins including, but not limited to, eggs, fish, milk and milk products, whole-grain cereals, legumes, yeast, broccoli and other vegetables in the cabbage family, white and sweet potatoes, and lean beef.

Table 6 shows the Food and Nutrition Board recommendations of dietary intake for pantothenic acid. Specific recommendations for each vitamin depend on age, gender, and other factors (such as pregnancy). Adults, pregnant and lactating women need higher levels of thiamine than young children.

TABLE 6

Recommended Dietary Intake for Pantothenic Acid

|  | mg/day |
|---|---|
| Infants | |
| 0-6 months | 1.7 |
| 7-12 months | 1.8 |
| Children | |
| 1-3 years | 2 |
| 4-8 years | 3 |
| 9-13 years | 4 |
| Adolescents and Adults | |
| 14 and older | 5 |

Vitamin B6

Vitamin B6 is a water-soluble B vitamin that exists in three major chemical forms: pyridoxine, pyridoxal, and pyridoxamine. Pyridoxal phosphate (PLP) is the active form and is a cofactor in many reactions of amino acid metabolism, including transamination, deamination, and decarboxylation. PLP also is necessary for the enzymatic reaction governing the release of glucose from glycogen. Vitamin B6 is involved in various biological processes, including, but not limited to, amino acid, glucose and lipid metabolism, neurotransmitter synthesis, histamine synthesis, hemoglobin synthesis and function, and gene expression. It is found in a wide variety of foods including, but not limited to, beans, meat, poultry, fish, and some fruits and vegetables. More specifically, such foods include, but are not limited to, potato, banana, Garbanzo beans, chicken, pork, beef, trout, sunflower seeds, spinach, tomato juice, avocado, salmon, tuna, peanuts, walnuts, soybean, and lima beans. Table 7 shows the RDAs for vitamin B6 in adults.

TABLE 7

Recommended Dietary Allowance for Vitamin B6 for Adults

| Life-stage | Men | Women | Pregnancy | Lactation |
|---|---|---|---|---|
| Ages 19-50 | 1.3 mg | 1.3 mg | | |
| Ages 51+ | 1.7 mg | 1.5 mg | | |
| All Ages | | | 1.9 mg | 2.0 mg |

Results of two national surveys, the National Health and Nutrition Examination Survey (NHANES III 1988-94) and the Continuing Survey of Food Intake by Individuals (1994-96 CSFII), indicated that diets of most Americans meet current intake recommendations for vitamin B6.

Clinical signs of vitamin B6 deficiency are seen rarely in the United States. Many older Americans, however, have low blood levels of vitamin B6, which may suggest a marginal or sub-optimal vitamin B6 nutritional status. Vitamin B6 deficiency may occur in individuals with poor quality diets that are deficient in many nutrients. Symptoms occur during later stages of deficiency, when intake has been very low for an extended time. Signs of vitamin B6 deficiency include dermatitis (skin inflammation), glossitis (a sore tongue), depression, confusion, and convulsions. Vitamin B6 deficiency also can cause anemia. Some of these symptoms also can result from a variety of medical conditions other than vitamin B6 deficiency. It is important that a physician evaluate symptoms so that appropriate medical care can be given.

Vitamin B12

Vitamin B12 (cobalamin) plays a key role in the normal functioning of the brain and nervous system, and in formation of blood. The term "Vitamin B12" refers to a class of chemically-related compounds, all of which have vitamin activity. Structurally the most complicated vitamin, it contains the biochemically rare element cobalt. Vitamin B12 normally is involved in the metabolism of every cell of the body; it affects DNA synthesis and regulation and also fatty acid synthesis and energy production.

Vitamin B12 is found naturally in animal products, including, but not limited to, fish, meat, poultry, eggs, milk, and milk products. Vitamin B12 generally is not found in plant foods. Food sources of vitamin B12 include, but are not limited to, liver (beef), clams, trout, salmon, haddock, tuna, milk, cheese, pork and egg.

Intake recommendations for vitamin B12 and other nutrients are provided in the DRIs developed by the Food and Nutrition Board (FNB) at the Institute of Medicine (IOM) of the National Academies. Table 8 shows the RDAs for vitamin B12. For infants aged 0 months to 12 months, the FNB established an AI for vitamin B12 that is equivalent to the mean intake of vitamin B12 in healthy, breastfed infants.

TABLE 8

Recommended Dietary Allowances for Vitamin B12

| Age | Male (µg) | Female (µg) | Pregnancy (µg) | Lactation (µg) |
|---|---|---|---|---|
| 0-6 months | 0.4 | 0.4 | | |
| 7-12 months | 0.5 | 0.5 | | |
| 1-3 years | 0.9 | 0.9 | | |

TABLE 8-continued

Recommended Dietary Allowances for Vitamin B12
Recommended Dietary Allowances for Vitamin B12

| Age | Male (µg) | Female (µg) | Pregnancy (µg) | Lactation (µg) |
|---|---|---|---|---|
| 4-8 years | 1.2 | 1.2 | | |
| 9-13 years | 1.8 | 1.8 | | |
| 14+ years | 2.4 | 2.4 | 2.6 | 2.8 |

Daily values (DVs) were developed by the U.S. Food and Drug Administration (FDA) to help consumers determine the level of various nutrients in a standard serving of food in relation to their approximate requirement for it. The DV for vitamin B12 is 6 µg. However, the FDA does not require food labels to list vitamin B12 content unless a food has been fortified with this nutrient.

According to analyses of data from the 1988-1994 National Health and Nutrition Examination Survey (NHANES III) and the 1994-1996 Continuing Survey of Food Intake by Individuals, most children and adults in the U.S. consume recommended amounts of vitamin B12. Data from the 1999-2000 NHANES indicate that the median daily intake of vitamin B12 for the U.S. population is 3.4 µg.

Some people, particularly older adults, those with pernicious anemia, and those with reduced levels of stomach acidity (achlorhydria) or intestinal disorders, have difficulty absorbing vitamin B12 from food and, in some cases, oral supplements. As a result, vitamin B12 deficiency is common, affecting between 1.5% and 15% of the general population. The cause of the vitamin B12 deficiency remains unknown in many of these cases.

Evidence from the Framingham Offspring Study suggests that the prevalence of vitamin B12 deficiency in young adults might be greater than previously assumed. This study reported that the percentage of participants in three age groups (26 years to 49 years, 50 years to 64 years, and 65 years and older) with deficient blood levels of vitamin B12 was similar.

Vitamin C

Vitamin C (ascorbic acid) is a water-soluble vitamin necessary for normal growth and development. It is required for the growth and repair of tissues in all parts of the body, and is involved in several biological processes including, but not limited to, the formation of collagen, scar tissue, tendons, ligaments, blood vessels, the healing of wounds, and the repair and maintenance of cartilage, bones, and teeth.

Vitamin C is an antioxidant. Antioxidants are nutrients that block some of the damage caused by free radicals Free-radical damage may contribute to the aging process, cancer, heart disease and other inflammatory conditions, such as, for example, arthritis.

All fruits and vegetables contain some amount of vitamin C. Foods that tend to be the highest sources of vitamin C include green peppers, citrus fruits and juices, strawberries, tomatoes, broccoli, turnip greens, and other leafy greens, sweet and white potatoes, and cantaloupe. Other sources include, but are not limited to, papaya, mango, watermelon, brussel sprouts, cauliflower, cabbage, winter squash, red peppers, raspberries, blueberries, cranberries, and pineapples.

Amounts of Vitamin C greater than 2000 mg/day are not recommended because such high doses may lead to stomach upset and diarrhea. Vitamin C deficiency signs and symptoms include, but are not limited to, dry and splitting hair, gingivitis, rough and dry skin, decreased wound-healing rate, easy bruising, nosebleeds, weakened tooth enamel, swollen and painful joints, anemia, and scurvy.

It is recommended that Vitamin C be consumed every day since it is not fat-soluble and cannot be stored. Table 9 shows the Food and Nutrition Board at the Institute of Medicine recommendations of dietary intake of vitamin C.

TABLE 9

Recommended Dietary Intake for Vitamin C
Recommended Dietary Intake for Vitamin C

| | mg/day |
|---|---|
| Infants and Children | |
| 0-6 months | 40 |
| 7-12 months | 50 |
| 1-3 years | 15 |
| 4-8 years | 25 |
| 9-13 years | 45 |
| Adolescents | |
| Girls 14-18 years | 65 |
| Boys 14-18 years | 75 |
| Adults | |
| Men age 19 and older | 90 |
| Women age 19 and older | 75 |

Vitamin D

The term "Vitamin D" refers to a group of fat-soluble prohormones, the two major forms of which are vitamin D2 (ergocalciferol) and vitamin D3 (cholecalferol), their metabolites and functional analogs. Vitamin D obtained from food and supplements is biologically inert and must undergo two hydroxylation reactions to be activated in the body. Calcitriol is the active form of vitamin D found in the human body.

Calcitriol plays an important role in the maintenance of several organ systems. It plays a major role in increasing the flow of calcium into the bloodstream by promoting absorption of calcium and phosphorous from food in the intestines and reabsorption of calcium in the kidneys, by enabling normal mineralization of bone and by preventing hyocalcemic tetany.

Very few foods in nature contain vitamin D. The flesh of fish (such as, for example, salmon, tuna, and mackeral) and fish liver oils are among the best sources. Small amounts of vitamin D are found in beef liver, cheese, and egg yolks. Vitamin D in these foods is primarily in the form of vitamin D2. Some mushrooms provide vitamin D2 in variable amounts.

Fortified foods provide most of the vitamin D in the American diet. For example, almost all of the U.S. milk supply is fortified with 100 IU/cup of vitamin D (25% of the DV or 50% of the AI level for ages 14 years to 50 years). In the U.S., foods allowed to be fortified with vitamin D include cereal flours and related products, milk, and products made from milk, and calcium-fortified fruit juices and drinks.

DVs were developed by the U.S. Food and Drug Administration to help consumers compare the nutrient contents of products within the context of a total diet. The DV for vitamin D is 400 IU for adults and children age 4 and older. Food labels, however, are not required to list vitamin D content unless a food has been fortified with this nutrient. Foods providing 20% or more of the DV are considered to be high sources of a nutrient.

Intake recommendations for vitamin D and other nutrients are provided in the DRIs developed by the Food and Nutrition Board (FNB) at the Institute of Medicine (IOM) of the National Academies. The FNB established an AI for vitamin D that represents a daily intake sufficient to maintain bone health and normal calcium metabolism in healthy people. Table 10 shows the AIs for vitamin D; the AIs for vitamin D are based on the assumption that the vitamin is not synthesized by exposure to sunlight. The biological activity of 1 µg is equal to 40 IU.

TABLE 10

Adequate Intake for Vitamin D.
Adequate Intake for Vitamin D

| Age | Children | Men | Women | Pregnancy | Lactation |
|---|---|---|---|---|---|
| Birth to 13 years | 5 µg (200 IU) | | | | |
| 14-18 years | | 5 µg (200 IU) | 5 µg (200 IU) | 5 µg (200 IU) | 5 µg (200 IU) |
| 19-50 years | | 5 µg (200 IU) | 5 µg (200 IU) | 5 µg (200 IU) | 5 µg (200 IU) |
| 51-70 years | | 10 µg (200 IU) | 10 µg (200 IU) | | |
| 71+ years | | 15 µg (200 IU) | 15 µg (200 IU) | | |

In 2008, the American Academy of Pediatrics (AAP) issued recommended intake values for vitamin D that exceed those of FNB. The AAP recommendations are based on evidence from more recent clinical trials and the history of safe use of 400 IU/day of vitamin D in pediatric and adolescent populations. AAP recommends that exclusively and partially breastfed infants receive supplements of 400 IU/day of vitamin D shortly after birth and continue to receive these supplements until they are weaned and consume greater than 1,000 mL/day of vitamin D-fortified formula or whole milk. (All formulas sold in the United States provide greater than 400 IU vitamin $D_3$ per liter, and the majority of vitamin D-only and multivitamin liquid supplements provide 400 IU per serving). Similarly, all non-breastfed infants ingesting less than 1,000 mL/day of vitamin D-fortified formula or milk should receive a vitamin D supplement of 400 IU/day. AAP also recommends that older children and adolescents who do not obtain 400 IU/day through vitamin D-fortified milk and foods should take a 400 IU vitamin D supplement daily.

Vitamin E

Vitamin E is a generic term for tocopherols and tocotrienols; it describes a family of α-, β-, γ- and δ-tocopherols and corresponding four tocotrienols. Vitamin E is a fat-soluble antioxidant that stops the production of reactive oxygen species formed when fat undergoes oxidation. Of these, α-tocopherol has the highest bioavailability.

Dietary sources of vitamin E include asparagus, avocado, egg, milk, nuts (almonds and hazelnuts), seeds, spinach and vegetable oils. Most vitamin E in American diets is in the form of δ-tocopherol from soybean, canola, corn, and other vegetable oils and food products.

Intake recommendations for vitamin E and other nutrients are provided in the DRIs developed by the Food and Nutrition Board (FNB) at the Institute of Medicine (IOM) of the National Academies. The FNB's vitamin E recommendations are for α-tocopherol alone, the only form maintained in plasma. The FNB based these recommendations primarily on serum levels of the nutrient that provide adequate protection in a test measuring the survival of erythrocytes when exposed to hydrogen peroxide. In acknowledging "great uncertainties" in these data, the FNB has called for research to identify other biomarkers for assessing vitamin E requirements. Table 11 shows RDA for vitamin E. Because insufficient data are available to develop RDAs for infants, AIs were developed based on the amount of vitamin E consumed by healthy breastfed babies.

TABLE 11

Recommended Dietary Allowances for Vitamin E (α-tocopherol.
Recommended Dietary Allowances for Vitamin E (α-tocopherol)

| Age | Males | Females | Pregnancy | Lactation |
|---|---|---|---|---|
| Birth to 6 months | 4 mg (6 IU) | 4 mg (6 IU) | N/A | N/A |
| 7-12 months | 5 mg (7.5 IU) | 5 mg (7.5 IU) | N/A | N/A |
| 1-3 years | 6 mg (9 IU) | 6 mg (9 IU) | N/A | N/A |
| 4-8 years | 7 mg (10.4 IU) | 7 mg (10.4 IU) | N/A | N/A |
| 9-13 years | 11 mg (16.4 IU) | 11 mg (16.4 IU) | N/A | N/A |
| 14+ years | 15 mg (22.4 IU) | 15 mg (22.4 IU) | 15 mg (22.4 IU) | 15 mg (22.4 IU) |

DVs were developed by the U.S. Food and Drug Administration (FDA) to help consumers compare the nutrient content of different foods within the context of a total diet. The DV for vitamin E is 30 IU (approximately 20 mg of natural α-tocopherol) for adults and children age 4 and older. However, the FDA does not require food labels to list vitamin E content unless a food has been fortified with this nutrient. Foods providing 20% or more of the DV are considered to be high sources of a nutrient, but foods providing lower percentages of the DV also contribute to a healthful diet.

Vitamin K

Vitamin K (phytonadione) is a fat-soluble vitamin that plays an important role in blood clotting.

Vitamin K is found in cabbage, cauliflower, spinach, and other green leafy vegetables, cereals, soybeans, and other vegetables. Vitamin K also is made by the bacteria that line the gastrointestinal tract.

Individuals with vitamin K deficiency usually are more likely to have bruising and bleeding.

Table 12 shows the recommendations of the Food and Nutrition Board at the Institute of Medicine of dietary intake for vitamin K. Specific recommendations for each vitamin depend on age, gender, and other factors (such as pregnancy). Adults, pregnant and lactating women need higher levels of thiamine than young children.

TABLE 12

Recommended Dietary Intake for Vitamin K.
Recommended Dietary Intake for Vitamin K

| | µg/day |
|---|---|
| Infants | |
| 0-6 months | 2 |
| 7-12 months | 2.5 |
| Children | |
| 1-3 years | 30 |
| 4-8 years | 55 |
| 9-13 years | 60 |
| Adolescents and Adults | |
| 14 to 18 years | 75 |
| 19 and older | 90 |

Minerals.

Minerals are inorganic elements that are essential constituents of cells. For example, humans cannot produce calcium, which therefore must be absorbed through the diet.

Calcium

Calcium (Ca) the most abundant mineral in the body, plays a role in muscle contraction, in blood vessel expansion and contraction, in secretion of hormones and enzymes, and in transmitting impulses throughout the nervous system. It is found in some foods, is added to others, is available as a dietary supplement, and is present in some medicines (such as, for example, antacids). The human body strives to maintain constant concentrations of calcium in blood, muscle, and intracellular fluids, though less than 1% of total body calcium is need to support these functions. The remaining 99% of the body's calcium is stored in the bones and teeth where it supports their structure.

Intake recommendations for calcium and other nutrients are provided in the DRIs developed by the Food and Nutrition Board (FNB) at the U.S. Institute of Medicine of the National Academies. DRI is the general term for a set of reference values used for planning and assessing the nutrient intake of healthy individuals. These values, which vary by age and gender, include (1) the recommended daily allowance (RDA), which is the average daily level of intake sufficient to meet the nutrient requirements of nearly all (97-98%) healthy individuals; (2) adequate intake (AI), established when evidence is insufficient to develop an RDA and is set at a level assumed to ensure nutritional adequacy; and (3) tolerable upper intake level (UL), a maximum daily intake unlikely to cause adverse health effects. Table 13 shows the AIs (mg per day) established by the FNB for the amounts of calcium required to maintain adequate rates of calcium retention and bone health in healthy individuals.

TABLE 13

Adequate Intakes (mg per day) established by the FNB for the amounts of calcium required to maintain adequate rates of calcium retention and bone health in healthy individuals
Adequate Intake (AI) for Calcium

| Age | Male | Female | Pregnant | Lactating |
| --- | --- | --- | --- | --- |
| Birth to 6 months | 210 mg | 210 mg | | |
| 7-12 months | 270 mg | 270 mg | | |
| 1-3 years | 500 mg | 500 mg | | |
| 4-8 years | 800 mg | 800 mg | | |
| 9-13 years | 1300 mg | 1300 mg | | |
| 14-18 years | 1300 mg | 1300 mg | 1300 mg | 1300 mg |
| 19-50 years | 1000 mg | 1000 mg | 1000 mg | 1000 mg |
| 50+ years | 1200 mg | 1200 mg | | |

Milk, yogurt, and cheese are rich sources of calcium and are the major food contributors of this nutrient to people in the United States. Nondairy sources include vegetables, such as, but not limited to, Chinese cabbage, kale, and broccoli. Most grains do not have high amounts of calcium unless they are fortified; however, grains contribute calcium to the diet because they do have small amounts and people consume them frequently. Foods fortified with calcium include many fruit juices and drinks, tofu, and cereals.

The two main forms of calcium in supplements are carbonate and citrate. Calcium carbonate is more commonly available and is both inexpensive and convenient. Both the carbonate and citrate forms are similarly well absorbed, but individuals with reduced levels of stomach acid can absorb calcium citrate more easily. Other calcium forms in supplements or fortified foods include gluconate, lactate, and phosphate. Calcium citrate malate is a well-absorbed form of calcium found in some fortified juices. The body absorbs calcium carbonate most efficiently when the supplement is consumed with food, whereas the body can absorb calcium citrate equally effectively when the supplement is taken with or without food.

Calcium supplements contain varying amounts of elemental calcium. For example, calcium carbonate is 40% calcium by weight, whereas calcium citrate is 21% calcium. The percentage of calcium absorbed depends on the total amount of elemental calcium consumed at one time; as the amount increases, the percentage absorption decreases. Absorption is highest in doses less than 500 mg. For example, one who takes 1,000 mg/day of calcium from supplements may split the dose and take 500 mg at two separate times during the day. Because of its biological importance, calcium levels are carefully controlled in various compartments of the body. The three major regulators of blood calcium are parathyroid hormone (PTH), vitamin D, and calcitonin. PTH normally is released by the four parathyroid glands in the neck in response to low calcium levels in the bloodstream (hypocalcemia). PTH acts in three main ways: (1) It causes the gastrointestinal tract to increase calcium absorption from food, (2) it causes the bones to release some of their calcium stores, and (3) it causes the kidneys to excrete more phosphorous, which indirectly raises calcium levels.

Some individuals who take calcium supplements may experience symptoms such as, for example, gas, bloating, constipation, or a combination of these. Such symptoms often can be resolved by spreading out the calcium dose throughout the day, taking the supplement with meals, or changing the brand of supplement used.

Many Americans do not ingest recommended amounts of calcium from food. For example, according to the nationwide Continuing Survey of Food Intake of Individuals, approximately 44% of boys and 58% of girls aged 6-11 fell short in 1994-1996, as did 64% of boys and 87% of girls aged 12-19 years and 55% of men and 78% of women aged 20 years or older. The National Health and Nutrition Examination Survey (1999-2000) reported that average calcium intake were 1,081 and 793 mg/day for boys and girls ages 12-19 years, respectively; 1,025 and 797 mg/day for men and women 20-39 years; and 797 and 660 mg/day for men and women $\geqq 60$ years. Overall, females are less likely than males to get the recommended intake of calcium from food.

Most dietary calcium is absorbed in the small intestine. Vitamin D, which works together with PTH on bone and the kidney, is necessary for intestinal absorption of calcium. Not all calcium consumed is actually absorbed in the gut. Factors that affect absorption include, but are not limited to, (1) amount consumed, the efficiency of absorption decreases as the amount of calcium consumed at a meal increases; (2) age, net calcium absorption is as high as 60% in infants and young children, who need substantial amounts of the mineral to build bone. Absorption decreases to 15%-20% in adulthood and continues to decrease as people age; (3) vitamin D intake; and (4) other components in food; for example, phytic acid and oxalic acid, found naturally in some plants, bind to calcium and can inhibit its absorption. Foods with high levels of oxalic acid include, but are not limited to, spinach, collard greens, sweet potatoes, rhubarb, and beans. Foods high in phytic acid include, but are not limited to, fiber-containing whole-grain products, wheat bran, beans, seeds, nuts, and soy isolates. The extent to which these compounds affect calcium absorption varies. Some studies have reported that eating spinach and milk at the same time reduces absorption of the calcium in milk. In contrast, wheat products (with the exception of wheat bran) do not appear to have a negative impact on calcium absorption. These interactions probably have little or no nutritional consequence for people who eat a variety of food, and, furthermore, are accounted for in the overall calcium DRIs (which take absorption into account).

Some absorbed calcium is eliminated from the body in urine, feces and sweat. The amount eliminated is affected by several factors, including:

(1) sodium, potassium, and protein intake—high intake of sodium and protein increase calcium excretion, while adding more potassium to a high-sodium diet may help decrease calcium excretion, particularly in postmenopausal women.

(2) caffeine intake—caffeine may modestly increase calcium excretion and reduce absorption. For example, one cup of regular brewed coffee causes a loss of only 2 mg to 3 mg of calcium. Moderate caffeine consumption (1 cup of coffee or 2 cups of tea per day) in young women has no negative effects on bone.

(3) alcohol intake—alcohol intake may affect calcium status by reducing its absorption and by inhibiting enzymes in the liver that help convert vitamin D to its active form, however, the amount of alcohol required to affect calcium status and the effect of moderate alcohol consumption on bone loss is unknown.

(4) phosphorus intake—the effect of this mineral on calcium excretion is minimal.

(5) fruit and vegetable intake—these foods, when metabolized, shift the acid/base balance of the body towards the alkaline by producing bicarbonate, which reduces calcium loss. For example, metabolic acids produced by diets high in protein and cereal grains cause bone to release minerals such as calcium, phosphates, and alkaline salts that neutralize the excess acid.

Inadequate intake of dietary calcium from food and supplements produce no obvious symptoms in the short term. Hypocalcemia results primarily from medical problems or treatments, including renal failure, surgical removal of the stomach, and use of certain medications (such as diuretics). Symptoms of hypocalcemia may include numbness and tingling in the fingers, muscle cramps, convulsions, lethargy, poor appetite, and abnormal heart rhythms; if left untreated, calcium deficiency may lead to death.

Chromium

Chromium (Cr) is a mineral that humans require in trace amounts; its mechanism of action in the body and the amounts of chromium needed for optimal health are not well defined. Chromium is found primarily in two forms: 1) trivalent ($Cr^{3+}$), which is biologically active and found in food; and 2) hexavalent ($Cr^{6+}$), a toxic form that results from industrial pollution.

It generally is believed that chromium enhances the action of insulin, a hormone critical to the metabolism and storage of carbohydrate, fat, and protein in the body. Studies in animal models have reported that chromium prevents an age-related decline in the ability of rats to maintain normal levels of sugar (glucose) in their blood. Chromium also is believed to be directly involved in carbohydrate, fat, and protein metabolism.

Chromium is widely distributed in the food supply, but most foods provide only small amounts (less than 2 μg/serving). Meat and whole-grain products, as well as some fruits (such as, but not limited to, bananas, grape juice, red wine, apples, orange juice), vegetables (such as, but not limited to, broccoli, potatoes, green beans), and spices (such as, but not limited to, garlic and basil) are relatively good sources. In contrast, foods high in simple sugars (such as, but not limited to, sucrose and fructose) are low in chromium.

Dietary intake of chromium cannot be determined reliably because the content of the mineral in foods is affected substantially by agricultural and manufacturing processes and perhaps by contamination with chromium when the foods are analyzed. Subsequently, food-composition databases generally provide approximate values of chromium in foods and serve only as a guide.

The U.S. National Academy of Sciences has established an estimated safe and adequate daily dietary intake range for chromium. Since the research base was insufficient to establish RDAs, chromium adequate intake (AI) values have been developed based on average intake of chromium from food as reported in several studies. Chromium AIs are provided in Table 14.

TABLE 14

Adequate Intake (AIs) for Chromium
Adequate Intake (AIs) for Chromium

| Age | Infants and Children (μg/day) | Males (μg/day) | Females (μg/day) | Pregnancy (μg/day) | Lactation (μg/day) |
|---|---|---|---|---|---|
| 0 to 6 months | 0.2 | | | | |
| 7 to 12 months | 5.5 | | | | |
| 1 to 3 years | 11 | | | | |
| 4 to 8 years | 15 | | | | |
| 9 to 13 years | | 25 | 21 | | |
| 14 to 18 years | | 35 | 24 | 29 | 44 |
| 19 to 50 years | | 35 | 25 | 30 | 45 |
| >50 years | | 30 | 20 | | |

Adult women in the United States consume about 23 to 29 μg of chromium per day from food, which meets their AIs unless they are pregnant or lactating. In contrast, adult men average 39 to 54 μg per day, which exceeds their AIs. The average amount of chromium in the breast milk of healthy, well-nourished mothers is 0.24 μg per quart; infants exclusively fed breast milk obtain about 0.2 μg (based on an estimated consumption of 0.82 quarts per day). Infant formula provides about 0.5 μg of chromium per quart. Few studies have compared how well infants absorb and utilize chromium from human milk and from formula.

There is little absorption of chromium from the intestinal tract (ranging from less than 0.4% to 2.5% of the amount consumed), and the remainder is excreted in the feces. Vitamin C (found in fruits and vegetables and their juices) and the B vitamin niacin (found in meats, poultry, fish, and grain products) enhance chromium absorption. The body's chromium content may be reduced under several conditions. Diets high in simple sugars (comprising more than 35% of calories) can increase chromium excretion in the urine. Infection, acute exercise, pregnancy and lactation, and stressful states (such as physical trauma) increase chromium losses and can lead to deficiency, especially if chromium intake are already low. Some studies have reported significant age-related decreases in the chromium concentrations of hair, sweat, and blood, which may suggest that older adults are more vulnerable to chromium depletion than younger adults. One caveat is that chromium status is difficult to determine since blood, urine, and hair levels do not necessarily reflect body stores. Furthermore, no chromium-specific enzyme or other biochemical marker has been found to reliably assess a person's chromium status.

Folate

Folate is a water-soluble B vitamin that occurs naturally in food. Folic acid (the synthetic form of folate) is found in supplements and added to fortify foods. Folate plays a role in the production and maintenance of new cells and the synthesis of DNA and RNA. Both adults and children require folate to produce normal red blood cells and prevent anemia. Folate also is essential for the metabolism of homocysteine. Folate has a protective effect against the development of neural tube defects during pregnancy.

The U.S. Food and Drug Administration has published regulations requiring the addition of folic acid to enriched breads, cereals, flours, corn meals, pastas, rice, and other grain products. Since cereals and grains are widely consumed in the U.S., these products have become a very important contributor of folic acid to the American diet. Dietary sources of folate include, but are not limited to, beef liver, cow peas, spinach, Great Northern beans, asparagus, rice, green peas, broccoli, egg noodles, avocado, peanuts, tomato juice, orange juice, turnip greens, orange, eggs, cantaloupe, Papaya, and banana.

Recommendations for folate are given in the DRIs developed by the Institute for Medicine of the National Academy of Sciences. The RDAs for folate are expressed in a term called the "Dietary Folate Equivalent." The Dietary Folate Equivalent (DFE) was developed to help account for the differences in absorption of naturally occurring dietary folate and the more bioavailable synthetic folic acid. Table 15 lists the RDAs for folate, expressed in micrograms (μg) of DFE, for children and adults.

TABLE 15

Recommended Dietary Allowances for Folate for Children and Adults
Recommended Dietary Allowances for Folate for Children and Adults

| Age (years) | Males and Females (μg/day) | Pregnancy (μg/day) | Lactation (μg/day) |
|---|---|---|---|
| 1-3 | 150 | N/A | N/A |
| 4-8 | 200 | N/A | N/A |
| 9-13 | 300 | N/A | N/A |
| 14-18 | 400 | 600 | 500 |
| 19+ | 400 | 600 | 500 |

There is insufficient information to establish an RDA for folate for infants. An AI based on the amount of folate consumed by healthy infants who are fed breast milk has been established. The AI for folate for infants aged 0-6 months is 65 μg/day, and for infants aged 7-12 months is 80 μg/day.

The National Health and Nutrition Examination Survey (NHANES III 1988-94) and the Continuing Survey of Food Intake by Individuals (1994-96 CSFII) indicated that most individuals surveyed did not consume adequate folate. However, the folic acid fortification program, which was initiated in 1998, has increased folic acid content of commonly eaten foods such as, for example, cereals and grains, and as a result most diets in the United States now provide recommended amounts of folate equivalents.

A deficiency of folate can occur when an increased need for folate is not matched by an increased intake, when dietary folate intake does not meet recommended needs, and when folate loss increases. Medications that interfere with the metabolism of folate also may increase the need for this vitamin and the risk of deficiency.

It is not unusual to find foods, such as some ready-to-eat cereals, fortified with 100% of the RDA for folate. The variety of fortified foods available has made it easier for women of childbearing age in the US to consume the recommended 400 μg of folic acid per day from fortified foods and/or supplements. The large numbers of fortified foods on the market, however, also raises the risk of exceeding the upper intake levels (UL). This is especially important for anyone at risk of vitamin $B_{12}$ deficiency, which can be triggered by too much folic acid. It is important for anyone who is considering taking a folic acid supplement to first consider whether their diet already includes adequate sources of dietary folate and fortified food sources of folic acid.

Iron

Iron is an integral part of many proteins and enzymes that maintain good health. In humans, it is an essential component of proteins involved in oxygen transport and is essential for the regulation of cell growth and differentiation. A deficiency of iron limits oxygen delivery to cells, resulting in fatigue, poor work performance, and decreased immunity. Excess amounts of iron can result in toxicity and even death. Almost two-thirds of iron in the body is found in hemoglobin, the protein in red blood cells that carries oxygen to tissues. Smaller amounts of iron are found in myoglobin, a protein that helps supply oxygen to muscle, and in enzymes that assist biochemical reactions.

There are two forms of dietary iron: heme and nonheme. Heme iron is derived from hemoglobin and is found in animal foods that originally contained hemoglobin, such as, for example, red meats, fish, and poultry. Iron in plant foods, such as, for example, lentils and beans, is arranged in a chemical structure called nonheme iron. The nonheme form of iron is added to iron-enriched and iron-fortified foods. Heme iron is absorbed better than nonheme iron, but most dietary iron is nonheme iron. Heme iron sources include, but are not limited to, chicken liver, oysters, beef, clams, beef, turkey, tuna, halibut, crab, pork and shrimp. Nonheme iron sources include, but are not limited to, soybeans, lentils, beans (kidney, lima, navy, black, pinto), molasses, spinach, black-eyed peas, and raisins.

Recommendations for iron are provided in the Dietary Reference Intake (DRIs) developed by the Institute of Medicine of the National Academy of Sciences. Table 16 shows the RDAs for iron (mg) for infants, children and adults.

TABLE 16

Recommended Dietary Allowances for Iron for Infants (7 to 12 months), Children, and Adults
Recommended Dietary Allowances for Iron for Infants (7 to 12 months), Children, and Adults

| Age | Males (mg/day) | Females (mg/day) | Pregnancy (mg/day) | Lactation (mg/day) |
|---|---|---|---|---|
| 7 to 12 months | 11 | 11 | N/A | N/A |
| 1 to 3 years | 7 | 7 | N/A | N/A |
| 4 to 8 years | 10 | 10 | N/A | N/A |
| 9 to 13 years | 8 | 8 | N/A | N/A |
| 14 to 18 years | 11 | 15 | | |
| 19 to 50 years | 8 | 18 | | |
| 51+ years | 8 | 8 | N/A | N/A |

Healthy full term infants are born with a supply of iron that lasts for 4 months to 6 months after birth. Insufficient evidence is available to establish an RDA for iron for infants from birth through 6 months of age. Recommended iron intake for this age group is based on an Adequate Intake (AI) that reflects the average iron intake of healthy infants fed breast milk. The AI for iron for infants (0 to 6 months) is 0.27 mg/day.

Iron in human breast milk is well absorbed by infants. It is estimated that infants can use more than 50% of the iron in breast milk as compared to less than 12% of the iron in infant formula. The amount of iron in cow's milk is low, and infants poorly absorb it. Additionally, gastrointestinal bleeding may result from feeding cow's milk to infants. For these reasons, cow's milk should not be fed to infants until they are at least 1 year old. The American Academy of Pediatrics (AAP) recommends that (i) infants should be exclusively breast fed for the first six months of life, (ii) gradual introduction of iron-enriched solid foods should complement breast milk from 7 to 12 months of age; and (iii) infants weaned from breast milk before 12 months of age should receive iron-fortified infant formula. Infant formulas that contain from 4 to 12 milligrams of iron per liter are considered iron-fortified.

Data from the National Health and Nutrition Examination Survey (NHANES) describe dietary intake of Americans 2 months of age and older. NHANES (1988-94) data suggest that males of all racial and ethnic groups consume recommended amounts of iron, while iron intake generally is low in females of childbearing age and young children.

Researchers also have examined specific groups within the NHANES population. For example, researchers have compared the dietary intake of adults who consider themselves to be food insufficient (and therefore have limited access to nutritionally adequate foods) to those who are food sufficient (and have easy access to food). Older adults from food insufficient families had significantly lower intake of iron than older adults who are food sufficient. In one survey, 20% of adults age 20 to 59 and 13.6% of adults age 60 and older from food insufficient families consumed less than 50% of the RDA for iron, compared to 13% of adults age 20 to 50 and 2.5% of adults age 60 and older from food sufficient families.

Iron intake is negatively influenced by low nutrient density foods, which are high in calories but low in vitamins and minerals. Sugar sweetened sodas and most desserts are examples of low nutrient density foods, as are snack foods such as potato chips. Some surveys have reported that among almost 5,000 children and adolescents between the ages of 8 and 18 who were surveyed, low nutrient density foods contributed almost 30% of daily caloric intake, with sweeteners and desserts jointly accounting for almost 25% of caloric intake. Those children and adolescents who consumed fewer "low nutrient density" foods were more likely to consume recommended amounts of iron.

Studies have used data from The Continuing Survey of Food Intake by Individuals (CSFII 1994-6 and 1998) to examine the effect of major food and beverage sources of added sugars on micronutrient intake of U.S. children aged 6 to 17 years. Researchers reported that consumption of presweetened cereals, which are fortified with iron, increased the likelihood of meeting recommendations for iron intake. Conversely, as intake of sugar-sweetened beverages, sugars, sweets, and sweetened grains increased, children were less likely to consume recommended amounts of iron.

The World Health Organization considers iron deficiency the number one nutritional disorder in the world. As many as 80% of the world's population may be iron deficient, while 30% may have iron deficiency anemia. However, there is considerable potential for iron toxicity because very little iron is excreted from the body. Thus, iron can accumulate in body tissues and organs when normal storage sites are full.

Magnesium

Magnesium is the fourth most abundant mineral in the body and is essential to good health. Approximately 50% of total body magnesium is found in bone. The other half is found predominantly inside cells of body tissues and organs, with 1% residing in the blood. Magnesium is involved in maintenance of normal muscle and nerve function, cardiac function, the immune system, blood glucose levels, energy metabolism and protein synthesis.

Dietary sources of magnesium include, but are not limited to, green vegetables, such as spinach, legumes (beans and peas), nuts and seeds, and whole, unrefined grains. Dietary magnesium is absorbed through the small intestines and excreted via the kidneys.

Recommendations for magnesium are provided in the DRIs developed by the Institute of Medicine of the National Academy of Sciences. Table 17 shows the RDAs for magnesium for children and adults.

TABLE 17

Recommended Dietary Allowances for Magnesium for Children and Adults
Recommended Dietary Allowances for Magnesium for Children and Adults

| Age (years) | Male (mg/day) | Female (mg/day) | Pregnancy (mg/day) | Lactation (mg/day) |
|---|---|---|---|---|
| 1-3 | 80 | 80 | N/A | N/A |
| 4-8 | 130 | 130 | N/A | N/A |
| 9-13 | 240 | 240 | N/A | N/A |
| 14-18 | 410 | 360 | 400 | 360 |
| 19-30 | 400 | 310 | 350 | 310 |
| 31+ | 420 | 320 | 360 | 320 |

There is insufficient information on magnesium to establish a RDA for infants. Instead, for infants 0 to 12 months, the DRI is in the form of an Adequate Intake (AI), which is the mean intake of magnesium in healthy, breastfed infants. The AIs for infants aged 0 months to 6 months is 30 mg/day; the AI for infants aged 7 months to 12 months is 75 mg/day.

Data from the 1999-2000 National Health and Nutrition Examination Survey suggest that substantial numbers of adults in the United States (US) fail to get recommended amounts of magnesium in their diets. Among adult men and women, the diets of Caucasians have significantly more magnesium than do those of African-Americans. Magnesium intake is lower among older adults in every racial and ethnic group. Among African-American men and Caucasian men and women who take dietary supplements, the intake of magnesium is significantly higher than in those who do not. Even though dietary surveys suggest that many Americans do not get recommended amounts of magnesium, symptoms of magnesium deficiency are seen rarely in the US. However, there is concern that many people may have insufficient body stores of magnesium because dietary intake of magnesium may be insufficient.

Selenium

Selenium is a trace mineral essential to good health but that is required only in small amounts. Selenium is incorporated into proteins to make selenoproteins, which are important antioxidant enzymes. Other selenoproteins help regulate thyroid function and play a role in the immune system. The antioxidant properties of selenoproteins help prevent cellular damage from free radicals. A free radical is a highly reactive and usually short-lived molecular fragment with one or more unpaired electrons. Free radicals are highly chemically reactive molecules. Because a free radical needs to extract a second electron from a neighboring molecule to pair its single electron, it often reacts with other molecules, which initiates the formation of many more free radical species in a self-propagating chain reaction. This ability to be self-propagating makes free radicals highly toxic to living organisms. Oxidative injury may lead to widespread biochemical damage within the cell. The molecular mechanisms responsible for this damage are complex. For example, free radicals may damage intracellular macromolecules, such as nucleic acids (e.g., DNA and RNA), proteins, and lipids. Free radical damage to cellular proteins may lead to loss of enzymatic function and cell death. Free radical damage to DNA may cause problems in replication or transcription, leading to cell death or uncontrolled cell growth. Free radical damage to cell membrane lipids may cause the damaged membranes to lose their ability to transport oxygen, nutrients or water to cells.

Plant foods are the major dietary sources of selenium in most countries throughout the world. The content of selenium in food depends on the selenium content of the soil where plants are grown or animals are raised. For example, researchers have reported that soils in the high plains of northern Nebraska and the Dakotas have very high levels of selenium. People living in those regions generally have the highest selenium intake in the United States. In the U.S., food distribution patterns across the country help prevent people living in low-selenium geographic areas from having low dietary selenium intake. Soils in some parts of China and Russia have very low amounts of selenium; selenium deficiency often is reported in those regions because most food in those areas is grown and eaten locally.

Selenium also can be found in some meats and seafood. Animals that eat grains or plants that were grown in selenium-rich soil have higher levels of selenium in their muscle. In the U.S., meats and bread are common sources of dietary selenium. Some nuts, such as, but not limited to, Brazil nuts, also are sources of selenium.

Recommendations for selenium are provided in the DRIs developed by the Institute of Medicine. Table 18 shows the RDAs for selenium for children and adults.

TABLE 18

Recommended Dietary Allowances for Selenium for Children and Adults
Recommended Dietary Allowances for Selenium for Children and Adults

| Age (years) | Males and Females (μg/day) | Pregnancy (μg/day) | Lactation (μg/day) |
| --- | --- | --- | --- |
| 1-3 years | 20 | N/A | N/A |
| 4-8 years | 30 | N/A | N/A |
| 9-13 years | 40 | N/A | N/A |
| 14-18 years | 55 | 60 | 70 |
| 19+ years | 55 | 60 | 70 |

There is insufficient information to establish a RDA for selenium for infants. An AI has been established that is based on the amount of selenium consumed by healthy infants who are fed breast milk. The AI for selenium for infants aged 0 months to 6 months is 15 μg/day; for those aged 7 months to 12 months, the AI is 20 μg/day. Results of the National Health and Nutrition Examination Survey (NHANES III-1988-94) indicated that the diets of most Americans provide the recommended amounts of selenium. The INTERMAP study examined nutrient intake of almost 5,000 middle-aged men and women in four countries, including the U.S., in the late 1990s. The primary aim of the study was to evaluate the effect of dietary micronutrients on blood pressure. Each study participant completed four, 24-hour dietary recalls, during which they were asked to record everything consumed (food, beverages, and dietary supplements) over the previous 24 hours. Selenium intake was lowest among residents of China, the country with the highest known rate of selenium deficiency. Mean dietary intake of selenium of U.S. participants was 153 μg for men and 109 μg for women. Both values exceed the recommended selenium intake for adults.

Zinc

Zinc is an essential mineral that is naturally present in some foods, added to others, and available as a dietary supplement. Zinc is involved in numerous aspects of cellular metabolism; it is required for the catalytic activity of approximately 100 enzymes, and plays a role in immune function, protein synthesis, wound healing, DNA synthesis, and cell division. A daily intake of zinc is required to maintain a steady state because the body has no specialized zinc storage system.

A wide variety of foods contain zinc, including, but not limited to, oysters, beef, crab, pork, chicken, lobster, cashews, chickpeas, cheese, almonds, milk, flounder, and kidney beans.

Intake recommendations for zinc and other nutrients are provided in the DRIs developed by the Food and Nutrition Board (FNB) at the Institute of Medicine (IOM) of the National Academies. Table 19 shows the RDAs for zinc. For infants aged 0 months to 6 months, the FNB established an AI for zinc that is equivalent to the mean intake of zinc in healthy, breastfed infants.

TABLE 19

Recommended Dietary Allowances for Zinc.
Recommended Dietary Allowances for Zinc

| Age | Males | Females | Pregnancy | Lactation |
| --- | --- | --- | --- | --- |
| Birth to 6 months | 2 mg | 2 mg | N/A | N/A |
| 7 months to 3 years | 3 mg | 3 mg | N/A | N/A |
| 4-8 years | 5 mg | 5 mg | N/A | N/A |
| 9-13 years | 8 mg | 8 mg | N/A | N/A |
| 14 to 18 years | 11 mg | 9 mg | 13 mg | 14 mg |
| 19+ years | 11 mg | 8 mg | 11 mg | 12 mg |

DVs were developed by the U.S. Food and Drug Administration to help consumers compare the nutrient contents of products within the context of a total diet. The DV for zinc is 15 mg for adults and children age 4 and older. Food labels, however, are not required to list zinc content unless a food has been fortified with this nutrient. Foods providing 20% or more of the DV are considered to be high sources of a nutrient.

Most infants (especially those who are formula fed), children, and adults in the United States consume recommended amounts of zinc according to two national surveys, the 1988-1991 National Health and Nutrition Examination Survey (NHANES III) and the 1994 Continuing Survey of Food Intake of Individuals (CSFII). However, some evidence suggests that zinc intake among older adults might be marginal. Studies reported that an analysis of NHANES III data indicates that 35% to 45% of adults aged 60 years or older had zinc intake below the estimated average requirement of 6.8 mg/day for elderly females and 9.4 mg/day for elderly males. When the investigators considered intake from both food and dietary supplements, they reported that 20% to 25% of older adults still had inadequate zinc intake.

Zinc intake might also be low in older adults from the 2% to 4% of U.S. households that are food insufficient (sometimes or often not having enough food). Studies reported that data from NHANES III indicate that adults aged 60 years or older from food-insufficient families had lower intake of zinc and several other nutrients and were more likely to have zinc intake below 50% of the RDA on a given day than those from food-sufficient families.

Phosphorous

Phosphorous is a key element in all known forms of life. Inorganic phosphorous plays a major role in biological molecules such as DNA and RNA, where it forms part of the structural framework of these molecules. Living cells also use phosphate to transport cellular energy in the form of adenosine triphosphate (ATP). Nearly every cellular process that uses energy obtains it in the form of ATP.

Dietary sources of phosphorous include, but are not limited to, meat, poultry, fish, eggs, seeds, milk, broccoli, apples, carrots, asparagus, bran and corn.

Sodium and Potassium

Salt is sodium chloride. Food labels list sodium rather than salt content. Consumers are directed to look for the sodium content when reading a Nutrition Facts Panel on a food product. Foods that are low in sodium (less than 140 mg or 5% of the Daily Value (DV)) are low in salt.

Nearly all Americans consume substantially more salt than they need. On average, the natural salt content of food accounts for only about 10% of total intake, while discretionary salt use (i.e., salt added at the table or while cooking) provides another 5-10% of total intake. Approximately 75% is derived from salt added by manufacturers. In addition, foods served by food establishments may be high in sodium. It is important to read the food label and determine the sodium content of food, which can vary by several hundreds of milligrams in similar foods. For example, the sodium content in regular tomato soup may be 700 mg per cup in one brand and 1100 mg per cup in another brand. Reading labels, comparing sodium contents of foods, and purchasing the lower sodium brand may be one strategy to lower total sodium intake.

Reducing salt intake is one of several ways that people may lower their blood pressure. The relationship between salt intake and blood pressure is direct and progressive without an apparent threshold. On average, the higher a person's salt intake, the higher the blood pressure. Reducing blood pressure, ideally to the normal range, reduces the risk of stroke, heart disease, heart failure, and kidney disease.

Another dietary measure to lower blood pressure is to consume a diet rich in potassium. A potassium-rich diet also blunts the effects of salt on blood pressure, may reduce the risk of developing kidney stones, and possibly decrease bone loss with age. The recommended intake of potassium for adolescents and adults is 4700 mg/day. Potassium should come from food sources. Fruits and vegetables, which are rich in potassium with its bicarbonate precursors, favorably affect acid-base metabolism, which may reduce risk of kidney stones and bone loss. Potassium-rich fruits and vegetables include leafy green vegetables, fruit from vines, and root vegetables. Meat, milk, and cereal products also contain potassium, but may not have the same effect on acid-base metabolism.

Copper

Copper is an essential trace mineral present in all body tissues. Cooper, along with iron, plays a role in the formation of red blood cells, and in maintenance of blood vessels, nerves, immune system, and bones.

Food sources of copper include, but are not limited to, oysters and other shellfish, whole grains, beans, nuts, potatoes, organ meats (kidneys, liver), dark leafy greens, dried fruits (such as prunes), cocoa, black pepper, and yeast. Normally, people have enough copper in the foods they eat; a lack of copper may lead to anemia and osteoporosis.

Table 20 shows the Food and Nutrition Board at the Institute of Medicine recommendations of dietary intake for copper. Specific recommendations depend on age, gender, and other factors (such as pregnancy). Women who are pregnant or lactating need higher amounts.

TABLE 20

Recommended Dietary Allowances for Copper.
Recommended Dietary Allowances for Copper

| | μg/day |
|---|---|
| Infants | |
| 0-6 months | 200 |
| 7-12 months | 220 |
| Children | |
| 1-3 years | 340 |
| 4-8 years | 440 |
| 9-13 years | 700 |

TABLE 20-continued

Recommended Dietary Allowances for Copper.
Recommended Dietary Allowances for Copper

| | μg/day |
|---|---|
| Adolescents and Adults | |
| 14-18 years | 890 |
| 19 and older | 900 |

Manganese

Manganese is an essential trace element. The classes of enzymes that have manganese cofactors are very broad and include such classes as oxidoreductases, transferases, hydrolases, lyases, isomerases, ligases, and reverse transcriptase. Manganese enables the body to utilize vitamin C, B1, biotin and choline. It plays a role at least in the production of fat, sex hormones, and breast milk in females.

Manganese is lost in milling and absorption is influenced negatively in the presence of large amount of calcium, phosphorous, zinc, cobalt and soy protein. Further, manganese is depleted in the soil by extensive use of chemical fertilizers, and food grown in such soil will have a low manganese content.

Dietary food sources of manganese include, but are not limited to, nuts, avocados, eggs, brown rice, whole grains, leafy greens and spices.

Fluoride

Fluoride occurs naturally in the body as calcium fluoride, which is mostly found in the bones and teeth. Small amounts of fluoride help prevent tooth decay. Fluoridation of tap water helps reduce cavities in children by 50% to 60%. Fluorides also help maintain bone structure. Low doses of fluoride salts may be used to treat conditions (such as menopause) that cause accelerated bone loss.

Food sources of fluoride include, but are not limited to, fluoridated water, and food prepared in fluoridated water. Natural sodium fluoride is present in the ocean, therefore most seafood contains fluoride. Fluoride deficiency may appear in the form of increased dental cavities, weak bones and teeth.

Table 21 shows the Food and Nutrition Board at the Institute of Medicine's recommendation for the dietary intake of fluoride. Specific recommendations depend on age and gender.

TABLE 21

Recommended Dietary Intake for Fluoride.
Recommended Dietary Intake for Fluoride

| | mg/day |
|---|---|
| Infants | |
| 0-6 months | 0.01 |
| 7-12 months | 0.5 |
| Children | |
| 1-3 years | 0.7 |
| 4-8 years | 1.0 |
| 9-13 years | 2.0 |
| Adolescents and Adults | |
| Males age 14-18 years | 3.0 |
| Males over 18 years | 4.0 |
| Females over 14 years | 3.0 |

Choline

Choline is a water-soluble essential nutrient that usually is grouped within the Vitamin B complex. Choline generally refers to the various quaternary ammonium salts containing the N,N,N-trimethylethanolammonium cation. These naturally occurring ammonium salts are found in the lipids that make up cell membranes and in the neurotransmitter acetylcholine. The FNB of the Institute of Medicine has established adequate intake (for adults) for this micronutrient of between 425 mg/day to 550 mg/day.

Foods richest in phosphatidylcholine (the major delivery form of choline) include, but are not limited to, egg yolks, soy, wheat germ, and cooked beef, chicken, veal and turkey livers. The most available choline dietary supplement is lecithin, derived from soy or egg yolks, which often is used as a food additive. Phosphatidylcholine also is available as a supplement, in pill or powder form. Supplementary choline also is available as choline chloride, which is available as a liquid due to its hydrophilic properties. Choline chloride is sometimes preferred as a supplement because phosphatidylcholine can have gastrointestinal side effects. The human body can make some choline, but generally it is recognized that it is important to get dietary choline as well. Although most foods have at least some choline, people may have to get enough in their diets, particularly if they do not eat many whole eggs.

In the United States, 67% of noninstitutionalized adults age 20 years and older are overweight or obese; 18% of adolescents age 12 years to 19 years are overweight; 15% of children age 6 years to 11 years are overweight; and 11% of children age 2 years to 5 years are overweight. Further, in the United States, heart disease remains the number one cause of death.

The challenge is to translate nutrition knowledge into strategies, programs, and policies that can help the general public make healthier food choices. Nutrition professionals trying to influence dietary change must take into account a person's personal food preferences as well as one's level of awareness and interest in making healthier choices. In addition, environmental factors within families, organizations, and communities need to be considered. As these challenges are faced, science-based tools and information are needed.

The described invention addresses these problems and provides methods for determining the complete nutritional value of a standard equivalent unit of fruits and vegetables and using the information derived to fortify foods for human consumption.

SUMMARY

According to one aspect, the described invention provides a method to fortify a base food so that the base food contains a nutritional content equal to a desired total target nutritional content of fruits and vegetables, the method comprising the steps: (a) establishing the nutritional content of the base food; (b) converting the nutritional content in (a) to a standard equivalent unit of nutritional value of at least one serving of fruits and vegetables that is present in the base food; (c) selecting a target multiple of standard equivalent units of nutritional value of fruits and vegetables of the at least one serving in (b); (d) multiplying the target multiple of standard equivalent units of nutritional value of fruits and vegetables determined in (c) by the standard equivalent unit of nutritional value of (b) to arrive at a desired total target nutritional content; (e) subtracting the nutritional content of the base food of (a) from the desired total target nutritional content in (d) to determine a nutritional gap; (f) fortifying the base food by adding at least one nutritional component to fill in the nutritional gap in (e); thereby providing a base food with the nutritional content equal to the desired total target nutritional content, wherein an at least one organoleptic property of the fortified based food of (f) is equivalent to an at least one organoleptic property of the base food of (a). According to one embodiment, the base food is a beverage. According to another embodiment, the base food is a fresh food. According to another embodiment, the base food is a processed food. According to another embodiment, the base food is a natural food. According to another embodiment, the at least one nutritional component of (f) is a supplement. According to another embodiment, the at least one nutritional component of (f) is an additive. According to another embodiment, the least one nutritional component of (f) is a powder. According to another embodiment, the at least one organoleptic property is at least one selected from the group consisting of appearance, odor, aroma, fragrance, consistency, and texture. According to another embodiment, step (f) further comprises adding at least one of a masking agent, a flavoring agent, and a coloring agent. According to another embodiment, the at least one fruit is at least one fruit selected from the group consisting of an orange, an apple, a banana, a grape, a peach, a lemon, a pear, a plum, an avocado, a melon, a cherry, and a kiwi. According to another embodiment, the at least one nutritional component is at least one selected from the group consisting of at least one protein component, at least one amino acid component, at least one vitamin component, at least one mineral component, at least one fiber component, at least one beneficial fat component, at least one phytosterol component, and at least one oxygen radical absorbance capacity-delivering component. According to another embodiment, the at least one amino acid component is at least one selected from the group consisting of tryptophan, threonine, isoleucine, leucine, lysine, methionine, cysteine, phenylalanine, tyrosine, valine, arginine, histidine, alanine, aspartic acid, glutamic acid, glycine, proline, and serine. According to another embodiment, the at least one vitamin component is at least one selected from the group consisting of vitamin C, thiamine, riboflavin, niacin, pantothenic acid, vitamin B6, biotin, folate, choline, betaine, vitamin B12, vitamin A, retinal, $\alpha$-carotene, $\beta$-cryptoxanthin, $\beta$-carotene, lycopene, leutein and zeaxanthin, vitamin E, $\alpha$-tocopherol, $\beta$-tocopherol, $\gamma$-tocopherol, $\delta$-tocopherol, vitamin D, and vitamin K. According to another embodiment, the at least one mineral component is at least one selected from the group consisting of calcium, iron, magnesium, phosphorus, potassium, sodium, zinc, copper, manganese, fluoride, and selenium. According to another embodiment, the at least one beneficial fat component is at least one beneficial fat component equivalent to the beneficial fat component of a fish oil, a vegetable oil, a plant oil, or a nut. According to another embodiment, the at least one phytosterol component is at least one selected from the group consisting of $\beta$-sitosterol, campesterol, stigmasterol, and brassicasterol. According to another embodiment, the at least one oxygen radical absorbance capacity-delivering component is at least one oxygen radical absorbance capacity delivering component equivalent to the oxygen radical absorbance capacity delivering component of an antioxidant, a spice, a berry, a legume, or a fruit. According to another embodiment, the berry is at least one selected from the group consisting of a grape, a blueberry, a cranberry, a blackberry, a raspberry, and a strawberry. According to another embodiment, the legume is at least one selected from the group consisting of a small red bean, a pinto bean, an artichoke, a Russert potato, and a black bean.

DETAILED DESCRIPTION

Glossary

The term "acceptable macronutrient distribution ranges" (AMDR) as used herein refers to the range of intake for a particular energy source that is associated with reduced risk of chronic disease while providing intake of essential nutrients. If an individual consumes in excess of the AMDR, there is a potential of increasing the risk of chronic diseases and/or insufficient intake of essential nutrients.

The term "acidulants" as used herein refers to a class of chemicals added to food products to increase their tartness or acidity.

The term "added sugars" as used herein refers to sugars and syrups that are included in foods during processing or preparation. Added sugars do not include naturally occurring sugars such as, for example, those that occur in milk and fruits.

The term "additive" as used herein refers to a substance appended or combined to a product in order to improve color, flavoring, texture or preservation, to change characteristics, or to aid processing.

The term "adequate intake" (AIs) as used herein refers to a recommended average daily nutrient intake level based on observed or experimentally determined approximations or estimates of mean nutrient intake by a group (or groups) of apparently healthy people. The AI is used when the Estimated Average Requirement (EAR) cannot be determined.

The term "ampule" as used herein refers to a small sealed vial.

The term "antioxidant" as used herein refers to a substance that inhibits oxidation or reactions promoted by oxygen or peroxides, thereby neutralizing the damaging effects of free radicals.

The term "basket" as used herein refers to any group of things, or different things, grouped together as a unit.

The term "basic food groups" refers to the categories of foods in the USDA food intake patterns. The basic food groups are grains; fruits; vegetables; milk, yogurt, and cheese; and meat, poultry, fish, dried peas and beans, eggs, and nuts. In the DASH Eating Plan, nuts seeds, and dry beans are a separate food group from meat, poultry, fish, and eggs.

The term "beneficial" as used herein refers to a compound, molecule, or substance that confers an advantage or is helpful in meeting health needs.

The term "beneficial fat component" generally refers to fats that are helpful to overall health. There is evidence from multiple studies supporting intake of recommended amounts of docosahexanoic acid (DHA) and eicosapentanoic acid (EPA) in the form of dietary fish or fish oil supplements lowers triglycerides, reduces the risk of death, heart attack, dangerous abnormal heart rhythms, and strokes in people with known cardiovascular disease, slows the buildup of atherosclerotic plaques, and lowers blood pressure slightly. Dietary sources of omega-3 fatty acids include fish oil and certain plant/nut oils. Fish oil contains both docosahexaenoic acid (DHA) and eicosapentaenoic acid (EPA), while some nuts (English walnuts) and vegetable oils (canola, soybean, flaxseed/linseed, olive) contain alpha-linolenic acid (ALA).

The term "beverage" as used herein refers to a solution ingested in a liquid form. A solution generally is considered as a homogeneous mixture of two or more substances; it is frequently, though not necessarily, a liquid. In a solution, the molecules of the solute (or dissolved substance) are uniformly distributed among those of the solvent. A suspension is a dispersion (mixture) in which a finely-divided species is combined with another species, with the former being so finely divided and mixed that it doesn't rapidly settle out. In everyday life, the most common suspensions are those of solids in liquid. The term "component" as used herein refers to a constituent part, element or ingredient The term "body mass index" (BMI) refers to a practical measure for approximating total body fat and is a measure of weight in relation to height. It is calculated as weight in kilograms divided by the square of height in meters.

The term "botanical raw material" as used herein refers to a fresh or processed (for example, cleaned, frozen, dried, sliced, dissolved, or liquefied) part of a single species of plant or a fresh or processed alga or microscopic fungus.

The term "botanical ingredient" as used herein refers to a component that originates from a botanical raw material.

The term "botanical product" as used herein refers to a finished, labeled product that contains vegetable matter, which may include plant materials, algae, macroscopic fungi, or combinations thereof. Depending in part on its intended use, a botanical product may be a food, drug, medical device or cosmetic.

The term "botanical extract" as used herein refers to a product prepared by separating, by chemical or physical process, medicinally active portions of a plant from the inactive or inert components.

The term "bracer" as used herein refers to substance that restores or increase vigor. As is commonly known in the art, bracers may be obtained by extraction from a natural source or may be synthetically produced. Non-limiting examples of bracers include methylxanthines, e.g., caffeine, theobromine, and theophylline. Additionally, numerous other xanthine derivatives have been isolated or synthesized, that may be utilized as a bracer in the compositions herein. See e.g., Bruns, Biochemical Pharmacology, Vol. 30, pp. 325-333 (1981) which describes, inter alia, xanthine, 9-methyl xanthine, 7-methyl xanthine, 3-methyl xanthine, 3,7-dimethyl xanthine, 8-chloromethyl-3,7-dimethyl xanthine, 8-hydroxymethyl-3,7-dimethyl xanthine, 3,7-diethyl xanthine, 3,7-bis-(2-hydroxyethyl)xanthine, 3-propyl-7-(dimethylaminoethyl)xanthine, 1-methyl xanthine, 1,9-dimethyl xanthine, 1-methyl-8-methylthio xanthine, 8-phenyl-1-methyl xanthine, 1,7-dimethyl xanthine, 1,7-dimethyl-8-oxo xanthine, 1,3-dimethyl xanthine, 1,3,9-trimethyl xanthine, 8-fluoro theophylline, 8-chloro theophylline, 8-bromo theophylline, 8-thio theophylline, 8-methylthio theophylline, 8-ethylthio theophylline, 8-nitro theophylline, 8-methylamino theophylline, 8-dimethylamino theophylline, 8-methyl theophylline, 8-ethyl theophylline, 8-propyl theophylline, 8-cyclopropyl theophylline, theophylline-8-propionate (ethyl ester), 8-benzyl theophylline, 8-cyclopentyl theophylline, 8-cyclohexyl theophylline, 8-(3-indolyl)theophylline, 8-phenyl theophylline, 9-methyl-8-phenyl theophylline, 8-(p-chlorophenyl)theophylline, 8-(p-bromophenyl)theophylline, 8-(p-methoxyphenyl)theophylline, 8-(p-nitrophenyl)theophylline, 8-(p-dimethylaminophenyl) theophylline, 8-(p-methylphenyl)theophylline, 8-(3,4-dichlorophenyl) theophylline, 8-(m-nitrophenyl)theophylline, 8-(o-nitrophenyl)theophylline, 8-(o-carboxyphenyl)theophylline, 8-(1-naphthyl)theophylline, 8-(2,6-dimethyl-4-hydroxyphenyl) theophylline, 7-methoxy-8-phenyl theophylline, 1,3,7-trimethyl xanthine, S-chloro caffeine, S-oxo caffeine, S-methoxy caffeine, S-methylamino caffeine, 8-diethylamino caffeine, 8-ethyl caffeine, 7-ethyl theophylline, 7-(2-chloroethyl)theophylline, 7-(2-hydroxyethyl)theophylline, 7-(carboxymethyl)theophylline, 7-(carboxymethyl)theophylline (ethyl ester), 7-(2-hydroxypropyl)theophylline, 7-(2,3-dihydroxypropyl)theophylline, 7-.beta.D-ribofuranosyl theophylline, 7-(glycero-pent-2-enopyranosyl)theophylline, 7-phenyl theophylline, 7,8-diphenyl theophylline, 1-methyl-3,7-diethyl xanthine, 1-methyl-3-isobutyl xanthine, 1-ethyl-3,7-dimethyl xanthine, 1,3-diethyl xanthine, 1,3,7-triethyl xanthine, 1-ethyl-3-propyl-7-butyl-8-methyl xanthine, 1,3-dipropyl xanthine, 1,3-diallyl xanthine, 1-butyl-3, 7-dimethyl xanthine, 1-hexyl-3,7-dimethyl xanthine, and 1-(5-oxohexyl)-3,7-dimethyl xanthine. Additionally, one or more bracers are present in, for example, coffee, tea, kola nut, cacao pod, mate, yaupon, guarana paste, and yoco. Natural plant extracts may be used as sources of bracers as they may contain other compounds that delay the bioavailability of the bracer. A commonly utilized methylxanthine is caffeine. Caffeine may be obtained from the aforementioned plants or, alternatively, may be prepared synthetically. Botanical sources of caffeine that may be utilized as a complete or partial source of caffeine include green tea, guarana, mate, black tea, cola nuts, cocoa, and coffee.

Bracers may be utilized in physiologically relevant amounts, which means that the sources used in the practice of this invention provide a safe and effective quantity. In some embodiments wherein a bracer is utilized in the present compositions, a composition comprises from about 0.0001% to about 1% of a bracer, by weight of the composition. In some such embodiments, a composition comprises from about 0.003% to about 0.5% of a bracer, by weight of the composition. In some such embodiments, a composition comprises from about 0.003% to about 0.2% of a bracer, by weight of the composition. In some such embodiments, a composition comprises from about 0.005% to about 0.02% of a bracer, by weight of the composition. As the skilled artisan will appreciate, the actual amount of bracer added will depend on its biological effect, for example, but not limited to, its effect on the mental alertness on the consumer.

The term "cardiovascular disease" refers to diseases of the heart and diseases of the blood vessel system (arteries, capillaries, veins) within a person's entire body, such as the brain, legs, and lungs.

The term "cholesterol" as used herein refers to a waxy steroid that modulates the fluidity of eukaryotic membranes and is the precursor of steroid hormones, such as progesterone, testosterone, aldosterone, estradiol and cortisol. It is a component of all eukaryotic plasma membranes, and is essential for the growth and viability of cells in higher organisms. The term "dietary cholesterol" refers to cholesterol consumed from foods of animal origin, including, but not limited to, meat, fish, poultry, eggs, and dairy products. Plant foods, such as grains, fruits and vegetables, and oils from these sources contain no dietary cholesterol. The term "Serum cholesterol" refers to cholesterol that travels in the blood in distinct particles containing both lipids and proteins. Three major classes of lipoproteins are found in the serum of a fasting individual: low-density lipoprotein (LDL), high-density lipoprotein (HDL), and very-low-density lipoprotein (VLDL). Another lipoprotein class, intermediate-density lipoprotein (IDL), resides between VLDL and LDL; in clinical practice, IDL is included in the LDL measurement.

The term "chronic" as used herein refers to having a long duration and a vague and indefinite termination.

The term "comestible" as used herein refers to a material that is suitable for human consumption, including a material that can be ingested by oral and by a non-oral means, for example, an inhalant or snuff.

The term "component" as used herein refers to a constituent part, element or ingredient.

The term "consume" as used herein means to eat or drink up; devour.

The term "contribution value" as used herein refers to the percentage of the total volume consumed of fruits and vegetables within a defined geographic area represented by a total volume consumed of a type of fruit or a type of vegetable.

The term "coronary heart disease" refers to disease due to a narrowing of the small blood vessels that supply blood and oxygen to the heart (coronary arteries).

The term "daily food intake pattern" as used herein refers to a form or convention that identifies the types and amounts of foods that are recommended to be eaten each day and that meet specific nutritional goals.

The term "dietary fiber" means nonstarch polysaccharides and lignin that are not digested by enzymes in the small intestine. Dietary fiber typically refers to nondigestable carbohydrates from plant foods. There are two general categories of dietary fiber: a water-soluble (meaning capable of being dissolved or liquefied in water) component and a water insoluble (meaning not capable of being dissolved or liquefied) component.

The terms "dietary supplement" and "nutritional supplement" are used interchangeably herein to mean (1) a product intended to supplement the diet that bears or contains one or more of the following dietary ingredients: [A] a vitamin, [B] a mineral, [C] a herb or other botanical, [D] an amino acid, [E] a dietary substance for use by man to supplement the diet by increasing the total dietary intake, or [F] a concentrate, metabolite, constituent, extract, or combination of any ingredient described in classes [A], [B]. [C], [D], or [E]; and (2) a product that (A)(i) is intended for ingestion; (B) is not represented for use as a conventional food or as a sole item of a meal or the diet; and (C) is labeled as a dietary supplement.

The term "dietary reference intake" (DRI) refers to a set of nutrient-based reference values that expand upon and replace the former Recommended Daily Allowances (RDAs) in the U.S. and the Recommended Nutrient Intake (RNI) in Canada. DRIs comprise a set of four reference values: estimated average requirements (EARs); RDAs; adequate intake (AI); and Tolerable Upper Intake Levels (ULs).

The term "diluent" as used herein refers to an agent used for making a substance thinner or less concentrated by admixture. Diluents typically are inactive ingredients. Diluents include, for example, but not limited to, water, starch, cellulose derivatives, and lubricants, such as magnesium stearate. A diluent may be referred to as a "diluting agent."

The terms "dilute" or "diluting" as used herein refers to the act or state of weakening, tempering, mitigating, diminishing, reducing in strength, force, or efficiency of by admixture.

The term "effervescent materials" refer to substances that dissolve or decompose to release gas bubbles in an aqueous solution.

The term "emulsion" as used herein refers to a colloid system in which both the dispersed phase and the dispersion medium are immiscible liquids where the dispersed liquid is distributed in small globules throughout the body of the dispersion medium liquid. A stable basic emulsion contains at least the two liquids and an emulsifying agent. Common types of emulsions are oil-in-water, where oil is the dispersed liquid and an aqueous solution, such as water, is the dispersion medium, and water-in-oil, where, conversely, an aqueous solution is the dispersed phase. It also is possible to prepare emulsions that are nonaqueous.

The term "enrich" and its various grammatical forms as used herein refers to the replacement of those essential nutrients (e.g., iron, thiamine, riboflavin, and niacin) removed in the processing and refining of grain products in accordance with a standard of identity as defined by food regulations.

The term "estimated average requirements" (EAR) refers to the average daily nutrient intake level estimated to meet the requirement of half the healthy individuals in a particular life stage and gender group.

The term "estimated energy requirement" (EER) refers to the average dietary energy intake that will maintain energy balance in a healthy person of a given gender, age, weight, height, and physical activity level.

The term "equivalent" as used herein means having similar or identical effects, or of being essentially equal to another.

The term "flavanols" as used herein refers to natural substances that may be extracted from, for example, but not limited to, fruits, vegetables, green tea or other natural sources known in the art by any suitable method known to those skilled in the art. The flavanols may be extracted from either a single plant or mixtures of plants. Examples of the most common flavanols extracted from tea plants and other members of the *Catechu gambit* (Uncaria family) include, for example, catechin, epicatechin, gallocatechin, epigallocatechin, epicatechin gallate, and epigallocatechin gallate. Alternatively, the flavanols may be prepared by synthetic manufacturing methods known in the art.

The term "free radical" as used herein refers to a highly reactive and usually short-lived molecular fragment with one or more unpaired electrons. Free radicals are highly chemically reactive molecules. Because a free radical needs to extract a second electron from a neighboring molecule to pair its single electron, it often reacts with other molecules, which initiates the formation of many more free radical species in a self-propagating chain reaction. This ability to be self-propagating makes free radicals highly toxic to living organisms. Oxidative injury may lead to widespread biochemical damage within the cell. The molecular mechanisms responsible for this damage are complex. For example, free radicals may damage intracellular macromolecules, such as nucleic acids (e.g., DNA and RNA), proteins, and lipids. Free radical damage to cellular proteins may lead to loss of enzymatic function and cell death. Free radical damage to DNA may cause problems in replication or transcription, leading to cell death or uncontrolled cell growth. Free radical damage to cell membrane lipids may cause the damaged membranes to lose their ability to transport oxygen, nutrients or water to cells.

The term "food" means any nourishing substance that is eaten, drunk, or otherwise taken into the body to sustain life, to provide energy, or to promote health.

The term "fortify" as used herein means to supplement or add nutrients to a food during food processing or to replace nutrients lost when a food product is produced or stored that may be lacking in the overall diet. Such nutrients include, but are not limited to, folate, vitamins A and D, and calcium. For example, when calcium is added to processed orange juice, the orange juice is said to be "fortified with calcium." Another example is adding folic acid to flour.

The term "functional food" as used herein refers to a food that can be beneficial to one's health by contributing nutritional value beyond the expected level of nutrients. These foods can make treatment and risk reduction claims, in addition to providing nutritional information.

The term "geographic area" as used herein refers to the natural features, population, industries, and the like, of a region of the Earth.

The term "health" or "healthy" as used herein refers to a general condition of the body or mind with references to soundness and vigor, as well as freedom from disease or ailment.

The term "masking agent" as used herein refers to any compound, substance, element or ingredient, or combination thereof, that impacts color, reduces unpleasant taste and/or odor, and increases palatability of a composition. Masking agents include, but are not limited to, coloring agents, flavoring agents, sweeteners, or fragrances, or combinations thereof.

The term "masking agent effective amount" as used herein refers to an amount of a masking agent adequate to accomplish an increase of palatability of a liquid composition.

The term "micronutrient" as used herein refers to vitamins and minerals that are required in the human diet in very small amounts.

The term "nutraceutical" as used herein refers to a food or naturally occurring food supplement thought to have a beneficial effect on human health or well-being. A nutraceutical also may be referred to as a botanical supplement, an ergogenic aid, a functional food, a herbal, a medical food, or a nutriceutical.

The term "nutrient" as used herein refers to a chemical compound that is found in food. Such chemical compounds include protein, fat, carbohydrate, a vitamin, or mineral. Nutrients are used by the body to function and maintain health.

The term "nutritional content" as used herein refers to the proportion of a nutrient present in a food. The phrase "detailed nutritional content" refers to the nutritional content of each nutritive component within a food. The phrase "total nutritional content" refers to the nutritional content of all the nutritive components within a food.

The term "nutritive value" as used herein means a value in sustaining human existence by such processes as promoting growth, replacing loss of essential nutrients, or providing energy. IFIS Dictionary of Food Sciences & Technology $2^{nd}$ ed.

The phrase "at least one serving of fruits and vegetables" as used herein means one serving comprising (i) at least one fruit; (ii) at least one vegetable, or (iii) at least one fruit and at least one vegetable.

The term "organoleptic" as used herein refers to any sensory properties of a product, involving taste, color, odor and feel.

The term "palatability" as used herein refers to the property of being acceptable to the taste or sufficiently agreeable in flavor to be eaten.

The term "phytochemical" refers to a substance that is derived from a plant. Phytochemicals generally are excellent dietary sources of phenolic metabolites.

The term "phytosterol" as used herein refers to any of various sterols obtained from plants.

The term "portion" as used herein refers to an amount of food served for one person.

The term "processing" as used herein refers to the treatment of a food substance in such a manner as to change its properties with a view to preserving it, to improving its quality or to making it functionally more useful.

The phrase "recommended daily allowance" (RDA) as used herein refers to the dietary intake level that is sufficient to meet the nutrient requirement of nearly all (97% to 98%) healthy individuals in a particular life stage and gender group.

The term "region" as used herein refers to an extensive, continuous part of a surface, space, or body.

The term "restoration" as used herein refers to the addition of a nutrient to a food in order to restore the original nutrient content.

The term "set" as used herein refers to a collection of objects, elements, or compounds classed together.

The phrase "set of nutritive components" refers to components with nutritive value. Components of nutritive value include, but are not limited to, a vitamin component, a mineral component, a protein component, a lipid component, and a carbohydrate component.

The term "stabilizer" as used herein refers to a substance or chemical that allows food ingredients, which do not mix well, to remain in a homogenous state after blending.

The term "standardization" as used herein refers to the addition of nutrients to foods to compensate for natural variation, so that a reference point against which other things can be evaluated is achieved.

The term "standard equivalent unit" for fruits and vegetables refers to the value calculated as follows: (1) the amount (g) of each nutritive component present in each of the fruits and vegetables consumed a defined geographic area is obtained; (2) the amount (g) of the nutritive component present in each fruit and vegetable consumed in the defined geographic area is multiplied by the percentage that fruit or vegetable, respectively, represents of the total fruits and vegetables consumed in the defined geographic area; and (3) the weighted values of each nutritive component independently as determined in Step (2) from all of the fruits and vegetables consumed in the defined geographic area are added to obtain the standard equivalent unit of each nutritive component for all fruits and vegetables consumed in the defined geographic area.

The term "starch" as used herein refers to a complex carbohydrate (polysaccharide) composed of chains of glucose molecules, which plants use to store food energy.

The term "sterol" as used herein refers to a steroid alcohol. A steroid is one of a group of polycyclic compounds closely related biochemically to terpenes. Steroids have as a common nucleus a fused, reduced, 17-carbon atom ring system. Steroids, which are classified as lipids because of their solubility in organic solvents and insolubility in water, include cholesterol, numerous hormones, precursors of certain vitamins, bile acids, and certain natural drugs and poisons. Sterols contain the common steroid nucleus plus an 8- to 10-carbon-atom sidechain and a hydroxyl group. Sterols are widely distributed in plants (e.g., campesterol, stimasterol, beta-sitosterol), animals (e.g. cholesterol), and fungi (e.g. ergosterol)

The term "sucrose" as used herein refers to a sugar composed of two molecules, one glucose molecule and one fructose molecule.

The term "supplement" as used herein refers to a nutrient that may be added to the diet to increase the intake of that nutrient.

The term "supplementation" as used herein refers to the addition of nutrients that are not normally present or are present in only minute quantities in the food.

The term "serving size" as used herein refers to a standardized amount of a food used in providing dietary guidance or in making comparisons among similar foods. Serving sizes can be measured in amounts such as, but not limited to, a cup, or an ounce.

The term "substance" as used herein means a specific food or component of food, regardless of whether the food is in conventional food form or as a dietary supplement that includes vitamins, minerals, herbs, or other similar nutritional substances.

The term "synthetic" as used herein means made by combining parts to make a whole.

The term "viscosity" as used herein refers to the measure of the thickness or resistance of a fluid to flow. Liquids with a high viscosity are usually very thick and flow very slowly, while low viscosity liquids generally are thin and flow quickly.

The term "water soluble" as used herein refers to capable of being dissolved in water to form a homogeneous solution.

The term "weighted" as used herein means adjusted or adapted to a representative value.

The term "well-being" as used herein refers to a subject's physical and mental soundness.

The term "whole grains" as used herein refers to food made from the entire grain seed (kernel), which consists of the bran, germ, and endosperm. If the kernel has been cracked, crushed, or flaked, it must retain nearly the same relative proportions of bran, germ, and endosperm as the original grain in order to be called whole grain.

1. Standard Equivalent Unit of Fruits and Vegetables

According to one aspect, the described invention provides a method to determine a standard equivalent unit of nutrition in one serving of a weighted composition comprising a basket of fruits and vegetables representing at least 85% of all fruits and vegetables consumed in a defined geographic area, the method comprising the steps:

(a) identifying each fruit and each vegetable consumed by humans within the defined geographic area that when combined represent at least 85% of a total volume of fruits and vegetables consumed by humans within the defined geographic area;

(b) determining a contribution value for each fruit and each vegetable relative to the total volume of fruits and vegetables consumed as identified in (a), (c) determining a portion size of each fruit and each vegetable of (a);

(d) determining a total nutritional content of the portion size of each fruit and each vegetable of (c); and (e) calculating a standard equivalent unit of the nutritional value of one portion of each fruit and each vegetable by multiplying the contribution of each fruit and each vegetable in (b) by the total nutritional content of the portion size of each fruit and each vegetable in (d).

The total amount of fruits and vegetables consumed by humans within a geographic area may be acquired from public data repositories, such as, for example, those maintained by the USDA. Such amounts should be representative of at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, at least about 99%, about 100% of the total fruits and vegetables consumed in the geographic area.

According to another embodiment, step (c) further comprises determining a portion size of each fruit and each vegetable of step (b), wherein the portion size excludes non-edible components. Such non-edible components of each fruit and each vegetable include, but are not limited to, a peel, a rind, a root, a seed, a leaf, a pit, a husk, a stem, and the like. Portion sizes generally are described as a recommended daily allowance (RDA) by the USDA (http://www.ars.usda.gov/ba/bhnrc/ndl).

According to another embodiment, step (d) further comprises determining the nutritional content of each nutritional component of the portion. According to some such embodiments, the nutritional components of the portion size comprises at least one protein, at least one amino acid, at least one dietary fiber, at least one beneficial fat, at least one mineral, at least one vitamin, and at least one antioxidant.

According to some such embodiments, the nutritive component of the portion size of each fruit and each vegetable comprises a protein or at least one amino acid selected from the group consisting of tryptophan, threonine, isoleucine, leucine, lysine, methionine, cysteine, phenylalanine, tyrosine, valine, arginine, histidine, alanine, aspartic acid, glutamic acid, glycine, proline, and serine.

According to some such embodiments, the nutritive component of the portion size of each fruit and each vegetable is at least one vitamin selected from the group consisting of vitamin C, thiamine, riboflavin, niacin, pantothenic acid, vitamin B6, biotin, folate, choline, betaine, vitamin B12, vitamin A, retinol, α carotene, β-cryptoxanthin, β-carotine, lycopene, leutein and zeaxanthin, vitamin E, α-tocopherol, β-tocopherol, γ-tocopherol, δ-tocopherol, vitamin D, and vitamin K.

According to some such embodiments, the nutritive component of the portion size of each fruit and each vegetable comprises at least one mineral selected from the group consisting of calcium, iron, magnesium, phosphorus, potassium, sodium, zinc, copper, manganese, fluoride, and selenium.

According to some such embodiments, the nutritive component of the portion size of each fruit and each vegetable comprises at least one fiber component selected from the group consisting of a water soluble fiber and a water-insoluble fiber.

According to some such embodiments, the nutritive component of the portion size of each fruit and each vegetable comprises at least one beneficial fat component equivalent to the beneficial fat component of a fish oil, a vegetable oil, a plant oil, or a nut.

According to some such embodiments, the nutritive component of the portion size of each fruit and each vegetable comprises at least one phytosterol component. According to some such embodiments, the at least one phytosterol component is selected from the group consisting of β-sitosterol, campesterol, stigmasterol, and brassicasterol.

According to some such embodiments, the nutritive component of the portion size of each fruit and each vegetable comprises at least one oxygen radical absorbance capacity-delivering component equivalent to the oxygen radical absorbance capacity-delivering component(s) of an antioxidant, a spice, a berry, a legume, or a fruit. According to some such embodiments, the berry is at least one selected from the group consisting of a grape, a blueberry, a cranberry, a blackberry, a raspberry, and a strawberry. According to some such embodiments, the legume is at least one selected from the group consisting of a small red bean, a pinto bean, an artichoke, a Russert potato, and a black bean.

Artisans skilled in the art will appreciate that the SFV may change periodically due to changes in consumption patterns and to include newly discovered nutrients.

According to some such embodiments, the nutritive component of the portion size of each fruit and each vegetable comprises at least one nutritive component equivalent to a carbohydrate, a sugar, or a starch.

According to another embodiment, the calculating of the standard equivalent unit of the nutritional value in (e) is performed by a computer or processor.

According to some embodiments, the at least one fruit is at least one fruit selected from the group consisting of an orange, an apple, a banana, a grape, a peach, a lemon, a pear, a plum, an avocado, a melon, a cherry, and a kiwi.

According to some embodiments, the at least one vegetable is at least one vegetable selected from the group consisting of a potato, a tomato, a sweet corn, a lettuce, an onion, a carrot, a snap bean, a broccoli, a bell pepper, a celery, a pumpkin, a squash, a mushroom, a garlic, a cauliflower, a spinach, an asparagus, and a radish.

2. Fortification of Food and Beverage Products

According to another aspect, the described invention provides a method to fortify a base food so that the base food contains a nutritional content equal to a desired total target nutritional content of fruits and vegetables, the method comprising the steps:

(a) establishing nutritional content of the base food;
(b) converting the nutritional content in (a) to a standard equivalent unit of nutritional value of at least one serving of fruits and vegetables that is present in the base food;
(c) selecting a target multiple of standard equivalent units of nutritional value of fruits and vegetables of the at least one serving in (b),
(d) multiplying the target multiple of standard equivalent units of nutritional value of fruits and vegetables determined in (c) by the standard equivalent unit of nutritional value of (b) to arrive at a desired total target nutritional content;
(e) subtracting the nutritional content of the base food of (a) from the desired total target nutritional content in (d) to determine a nutritional gap;
(f) fortifying the base food by adding at least one nutritional component to fill the nutritional gap (e),
thereby providing the base food with the nutritional content equal to the desired total target nutritional content.

According to one embodiment, the base food is a beverage. According to another embodiment, the base food is a fresh food, meaning, for example, a food that is not preserved by canning, dehydration, freezing, or smoking. According to another embodiment, the base food is a processed food, meaning, for example, a food that has been canned, frozen, refrigerated, dehydrated, smoked, or and aseptically processed. According to another embodiment, the base food is a natural food, meaning a food that is minimally processed, for example, a food that does not include ingredients such as refined sugars, refined flours, milled grains, hydrogenated oils, sweeteners, food colors, or flavorings.

According to some embodiments, the nutritional component of (f) is a protein or at least one amino acid selected from the group consisting of tryptophan, threonine, isoleucine, leucine, lysine, methionine, cysteine, phenylalanine, tyrosine, valine, arginine, histidine, alanine, aspartic acid, glutamic acid, glycine, proline, and serine.

According to some embodiments, the nutritional component of (f) is at least one vitamin selected from the group consisting of vitamin C, thiamine, riboflavin, niacin, pantothenic acid, vitamin B6, biotin, folate, choline, betaine, vitamin B12, vitamin A, retinol, α carotene, β-cryptoxanthin, β-carotene, lycopene, leutein and zeaxanthin, vitamin E, α-tocopherol, β-tocopherol, γ-tocopherol, δ-tocopherol, vitamin D, and vitamin K.

According to some embodiments, the nutritional component of (f) is at least one mineral selected from the group consisting of calcium, iron, magnesium, phosphorus, potassium, sodium, zinc, copper, manganese, fluoride, and selenium.

According to some embodiments, the nutritional component of (t) is at least one fiber component selected from the group consisting of a water soluble fiber and a water-insoluble fiber.

According to some embodiments, the nutritional component of (f) is at least one beneficial fat component equivalent to the beneficial fat component of a fish oil, a vegetable oil, a plant oil, or a nut.

According to some embodiments, the nutritional component of (f) is at least one phytosterol component comprises at least one phytosterol selected from the group consisting of β-sitosterol, campesterol, stigmasterol, and brassicasterol.

According to some embodiments, the nutritional component of (f) is at least one oxygen radical absorbance capacity-delivering component equivalent to the oxygen radical absorbance capacity-delivering component(s) of an antioxidant, a spice, a berry, a legume, or a fruit. According to some such embodiments, the berry is at least one selected from the group consisting of a grape, a blueberry, a cranberry, a blackberry, a raspberry, and a strawberry. According to some such embodiments, the legume is at least one selected from the group consisting of a small red bean, a pinto bean, an artichoke, a Russert potato, and a black bean.

According to another embodiment, the at least one nutritional component of (f) is a supplement. According to another embodiment, the at least one nutritional component of (f) is an additive. According to another embodiment, the at least one component of (f) is in the form of a powder. According to another embodiment, the at least one component of (f) is in the form of a liquid. According to another embodiment, the at least one component of (f) is in the form of a semi-solid.

According to another embodiment, fortifying step (f) is by mixing.

According to another embodiment, fortifying step (f) is by blending.

2.1. Organoleptic Properties

According to another embodiment, the organoleptic properties of the fortified based food of step (f) are equivalent to (meaning having comparable qualities; interchangeable with) the organoleptic properties of the nonfortified base food.

2.1.1. Sensory Properties

The attributes of a food item typically are perceived in the following order: appearance; odor, aroma and fragrance; consistency and texture; and flavor (aromatics, chemical feelings, taste). However, in the process of perception, most or all of the attributes overlap. Flavor is the combined impression perceived via the chemical senses from a product in the mouth, i.e., it does not include appearance and texture. The term "aromatics" as used herein is used to indicate those volatile constituents that originate from food in the mouth and are perceived by the olfactory system via the posterior nares (a pair of posterior internal openings in the nasal cavity connecting it with the nasopharynx and allowing the inhalation and exhalation of air).

(i) Appearance

Many consumers rely on the appearance of a product and/or packaging on which to base a decision to purchase or consume a product. General appearance characteristics include color, size and shape, surface texture, clarity, and carbonation.

The term "color" as used herein refers to the quality of an object or substance with respect to light reflected or absorbed by the object or substance. Color involves both physical and psychological components: the perception by the visual system of light of wavelengths 400-500 nm (blue), 500-600 nm (green and yellow), and 600-800 nm (red. The three characteristics of color are hue, intensity, and value. "Hue" refers to a gradation, tint, or variety of a color. "Intensity", "chroma", and "saturation" are used interchangeably to refer to the strength or sharpness of a color. A color is full in intensity only when pure and unmixed. "Value" refers to a degree of lightness or darkness in a color. The evenness of color, as opposed to uneven or blotchy appearance, is important. Deterioration of food often is accompanied by a color change.

Changes in normal size and shape characteristics, including length, thickness, width, particle size, geometric shape (square, circular), distribution of pieces (for example, of vegetables, pasta, prepared foods) frequently are indicative of defects in a food product.

The term "surface texture" refers to the dullness versus shininess or roughness versus evenness of a surface.

The term "clarity" refers to a haziness or opacity of transparent liquids or solids, or the presence or absence of particles of visible size.

"Carbonation", for carbonated beverages, refers to the degree of effervescence observed on pouring. This is commonly measured with Zahm-Nagel instruments and may be judged according to the following table:

| Carbonation (Vols) | Carbonation (% weight) | Degree of Effervescence | Examples |
|---|---|---|---|
| 1.5 or less | 0.27 or less | None | Still drinks |
| 1.5-2.0 | 0.27-0.36 | Light | Fruit drinks |
| 2.0-3.0 | 0.36-0.54 | Medium | Beer, cider |
| 3.0-4.0 | 0.54-0.72 | High | Soft drinks, champagne |

According to another embodiment, the organoleptic properties of the fortified base food of (f) are equivalent to the organoleptic properties of the nonfortified base food, wherein the organoleptic property is appearance.

According to another embodiment, the organoleptic properties of the fortified base food of (f) are equivalent to the organoleptic properties of the nonfortified base food, wherein the organoleptic property is at least one organoleptic property selected from the group consisting of color, size and shape, surface texture, clarity, and carbonation.

(ii) Odor, Aroma and Fragrance

Odor of a product is detected when its volatiles enter the nasal passage, and they are perceived by the olfactory system. Odor is discussed when the volatiles are sniffed through the nose (voluntarily or otherwise). "Aroma" is the odor of a food product, and "fragrance" is the odor of a perfume or cosmetic.

The amount of volatiles that escape from a product is affected by the temperature and the nature of the volatile compounds. The vapor pressure of a substance exponentially increases with temperature according to the formula:

$$\log p = -0.5223a/T + b$$

where p is the vapor pressure (mmHg), T is the absolute temperature (T=t° C.+273.1), and a and b are substance constants that can be found in handbooks or other public databases. Volatility also is influenced by the condition of a surface; at a given temperature, more volatiles escape from a soft, porous, and humid surface than from a hard, smooth, and dry one.

Many odors only are released when an enzymatic reaction takes place at a freshly cut surface (such as, for example, an onion). Odorous molecules must be transmitted by a gas that can be the atmosphere, water vapor, or an industrial gas, and the intensity of the perceived odor is determined by the proportion of such gas that comes into contact with the observer's olfactory receptors.

According to another embodiment, the organoleptic properties of the fortified based food of step (f) are equivalent to the organoleptic properties of the nonfortified base food of (a), wherein the organoleptic property is odor.

(iii) Consistency and Texture

Another set of attributes to be considered are those perceived by sensors in the mouth other than taste and chemical feelings. By convention, the following are referred to: viscosity (for homogenous Newtonian liquids), consistency (for non-Newtonian or heterogeneous liquids and semisolids), and texture (for solids or semisolids).

Viscosity is the resistance of a liquid to shear forces and hence to flow. It can be measured accurately, and varies from a low of approximately 1 centipoise (cP) for water or beer, to greater than 1000 cP for jelly-like products. Consistency (of fluids, such as, but not limited to, for example, purees, sauces, juices, syrups, jellies), in principle must be measured by sensory evaluation.

Texture can be defined as a sensory manifestation of the structure or inner makeup of products in terms of their 1) reaction to stress, measured as mechanical properties (such as, but not limited to, hardness, firmness, adhesiveness, cohesiveness, gumminess, springiness, resilience, viscosity) by the kinesthetic sense in the muscles of the hand, fingers, tongue, jaw or lips; and 2) tactile feel properties, measured as geometrical particles (such as, but not limited to, grainy, gritty, crystalline, flaky) or moisture properties (such as, but not limited to, wetness, oiliness, moistness, dryness) by the tactile nerves in the surface of the skin of the hand, lips, or tongue.

According to another embodiment, the organoleptic properties of the fortified based food of step (f) are equivalent to the organoleptic properties of the nonfortified base food of (a), wherein the organoleptic property is consistency.

According to another embodiment, the organoleptic properties of the fortified based food of step (f) are equivalent to the organoleptic properties of the nonfortified base food of (a), wherein the organoleptic property is texture.

According to another embodiment, the organoleptic properties of the fortified based food of step (f) are equivalent to the organoleptic properties of the nonfortified base food of (a), wherein the organoleptic property is viscosity.

2.1.2. Perception at Threshold and Above

A "threshold" is not a constant for a given substance, but rather, a constantly changing point on the sensory continuum from nonperceptible to easily perceptible. Thresholds change with moods, the time of the biorhythm, and with hunger and satiety. Compounds with identical thresholds can show very different rates of increase in intensity with concentration; therefore, the threshold's use as a measure of intensity of perception must be used cautiously. In practical studies involving products that emit mixtures of large numbers of flavor-active substances, where the purpose is to detect those compounds that play a role in the flavor of the product, the threshold has some utility, provided the range covered does not extend too far from the threshold, for example from 0.5-fold threshold to 3-fold threshold. Above this range, intensity of odor or taste is measured by scaling.

2.1.3. Measuring Sensory Response

The most frequently used methods of measuring sensory response to a sample are, in order of increasing complexity: 1) classification; the items evaluated are sorted into groups which differ in a nominal manner (for example, marbles sorted by color); 2) grading; time-honored methods used in commerce which depend on expert graders who learn their craft from other graders (for example, "USDA Choice" grade of meat); 3) ranking, whereby samples (usually 3 to 7) are arranged in order of intensity or degree of some specified attribute (the scale used is ordinal); and 4) scaling; whereby subjects judge the sample by reference to a scale of numbers (often from 0 to 10) that they have been trained to use. Category scaling yields ordinal data or sometimes interval data, line scales usually yield interval data, and magnitude estimation, although designed to yield ratio data, in practice seems to produce mixed interval/ratio data.

In choosing among these methods and training a sensory evaluation panel to use them, the practicing panel leader needs to address the two major sources of variation in panel data: 1) the differences in the perceptions of test subjects to the stimulus, and 2) the differences in the expression of those perceptions by the subject.

Actual differences in perception are part of the considerable variability in sensory data. Sensory thresholds vary from one person to another. For example, studies of the differences in thresholds for substances added to beer have reported that panels of 20 trained testers tend to contain two testers who exhibit a threshold four times lower than the median for the panel, and two testers who exhibit threshold five times higher than the median. For panels of 200-plus healthy but untrained individuals, studies involving solutions of pure compounds in water have reported differences of 1000-fold between the most and the least sensitive, excluding anosmics (meaning those who have an inability to detect or recognize any odor at any concentration). It follows that the verdict of a small panel of 4 to 7 people can be highly variant with respect to the general population, hence panel sizes of at least 20-30 people are recommended. A small panel is representative only of itself or the population it was specifically screened to represent.

The second source of variation, the way in which the subjects express a given sensory impression, can be many times greater again, but can be minimized by thorough training and by careful selection of the terminology and scaling techniques provided to panelists.

In choosing a way of measuring responses, the sensory analyst generally should select the simplest sensory method that will measure the expected differences between the samples, thus minimizing panel training time.

(i) Sensory Evaluation Models

Mathematical models of ligand and receptor binding are extremely important in reaching an understanding of the mechanisms involved in a wide range of important biological processes. In the area of taste, Beidler developed a theory of stimulation in which the neural response is modeled as a function of stimulus concentration, and proposed a binary mixture equation for two taste substances, A and B:

$$P = K_1[A_m]P_A + K_2[B_m]P_B / 1 + K_1[A_m] + K_2[B_m]$$

where P is neural response to the mixture; $[A_m]$ and $[B_m]$ are the concentrations of compounds A and B in the mixture respectively; $P_A$ and $P_B$ are the maximum responses to A and B respectively; and $K_1$ and $K_2$ are the association constants for A and B respectively.

Beilder's mixture model assumes (i) that a single stimulant molecule binds to a single receptor and (ii) that when more than one type of molecule may bind to the same type of receptor, competition for the site occurs. According to Beidler's model, the mixture concentration leading to a response equal to the response evoked by particular concentrations of the compounds alone can be computed from a linear equation involving the mixture's components and the ratio of the concentrations of these individual compounds. This ratio is the relative effectiveness of the compounds in eliciting a response to a particular target concentration of one of the compounds.

(ii) Classification

In classification tests, the subjects are asked to select an attribute or attributes that describe the stimulus. In a beverage test, for example, subjects place a mark next to the term(s) (such as, for example, sweet, sour, lemony, blended, thick, refreshing, pulpy, natural, aftertaste) that best describe(s) the sample. No attempt is made to standardize the terms, and the results are reported as the number of check marks for each term. Such data are nominal; no numbers are used, and there is no increasing or decreasing series expressed in the data. For example, the apples in a lot may be characterized by predominant color (red, green, and yellow).

The proper selection of the proper terms is essential for the correct interpretation of the description of the stimulus. Selection of the best possible terminology is not only important in classification tests, but also in all measuring techniques that use a term or descriptor to define the perceived property being investigated.

The selection of sensory attributes and the corresponding definition of these attributes should be related closely to the real chemical and physical properties of a product that can be perceived. Adherence to an understanding of the actual rheology (of or relating to the flow of matter) or chemistry of a product makes the data easier to interpret and more useful for decision making. However, several caveats must be considered including: 1) if a product has noticeable defects, such as staleness or rancidity, and terms to describe such defects have not been included in the list, panelists will use another term in the list to express the off-note; 2) if a list of terms provided to panelists fails to mention some attribute that describes real differences between products, or which describes important characteristics in one product, panelists again will use another term from the list provided to express what they perceive; 3) it follows that if results are to be useful, selection of terms for classification (and scaling) must be based on actual product characteristics. This in turn requires preexamination of the samples by a well-trained panel to ensure that all appropriate attributes are listed.

(iii) Grading

Grading is a method of evaluation used frequently in commerce that depends on expert "graders" who learn the scale used from other graders. Scales usually have four or five steps such as "Choice," "Extra," "Regular," and "Reject." Examples of items subjected to sensory grading are coffee, tea, spices, butter, fish, and meat.

Sensory grading most often involves a process of integration of perceptions by the grader. The grader is asked to give one overall rating of the combined effect of the presence of the positive attributes, the blend or balance of those attributes, the absence of negative characteristics, and/or the comparison of the products being graded with some written or physical standard.

Grading systems suffer from the considerable drawback that statistical correlation with measurable physical or chemical properties is difficult or impossible. Consequently, many of the time-honored grading scales are being replaced.

(iv) Ranking

In ranking, subjects receive three or more samples that are to be arranged in order of intensity or degree of some specified attribute. For example, four samples of yogurt may be ranked for degree of sensory acidity, or five samples of breakfast cereal may be ranked for preference.

For each subject, the sample ranked first is accorded a "1," that ranked second a "2," and so on. The rank numbers received by each sample are summed, and the resulting rank sums indicate that overall rank order of the samples. Rank orders cannot meaningfully be used as a measure of intensity, but they are amenable to significance tests (such as $\chi^2$-test and Friedman's test).

Ranking tests are rapid and demand relatively little training, although it should not be forgotten that the subjects must be thoroughly familiarized with the attribute under test. Ranking tests have wide application, but with sample sets above three, they do not discriminate as well as tests based on the use of scales.

(v) Scaling

Scaling techniques involve the use of numbers or words to express the intensity of a perceived attribute (sweetness, hardness, smoothness) or a reaction to such attribute (for example, too soft, just right, too hard). If words are used, the analyst may assign numerical values to the words (for example, like extremely=0, dislike extremely=1) so that the data can be treated statistically. The validity and reliability of a scaling technique are highly dependent upon 1) the selection of a scaling technique that is broad enough to encompass the full range of parameter intensities and that also has enough discrete points to pick up all the small differences in intensity between samples; 2) the degree to which the panel has or has not been taught to associate a particular sensation (and none other) with the attribute being scaled; 3) the degree to which the panel has or has not been trained to use the scale in the same way across all samples and across time.

Compared with difference testing, scaling is a more informative form of recording the intensity of perception. As with ranking, the results are critically dependent on how well the panelists have been familiarized with the attribute under test and with the scale being used.

A common problem with scales is that panelists tend to use only the middle section of the scale. For example, if ciders are judged for intensity of "appley" flavor on a scale of 0-9, subjects will avoid the numbers 0, 1, and 2 because they tend to keep these in reserve for hypothetical samples of very low intensity, which may never come. Likewise, the numbers 7, 8, and 9 are avoided in anticipation of future samples of very high intensity, which may never come. The result is that the scale is distorted. For example, a cider of outstanding apple intensity may be rated 6.8 by the panel while a cider that is only just above the average may receive a 6.2.

Although properties of data obtained from any response scale may vary with the circumstances of the test (for example, experience of judges in the test, familiarity of the attribute), it typically is assumed that: 1) category scaling (ISO term: rating) yields ordinal or interval data; 2) line scaling (ISO term: scoring) yields interval data; and 3) magnitude estimation scaling (often called "ratio scaling") sometimes, but not always, yields ratio data.

According to another embodiment, the fortified base food of step (f) and the nonfortified base food of (a) elicit an equivalent sensory response when compared to each other. According to some such embodiments, the fortified base food of step (f) and the nonfortified base food of step (a) elicit an equivalent classification when compared to each other. According to some such embodiments, the fortified base food of step (b) and the nonfortified base food of step (a) elicit an equivalent grading when compared to each other. According to some such embodiments, the fortified base food of step (f) and the nonfortified base food of step (a) elicit an equivalent scale when compared to each other.

According to another embodiment, the organoleptic properties are at least one organoleptic property selected from the group consisting of appearance, odor, aroma, fragrance, consistency, and texture.

According to another embodiment, step (f) further comprises adding a masking agent.

According to another embodiment, step (f) further comprises adding a flavoring agent.

According to another embodiment, step (d) further comprises adding a coloring agent.

3. Fortified Comestible

According to another aspect, the described invention provides a fortified comestible comprising a standard equivalent unit of the nutritional value of at least one serving of (i) at least one fruit, (ii) at least one vegetable, or (iii) at least one fruit and at least one vegetable, wherein the fortified comestible has organoleptic characteristics equivalent to the organoleptic characteristics of a base comestible.

According to one embodiment, the at least one fruit is an orange. According to another embodiment, the at least one fruit is an apple. According to another embodiment, the at least one fruit is a banana. According to another embodiment, the at least one fruit is a grape. According to another embodiment, the at least one fruit is a peach. According to another embodiment, the at least one fruit is lemon. According to another embodiment, the at least one fruit is pear. According to another embodiment, the at least one fruit is a plum. According to another embodiment, the at least one fruit is an avocado. According to another embodiment, the at least one fruit is a melon. According to another embodiment, the at least one fruit is a cherry. According to another embodiment, the at least one fruit is a kiwi.

According to some embodiments, the at least one fruit is at least one fruit selected from the group consisting of an orange, an apple, a banana, a grape, a peach, a lemon, a pear, a plum, an avocado, a melon, a cherry, a kiwi, and combination(s) thereof.

According to another embodiment, the at least one vegetable is a potato. According to another embodiment, the at least one vegetable is a tomato. According to another embodiment, the at least one vegetable is a sweet corn. According to another embodiment, the at least one vegetable is lettuce. According to another embodiment, the at least one vegetable is an onion. According to another embodiment, the at least one vegetable is a carrot. According to another embodiment, the at least one vegetable is a snap bean. According to another embodiment, the at least one vegetable is a broccoli. According to another embodiment, the at least one vegetable is a bell pepper. According to another embodiment, the at least one vegetable is celery. According to another embodiment, the at least one vegetable is a pumpkin. According to another embodiment, the at least one vegetable is a squash. According to another embodiment, the at least one vegetable is a mushroom. According to another embodiment, the at least one vegetable is garlic. According to another embodiment, the at least one vegetable is a cauliflower. According to another embodiment, the at least one vegetable is a spinach. According to another embodiment, the at least one vegetable is an asparagus. According to another embodiment, the at least one vegetable is a radish.

According to some embodiments, the at least one vegetable is at least one vegetable selected from the group consisting of a potato, a tomato, sweet corn, lettuce, an onion, a carrot, a snap bean, a broccoli, a bell pepper, celery, a pumpkin, a squash, a mushroom, garlic, a cauliflower, a spinach, an asparagus, a radish and combination(s) thereof.

According to another embodiment, the fortified base comestible and the nonfortified base comestible elicit an equivalent sensory response when compared to each other. According to some such embodiments, the fortified base comestible and the nonfortified base comestible elicit an equivalent classification when compared to each other. According to some such embodiments, the fortified base comestible and the nonfortified base comestible elicit an equivalent grading when compared to each other. According to some such embodiments, the fortified base comestible and the nonfortified base comestible elicit an equivalent scale when compared to each other.

According to another embodiment, the organoleptic properties of the fortified based comestible are equivalent to the organoleptic properties of the nonfortified base comestible, wherein the organoleptic property is consistency.

According to another embodiment, the organoleptic properties of the fortified based comestible are equivalent to the organoleptic properties of the nonfortified base comestible, wherein the organoleptic property is texture.

According to another embodiment, the organoleptic properties of the fortified based comestible are equivalent to the organoleptic properties of the nonfortified base comestible, wherein the organoleptic property is viscosity.

According to another embodiment, the organoleptic properties of the fortified based comestible are equivalent to the organoleptic properties of the nonfortified base comestible, wherein the organoleptic property is odor.

According to another embodiment, the organoleptic properties of the fortified based comestible are equivalent to the organoleptic properties of the nonfortified base comestible, wherein the organoleptic property is appearance.

According to another embodiment, the organoleptic properties of the fortified based comestible are equivalent to the organoleptic properties of the nonfortified base comestible, wherein the organoleptic property is at least one organoleptic property selected from the group consisting of color, size and shape, surface texture, clarity, and carbonation.

4. Nutritional Supplement and/or Food Additive

Food supplements serve to add nutrients to the daily diet, particularly in cases where the intake of nutrients from the diet is insufficient or where consumers consider that their diet requires such supplementation for specific needs.

Vitamin and mineral food supplements generally derive their nutritional relevance primarily from the minerals and/or vitamins they contain. These supplements are sources in concentrated forms of those nutrients alone or in combinations. They are marketed in forms such as, for example, tablets, capsules, powders, and solutions, that are designed to be taken in measured small-unit quantities, but are not in a conventional food form. The purpose of vitamin and mineral food supplements is to supplement the intake of vitamins and/or minerals obtained from the normal diet.

The described invention provides a nutritional supplement and/or food additive comprising a set of nutritive components, wherein the set of nutritive components provides at least one standard equivalent unit of nutrition present in one serving of a composition comprising at least one fruit and at least one vegetable.

According to one aspect, the described invention provides a nutritional supplement comprising a weighted average set of nutritive components, comprising at least one protein component, at least one vitamin component, at least one mineral component, at least one fiber component, at least one beneficial fat component, at least one phytosterol, and at least one oxygen radical absorbance capacity (ORAC)-delivering component, wherein the weighted average set of nutritive components provide at least one standard equivalent unit of nutrition present in one serving of a composition comprising at least one fruit and at least one vegetable without affecting at least one organoleptic property of a food to which the nutritional supplement or food additive has been added.

According to one embodiment, the at least one fruit is an orange. According to another embodiment, the at least one fruit is an apple. According to another embodiment, the at least one fruit is a banana. According to another embodiment, the at least one fruit is a grape. According to another embodiment, the at least one fruit is a peach. According to another embodiment, the at least one fruit is lemon. According to another embodiment, the at least one fruit is pear. According to another embodiment, the at least one fruit is a plum.

According to another embodiment, the at least one fruit is an avocado. According to another embodiment, the at least one fruit is melon. According to another embodiment, the at least one fruit is a cherry. According to another embodiment, the at least one fruit is a kiwi.

According to some embodiments, the at least one fruit is at least one fruit selected from the group consisting of an orange, an apple, a banana, a grape, a peach, a lemon, a pear, a plum, an avocado, a melon, a cherry, a kiwi, and combination(s) thereof.

According to another embodiment, the at least one vegetable is a potato. According to another embodiment, the at least one vegetable is a tomato. According to another embodiment, the at least one vegetable is a sweet corn. According to another embodiment, the at least one vegetable is lettuce. According to another embodiment, the at least one vegetable is an onion. According to another embodiment, the at least one vegetable is a carrot. According to another embodiment, the at least one vegetable is a snap bean. According to another embodiment, the at least one vegetable is a broccoli. According to another embodiment, the at least one vegetable is a bell pepper. According to another embodiment, the at least one vegetable is celery. According to another embodiment, the at least one vegetable is a pumpkin. According to another embodiment, the at least one vegetable is a squash. According to another embodiment, the at least one vegetable is a mushroom. According to another embodiment, the at least one vegetable is garlic. According to another embodiment, the at least one vegetable is a cauliflower. According to another embodiment, the at least one vegetable is a spinach. According to another embodiment, the at least one vegetable is an asparagus. According to another embodiment, the at least one vegetable is a radish.

According to some embodiments, the at least one vegetable is at least one vegetable selected from the group consisting of a potato, a tomato, sweet corn, lettuce, an onion, a carrot, a snap bean, a broccoli, a bell pepper, celery, a pumpkin, a squash, a mushroom, garlic, a cauliflower, a spinach, an asparagus, a radish and combination(s) thereof.

According to another embodiment, the at least one protein component of the set of nutritive components comprises at least one amino acid. According to some such embodiments, the at least one amino acid is tryptophan. According to some such embodiments, the at least one amino acid is threonine. According to some such embodiments, the at least one amino acid is isoleucine. According to some such embodiments, the at least one amino acid is leucine. According to some such embodiments, the at least one amino acid is lysine. According to some such embodiments, the at least one amino acid is methionine. According to some such embodiments, the at least one amino acid is cysteine. According to some such embodiments, the at least one amino acid is phenylalanine. According to some such embodiments, the at least one amino acid is tyrosine. According to some such embodiments, the at least one amino acid is valine. According to some such embodiments, the at least one amino acid is arginine. According to some such embodiments, the at least one amino acid is histidine. According to some such embodiments, the at least one amino acid is alanine. According to some such embodiments, the at least one amino acid is aspartic acid. According to some such embodiments, the at least one amino acid is glutamic acid. According to some such embodiments, the at least one amino acid is glycine. According to some such embodiments, the at least one amino acid is proline. According to some such embodiments, the at least one amino acid is serine.

According to some embodiments, the nutritional supplement comprising a set of nutritive components comprises at least one beneficial fat component equivalent to the beneficial fat component of a fish oil, a vegetable oil, a plant oil, or a nut.

According to some embodiments, the standard equivalent unit of nutrition of at least one protein in one serving of a composition comprising at least one fruit and at least one vegetable has a value of about 1.52 (g).

According to some embodiments, the standard equivalent unit of nutrition of at least one protein, wherein the at least one protein is an amino acid, and wherein the amino acid is tryptophan, in one serving of a composition comprising at least one fruit and at least one vegetable has a value of about 0.016 (g).

According to some embodiments, the standard equivalent unit of nutrition of at least one protein, wherein the at least one protein is an amino acid, and wherein the amino acid is threonine, in one serving of a composition comprising at least one fruit and at least one vegetable has a value of about 0.052 (g).

According to some embodiments, the standard equivalent unit of nutrition of at least one protein, wherein the at least one protein is an amino acid, and wherein the amino acid is isoleucine, in one serving of a composition comprising at least one fruit and at least one vegetable has a value of about 0.047 (g).

According to some embodiments, the standard equivalent unit of nutrition of at least one protein, wherein the at least one protein is an amino acid, and wherein the amino acid is leucine, in one serving of a composition comprising at least one fruit and at least one vegetable has a value of about 0.078 (g).

According to some embodiments, the standard equivalent unit of nutrition of at least one protein, wherein the at least one protein is an amino acid, and wherein the amino acid is lysine, in one serving of a composition comprising at least one fruit and at least one vegetable has a value of about 0.082 (g).

According to some embodiments, the standard equivalent unit of nutrition of at least one protein, wherein the at least one protein is an amino acid, and wherein the amino acid is methionine, in one serving of a composition comprising at least one fruit and at least one vegetable has a value of about 0.020 (g).

According to some embodiments, the standard equivalent unit of nutrition of at least one protein, wherein the at least one protein is an amino acid, and wherein the amino acid is cysteine, in one serving of a composition comprising at least one fruit and at least one vegetable has a value of about 0.020 (g).

According to some embodiments, the standard equivalent unit of nutrition of at least one protein, wherein the at least one protein is an amino acid, and wherein the amino acid is phenylalanine, in one serving of a composition comprising at least one fruit and at least one vegetable has a value of about 0.099 (g).

According to some embodiments, the standard equivalent unit of nutrition of at least one protein, wherein the at least one protein is an amino acid, and wherein the amino acid is tyrosine, in one serving of a composition comprising at least one fruit and at least one vegetable has a value of about 0.039 (g).

According to some embodiments, the standard equivalent unit of nutrition of at least one protein, wherein the at least one protein is an amino acid, and wherein the amino acid is valine, in one serving of a composition comprising at least one fruit and at least one vegetable has a value of about 0.069 (g).

According to some embodiments, the standard equivalent unit of nutrition of at least one protein, wherein the at least one protein is an amino acid, and wherein the amino acid is arginine, in one serving of a composition comprising at least one fruit and at least one vegetable has a value of about 0.092 (g).

According to some embodiments, the standard equivalent unit of nutrition of at least one protein, wherein the at least one protein is an amino acid, and wherein the amino acid is histidine, in one serving of a composition comprising at least one fruit and at least one vegetable has a value of about 0.032 (g).

According to some embodiments, the standard equivalent unit of nutrition of at least one protein, wherein the at least one protein is an amino acid, and wherein the amino acid is alanine, in one serving of a composition comprising at least one fruit and at least one vegetable has a value of about 0.059 (g).

According to some embodiments, the standard equivalent unit of nutrition of at least one protein, wherein the at least one protein is an amino acid, and wherein the amino acid is aspartic acid or aspartate, in one serving of a composition comprising at least one fruit and at least one vegetable has a value of about 0.312 (g).

According to some embodiments, the standard equivalent unit of nutrition of at least one protein, wherein the at least one protein is an amino acid, and wherein the amino acid is glutamic acid or glutamate, in one serving of a composition comprising at least one fruit and at least one vegetable has a value of about 0.389 (g).

According to some embodiments, the standard equivalent unit of nutrition of at least one protein, wherein the at least one protein is an amino acid, and wherein the amino acid is glycine, in one serving of a composition comprising at least one fruit and at least one vegetable has a value of about 0.045 (g).

According to some embodiments, the standard equivalent unit of nutrition of at least one protein, wherein the at least one protein is an amino acid, and wherein the amino acid is proline, in one serving of a composition comprising at least one fruit and at least one vegetable has a value of about 0.093 (g).

According to some embodiments, the standard equivalent unit of nutrition of at least one protein, wherein the at least one protein is an amino acid, and wherein the amino acid is serine, in one serving of a composition comprising at least one fruit and at least one vegetable has a value of about 0.061 (g).

According to another embodiment, the at least one vitamin component comprises vitamin C. According to another embodiment, the at least one vitamin component comprises thiamine. According to another embodiment, the at least one vitamin component comprises riboflavin. According to another embodiment, the at least one vitamin component comprises niacin. According to another embodiment, the at least one vitamin component comprises pantothenic acid. According to another embodiment, the at least one vitamin component comprises vitamin B6. According to another embodiment, the at least one vitamin component comprises biotin. According to another embodiment, the at least one vitamin component comprises folate. According to another embodiment, the at least one vitamin component comprises choline. According to another embodiment, the at least one vitamin component comprises betaine. According to another embodiment, the at least one vitamin component comprises vitamin B12. According to another embodiment, the at least one vitamin component comprises vitamin A. According to another embodiment, the at least one vitamin component comprises retinal. According to another embodiment, the at least one vitamin component comprises α-carotene. According to another embodiment, the at least one vitamin component comprises β-cryptoxanthin. According to another embodiment, the at least one vitamin component comprises β-carotene. According to another embodiment, the at least one vitamin component comprises lycopene. According to another embodiment, the at least one vitamin component comprises lutein and zeaxanthin. According to another embodiment, the at least one vitamin component comprises vitamin E. According to another embodiment, the at least one vitamin component comprises α-tocopherol. According to another embodiment, the at least one vitamin component comprises β-tocopherol. According to another embodiment, the at least one vitamin component comprises γ-tocopherol. According to another embodiment, the at least one vitamin component comprises δ-tocopherol. According to another embodiment, the at least one vitamin component comprises vitamin D. According to another embodiment, the at least one vitamin component comprises vitamin K.

According to some embodiments, the standard equivalent unit of nutrition of at least one vitamin component, wherein the at least one vitamin component comprises Vitamin C, in one serving of a composition comprising at least one fruit and at least one vegetable has a value of about 25.9 (mg).

According to some embodiments, the standard equivalent unit of nutrition of at least one vitamin component, wherein the at least one vitamin component comprises thiamine, in one serving of a composition comprising at least one fruit and at least one vegetable has a value of about 0.063 (mg).

According to some embodiments, the standard equivalent unit of nutrition of at least one vitamin component, wherein the at least one vitamin component comprises riboflavin, in one serving of a composition comprising at least one fruit and at least one vegetable has a value of about 0.057 (mg).

According to some embodiments, the standard equivalent unit of nutrition of at least one vitamin component, wherein the at least one vitamin component comprises niacin, in one serving of a composition comprising at least one fruit and at least one vegetable has a value of about 0.879 (mg).

According to some embodiments, the standard equivalent unit of nutrition of at least one vitamin component, wherein the at least one vitamin component comprises pantothenic acid, in one serving of a composition comprising at least one fruit and at least one vegetable has a e value of about 0.299 (mg).

According to some embodiments, the standard equivalent unit of nutrition of at least one vitamin component, wherein the at least one vitamin component comprises Vitamin B6, in one serving of a composition comprising at least one fruit and at least one vegetable has a value of about 0.202 (mg).

According to some embodiments, the standard equivalent unit of nutrition of at least one vitamin component, wherein the at least one vitamin component comprises folic acid or folate, in one serving of a composition comprising at least one fruit and at least one vegetable has a value of about 28.567 (µg).

According to some embodiments, the standard equivalent unit of nutrition of at least one vitamin component, wherein the at least one vitamin component comprises choline, in one serving of a composition comprising at least one fruit and at least one vegetable has a value of about 11.998 (mg).

According to some embodiments, the standard equivalent unit of nutrition of at least one vitamin component, wherein the at least one vitamin component comprises betain, in one serving of a composition comprising at least one fruit and at least one vegetable has a value of about 0.854 (mg).

According to some embodiments, the standard equivalent unit of nutrition of at least one vitamin component, wherein the at least one vitamin component comprises vitamin B12, in one serving of a composition comprising at least one fruit and at least one vegetable has a value of about 0 (µg).

According to some embodiments, the standard equivalent unit of nutrition of at least one vitamin component, wherein the at least one vitamin component comprises vitamin A, in one serving of a composition comprising at least one fruit and at least one vegetable has a value of about 56.496 (µg).

According to some embodiments, the standard equivalent unit of nutrition of at least one vitamin component, wherein the at least one vitamin component comprises retinol, in one serving of a composition comprising at least one fruit and at least one vegetable has a value of about 0 (µg).

According to some embodiments, the standard equivalent unit of nutrition of at least one vitamin component, wherein the at least one vitamin component comprises β-carotene, in one serving of a composition comprising at least one fruit and at least one vegetable has a, value of about 583.825 (µg).

According to some embodiments, the standard equivalent unit of nutrition of at least one vitamin component, wherein the at least one vitamin component comprises α-carotene, in one serving of a composition comprising at least one fruit and at least one vegetable has a value of about 134.415 (µg).

According to some embodiments, the standard equivalent unit of nutrition of at least one vitamin component, wherein the at least one vitamin component comprises β-cryptoxanthin, in one serving of a composition comprising at least one fruit and at least one vegetable has a value of about 53.303 (µg).

According to some embodiments, the standard equivalent unit of nutrition of at least one vitamin component, wherein the at least one vitamin component comprises vitamin A (IU), in one serving of a composition comprising at least one fruit and at least one vegetable has a value of about 1127.193.

According to some embodiments, the standard equivalent unit of nutrition of at least one vitamin component, wherein the at least one vitamin component comprises lycopene, in one serving of a composition comprising at least one fruit and at least one vegetable has a value of about 482.138 (µg).

According to some embodiments, the standard equivalent unit of nutrition of at least one vitamin component, wherein the at least one vitamin component comprises lutein and zeaxanthin, in one serving of a composition comprising at least one fruit and at least one vegetable has a value of about 211.095 (µg).

According to some embodiments, the standard equivalent unit of nutrition of at least one vitamin component, wherein the at least one vitamin component comprises α-tocopherol, in one serving of a composition comprising at least one fruit and at least one vegetable has a value of about 0.275 (mg).

According to some embodiments, the standard equivalent unit of nutrition of at least one vitamin component, wherein the at least one vitamin component comprises β-tocopherol, in one serving of a composition comprising at least one fruit and at least one vegetable has a value of about 0.004 (mg).

According to some embodiments, the standard equivalent unit of nutrition of at least one vitamin component, wherein the at least one vitamin component comprises γ-tocopherol, in one serving of a composition comprising at least one fruit and at least one vegetable has a value of about 0.047 (mg).

According to some embodiments, the standard equivalent unit of nutrition of at least one vitamin component, wherein the at least one vitamin component comprises δ-tocopherol, in one serving of a composition comprising at least one fruit and at least one vegetable has a value of about 0.005 (mg).

According to some embodiments, the standard equivalent unit of nutrition of at least one vitamin component, wherein the at least one vitamin component comprises vitamin D, in one serving of a composition comprising at least one fruit and at least one vegetable has a value of about 0.091 (IU).

According to some embodiments, the standard equivalent unit of nutrition of at least one vitamin component, wherein the at least one vitamin component comprises vitamin K, in one serving of a composition comprising at least one fruit and at least one vegetable has a value of about 9.157 (µg).

According to another embodiment, the at least one mineral component comprises calcium. According to another embodiment, the at least one mineral component comprises iron. According to another embodiment, the at least one mineral component comprises magnesium. According to another embodiment, the at least one mineral component comprises phosphorous. According to another embodiment, the at least one mineral component comprises potassium. According to another embodiment, the at least one mineral component comprises sodium. According to another embodiment, the at least one mineral component comprises zinc. According to another embodiment, the at least one mineral component comprises copper. According to another embodiment, the at least one mineral component comprises manganese. According to another embodiment, the at least one mineral component comprises fluoride. According to another embodiment, the at least one mineral component comprises selenium.

According to some embodiments, the standard equivalent unit of nutrition of at least one mineral component, wherein the at least one mineral component comprises calcium, in one serving of a composition comprising at least one fruit and at least one vegetable has a value of about 24.037 (mg).

According to some embodiments, the standard equivalent unit of nutrition of at least one mineral component, wherein the at least one mineral component comprises iron, in one serving of a composition comprising at least one fruit and at least one vegetable has a value of about 0.585 (mg).

According to some embodiments, the standard equivalent unit of nutrition of at least one mineral component, wherein the at least one mineral component comprises magnesium, in one serving of a composition comprising at least one fruit and at least one vegetable has a value of about 19.926 (mg).

According to some embodiments, the standard equivalent unit of nutrition of at least one mineral component, wherein the at least one mineral component comprises phosphorus, in one serving of a composition comprising at least one fruit and at least one vegetable has a value of about 45.126 (mg).

According to some embodiments, the standard equivalent unit of nutrition of at least one mineral component, wherein the at least one mineral component comprises potassium, in one serving of a composition comprising at least one fruit and at least one vegetable has a value of about 357.026 (mg).

According to some embodiments, the standard equivalent unit of nutrition of at least one mineral component, wherein the at least one mineral component comprises sodium, in one serving of a composition comprising at least one fruit and at least one vegetable has a value of about 10.638 (mg).

According to some embodiments, the standard equivalent unit of nutrition of at least one mineral component, wherein the at least one mineral component comprises zinc, in one serving of a composition comprising at least one fruit and at least one vegetable has a value of about 0.239 (mg).

According to some embodiments, the standard equivalent unit of nutrition of at least one mineral component, wherein the at least one mineral component comprises copper, in one serving of a composition comprising at least one fruit and at least one vegetable has a value of about 0.083 (mg).

According to some embodiments, the standard equivalent unit of nutrition of at least one mineral component, wherein the at least one mineral component comprises manganese, in one serving of a composition comprising at least one fruit and at least one vegetable has a value of about 0.159 (mg).

According to some embodiments, the standard equivalent unit of nutrition of at least one mineral component, wherein the at least one mineral component comprises fluoride, in one serving of a composition comprising at least one fruit and at least one vegetable has a value of about 16.918 (µg).

According to some embodiments, the standard equivalent unit of nutrition of at least one mineral component, wherein the at least one mineral component comprises selenium, in one serving of a composition comprising at least one fruit and at least one vegetable has a value of about 0.385 (µg).

According to another embodiment, the set of nutritive components of at least one serving of a fruit and a vegetable further comprises a lipid component. According to some such embodiments, the lipid component comprises a beneficial fat component. According to some such embodiments, the lipid component comprises a fatty acid. According to some such embodiments, the lipid component comprises an unsaturated fatty acid. According to some such embodiments, the lipid component comprises a monounsaturated fatty acid. According to some such embodiments, the lipid component comprises a polyunsaturated fatty acid. According to some such embodiments, the lipid component comprises a cholesterol. According to some such embodiments, the lipid component comprises a phytosterol.

According to some embodiments, the standard equivalent unit of nutrition of at least one lipid component, wherein the at least one mineral component comprises a fatty acid, in one serving of a composition comprising at least one fruit and at least one vegetable has a value of about 0.290 (g).

According to some embodiments, the standard equivalent unit of nutrition of at least one lipid component, wherein the at least one lipid component comprises a saturated fatty acid, in one serving of a composition comprising at least one fruit and at least one vegetable has a value of about 0.0.049 (g).

According to some embodiments, the standard equivalent unit of nutrition of at least one lipid component, wherein the at least one mineral component comprises a monounsaturated fatty acid, in one serving of a composition comprising at least one fruit and at least one vegetable has a value of about 0.068 (g).

According to some embodiments, the standard equivalent unit of nutrition of at least one lipid component, wherein the at least one mineral component comprises a polyunsaturated fatty acid, in one serving of a composition comprising at least one fruit and at least one vegetable has a value of about 0.083 (g).

According to some embodiments, the standard equivalent unit of nutrition of at least one lipid component, wherein the at least one lipid component comprises a cholesterol acid, in one serving of a composition comprising at least one fruit and at least one vegetable has a value of about 0 (mg).

According to some embodiments, the standard equivalent unit of nutrition of at least one lipid component, wherein the at least one lipid component comprises at least one phytosterol, in one serving of a composition comprising at least one fruit and at least one vegetable has a value of about 10.441 (mg).

According to another embodiment, the set of nutritive components of at least one serving of a fruit and a vegetable further comprises a carbohydrate component. According to some such embodiments, the carbohydrate component comprises a sugar. According to some embodiments, the standard equivalent unit of nutrition of at least one carbohydrate component, wherein the at least one carbohydrate component comprises a sugar, in one serving of a composition comprising at least one fruit and at least one vegetable has a value of about 6.429 (g).

According to some such embodiments, the carbohydrate component comprises a starch. According to some embodiments, the standard equivalent unit of nutrition of at least one carbohydrate component, wherein the at least one carbohydrate component comprises a starch, in one serving of a composition comprising at least one fruit and at least one vegetable has a value of about 6.5 (g).

According to another embodiment, the at least one fiber component comprises a dietary fiber. According to another embodiment, the at least one fiber component comprises a water-soluble fiber. According to another embodiment, the at least one fiber component comprises a water-insoluble fiber.

According to another embodiment, the at least one beneficial fat component is equivalent to the beneficial fat component of a fish oil, a plant oil, a vegetable oil, or a nut oil. According to some embodiments, the vegetable oil is canola oil, soybean oil, flaxseed/linseed oil, or olive oil.

According to another embodiment, the at least one phytosterol is β-sitosterol. According to another embodiment, the at least one phytosterol is campesterol. According to another embodiment, the at least one phytosterol is stigmasterol. According to another embodiment, the at least one phytosterol is brassicasterol.

According to another embodiment, the at least one ORAC delivering component is equivalent to the ORAC delivering component of an antioxidant. According to another embodiment, the at least one ORAC delivering component is equivalent to the ORAC delivering component of a spice. According to another embodiment, the at least one ORAC delivering component is equivalent to the ORAC delivering component of a berry. Such berries include, but are not limited to, a grape, a blueberry, a cranberry, a blackberry, a raspberry, and a strawberry. According to another embodiment, the at least one ORAC delivering component is equivalent to the ORAC delivering component of a legume. Such legumes include, but are not limited to, a small red bean, a pinto bean, an artichoke, a Russert potato, and a black bean. Additional ORAC delivering components may be equivalent to the ORAC delivering component of, for example, a grape, a prune, a red delicious apple, a Granny Smith apple, a pecan, a sweet cherry, a black plum, a plum, or a Gala apple.

According to some embodiments, if regulatory requirements preclude a given nutritive component, the methods and compositions disclosed envision that the nutritive value of that nutritive component can be made up by inclusion of at least one substitute nutritive component comprising equivalent nutritive value.

4.1. Solid Forms

According to another embodiment, the nutritional supplement is of a solid form. According to such some embodiments, the solid form is a tablet. According to some such embodiments, the solid form is a capsule. According to some such embodiments, the solid form is a caplet. According to some such embodiments, the solid form is a powder. Solid dosage forms usually are intended to be swallowed whole. Any disagreeable taste of a component of the nutritional supplement generally is not of concern when formulating an oral solid dosage form because the component's taste can be masked easily with an exterior coating.

According to some embodiments, the solid form is admixed directly to a base food or a base comestible.

According to some embodiments, a nutritional component may be prepared by microencapsulation. Microencapsulation is a process useful for masking a bitter taste, separating incompatible materials, protecting against moisture or oxidation, and a means of modifying a material's physical characteristics for ease of handling in formulation and manufacture. Essentially, it is a processor technique whereby thin coatings can be applied reproducibly to small particles of solids, droplets of liquids or dispersions, thus forming microcapsules, wherein the particles involved range from 0.1 μm to 500 μm in size. A number of microencapsulation processes are known in the art. Some are based on chemical processes and involve a chemical or phase change; others are mechanical. A number of coating materials have been used, for example, gelatin, polyvinyl alcohol, ethylcellulose, cellulose acetate phthalate, and styrene maleic anhydride. The film thickness can be varied considerably depending on the surface area of the material to be coated and other physical characteristics. The microcapsules may consist of a single particle or clusters of particles. After isolation from the liquid manufacturing vehicle and drying, the material appears as a free-flowing powder.

According to some embodiments, compensation for the natural color of a composition comprising multiple ingredients may be corrected by the RGB method. RGB stands for the three primary colors of light—Red, Green, and Blue. Since the human eye is sensitive to these three primary colors, all colors are perceived as a combination of these three colors. A color is represented by indicating how much each ingredient of red, green, and blue should be included in it. Each can differ from the minimum (no color) to the maximum (full intensity). When all three colors are at their minimum value, the color appears black, and when all three colors are at their maximum value, the color appears white. According to one such embodiment, the color of a composition having a distinct reddish tint is compensated with natural or synthetic green or blue colors such that the final color appears white.

4.2. Liquid Forms

Children, elderly persons, and disabled or incapacitated persons often have trouble swallowing tablets or capsules. Thus it often is desirable to provide the nutritional supplement either in a chewable solid form or in a liquid form. A liquid form usually is favored by subjects over a chewable form due to the ease with which it may be swallowed.

Many liquid compositions formulated for use by pediatric or geriatric subjects are prepared by grinding a tablet form into a powder and mixing the powder with a diluent.

According to another embodiment, the nutritional supplement is of a liquid form. According to some embodiments, the liquid form is a beverage formulation. According to some such embodiments, the beverage formulation comprises the nutritional supplement containing at least one standard equivalent unit of nutrition in one serving of a composition of at least on fruit and at least one vegetable, a beverage component, and a diluent.

According to some embodiments, the beverage component comprises at least one masking agent. A masking agent (or agents) is used to enhance palatability. According to some such embodiments, the masking agent is a flavoring agent. Any natural or synthetic flavoring agent may be used as a masking agent. For example, one or more botanical and/or fruit flavors may be utilized. In some embodiments, such flavors may be synthetic flavors or natural flavors. In some such embodiments, flavors are sugar-free. A flavoring agent may comprise at least one of flavanols, sweeteners, non-caloric sweeteners, emulsions, flavoring agents, coloring agents, preservatives, acidulants, a diluent, such as, but not limited to, water, and carbonation components.

In another embodiment, the beverage component further comprises other components to enhance the efficacy of the beverage in providing benefits, such as fighting infection, providing a desirable nutritional profile, and/or providing enhanced organoleptic properties.

In some such embodiments, the beverage component comprises juice flavored drinks. In some such embodiments, the beverage component comprises fruit flavored drinks. In some such embodiments, the beverage component comprises at least one fruit juice component. In some such embodiments, the fruit juice is 100% fruit juice. In some such embodiments, the beverage component is coffee. In some such embodiments, the beverage component is tea. In some such embodiments, the beverage component is a carbonated drink. In some such embodiments, the beverage component is a frozen drink. In some such embodiments, the beverage component is a cola. In some such embodiments, the cola comprises a caramel color. In some such embodiments, the cola comprises carbonated water. In some such embodiments, the cola comprises aspartame. In some such embodiments, the cola comprises a sugar substitute. In some such embodiments, the cola comprises acesulfame potassium. In some such embodiments, the cola comprises an acid component. In some such embodiments, the cola comprises caffeine. The beverage component also may comprises other beverage components as known in the art.

In another embodiment, the beverage component further comprises one or more bracers. In another embodiment, the beverage component further comprises flavanols. In another embodiment, the beverage component further comprises non-caloric sweeteners. In another embodiment, the beverage component further comprises emulsions. In another embodiment, the beverage component further comprises flavoring agents. In another embodiment, the beverage component further comprises coloring agents. In another embodiment, the beverage component further comprises preservatives. In another embodiment, the beverage component further comprises acidulants. In another embodiment, the beverage component further comprises a diluent. In another embodiment, the beverage component further comprises water. In another embodiment, the beverage component further comprises carbonation components.

In some such embodiments, the components may be dispersed, solubilized, or otherwise mixed into the beverage formulation.

In another embodiment, the beverage formulation further comprises carbohydrate sweeteners such as, but not limited to, monosaccharides and/or disaccharides. Sweetened beverages, such as colas, typically comprise from about 0.1% sweetener to about 20% sweetener. In some such embodiments, the beverage formulation further comprises from about 6% sweetener to about 14% sweetener. In some such embodiments, the sugars may be incorporated into the beverages in a solid or liquid form but typically are incorporated as a syrup. In some such embodiments, the sugars may be incorporated into the beverages as a concentrated syrup such as, for example, but not limited to, high fructose corn syrup. In some embodiments, the sugar sweeteners can be provided to some extent by other components of a beverage, such as, but not limited to, the fruit juice component and/or flavoring component.

In another embodiment, the described invention provides a beverage formulation further comprising sugar sweeteners. In some such embodiments, the sugar sweeteners include, but are not limited to, sucrose, fructose, glucose, and mixtures thereof. Fructose may be obtained or provided as liquid fructose, high fructose corn syrup, dry fructose or fructose syrup. The amount of the sweetener used in the beverage formulation typically depends upon the particular sweetener and the sweetness intensity desired. For low calorie sweeteners, this amount may vary depending upon the intensity of the particular sweetener. In some such embodiments, the sweetener may be a sugar substitute.

In another embodiment, carbon dioxide may be introduced into the beverage formulation to achieve carbonation. The beverage formulation may be carbonated by methods known in the art either before or after addition of the nutritional supplement components.

The carbonated beverage may be placed into a container such as a bottle or can, and then sealed. Any conventional carbonation methodology may be utilized to make carbonated beverage compositions. The amount of carbon dioxide introduced into the beverage will depend upon the particular flavor system utilized and the amount of carbonation desired.

According to some embodiments, the beverage formulation further comprises small amounts of one or more coloring agents. Coloring agents, i.e., substances used to provide color, translucense, and/or opaqueness, according to the described invention may be of mineral, plant, animal or synthetic origin. The amount of coloring agent used will vary, depending on the agents used and intensity desired in the finished product. The amount can be determined readily by one skilled in the art. In some such embodiments, a coloring agent is added to match the flavor of the beverage. In some such embodiments, a coloring agent is added for aesthetic reasons. FDA approved coloring agents may be found in volume 21 of the Code of Federal Regulations, and on the FDA website at www.cfsan.fda.gov/~dms/opa-col2.html#table3A, both of which are incorporated by reference. Examples of coloring agents include, but are not limited to, annatto, caramel, carmine, beta-carotene, bismuth citrate, clay, disodium EDTA-copper, potassium sodium copper chlorophyllin (chlorophyllin copper complex), dihydroxyacetone, bismuth oxychloride, guaiazulene, henna, iron oxides, ferric ammonium ferrocyanide, ferric ferrocyanide, chromium hydroxide green, chromium oxide green, guanine, kaolin clay, lead acetate, pyrophyllite, mica, serecite, silver, titanium dioxide, aloe powder, aluminum powder, arrowroot powder, bronze powder, copper powder, corn starch, ultramarines, manganese violet, zinc oxide, and luminescent zinc sulfide, talc, starches, natural dyes, such as walnut extract, rhubarb extract, cinchona extract, henna, woad, weld, Dyer's greenweed, buckthorn berries, safflower, saffron, madder, brazilwood (sappanwood), indigo, alkanet, logwood, various mushrooms, lichens, murex purple, kermes, lac and cochineal, anthocyanins, betacyanins, caramel, carmine, carotenoids, chlorophylls, riboflavin, turmeric, vegetable dyes, animal extracts, plant extract, and other mineral and/or synthetic coloring agents.

According to some embodiments, the beverage formulation further comprises preservatives. In some such embodiments, one or more preservatives are added to the beverage formulation. Examples of preservatives include, but are not limited to, sorbate, benzoate, and polyphosphate preservatives. Techniques known in the art, such as aseptic processing, may be used to avoid preservatives.

According to some embodiments, the beverage formulation further comprises one or more acidulants. The term "acidulant" as used herein refers to an additive added to change or maintain pH. In some such embodiments, acidulants may be added in order to maintain the pH of the beverage at a pH that maintains the biological activity of components of the nutritional supplement. In some embodiments, the beverage formulation has a pH of from about pH 2 to about pH 7. In some embodiments, the beverage formulation has a pH from about pH 2.5 to about pH 7. In some embodiments, the beverage formulation has a pH from about pH 3.5 to about pH 4.5. Beverage acidity can be adjusted to and maintained within the requisite range by known and conventional methods. Acidity of the beverage formulation is a balance between maximum acidity for microbial inhibition and optimum acidity for desired beverage flavor.

According to some embodiments, at least one organic and/or inorganic edible acid may be used to adjust the pH of the beverage formulation. Acids can be present in their undissociated form or, alternatively, as their representative salts, for example, but not limited to, potassium or sodium hydrogen phosphate, potassium or sodium dihydrogen phosphate salts. In some such embodiments, the acids are edible organic acids. Examples of edible organic acids include, but are not limited to, citric acid, malic acid, fumaric acid, adipic acid, phosphoric acid, gluconic acid, tartaric acid, lactic acid, ascorbic acid, acetic acid, phosphoric acid or mixtures thereof.

In another embodiment, the acidulant also can serve as an antioxidant to stabilize the beverage components. Examples of commonly used anti-oxidants include, but are not limited to, ascorbic acid, EDTA, and salts thereof.

In another embodiment, suitable pH adjusters or buffers may be added in order to maintain the pH of the beverage formulation. Suitable pH adjusters or buffers include organic salts from organic acids and bases, such as, but not limited to, sodium citrate, and sodium ascorbate.

In another embodiment, the described invention provides a beverage formulation that can be variably produced and packaged. In some such embodiments, the beverage formulation is stored in an opaque or brown bottle that is vacuum sealed. In some such embodiments, storage is in cool dark environments.

In another embodiment, containers are utilized for packaging the beverage formulation. In some such embodiments, the containers are similar to conventional beverages, in usual forms such as shaped-containers based on polyethylene terephthalate (PET bottles), metal cans, paper containers combined with metal foils or plastic films, or bottles with cap assemblies that may be opened and closed. Containers, such as metal cans, that can be subjected to appertization after filling such containers may be produced under conditions determined by food hygiene laws. PET bottles or paper containers, which cannot be retort-sterilized, may utilize sterilization processes wherein the containers are sterilized in advance at a high temperature for a short period by use of a plate-type heat exchanger, and then cooled to a certain temperature, thereafter the containers being filled. Further, previously filled containers may be compounded and filled with another component under sterile conditions.

In some such embodiments, the amount of a single serving size may be specified or be provided in a single bottle or can. In some such embodiments, the beverage also may be in powder form to which water, mild juice, cola, etc. is added.

According to some embodiments, the beverage formulation is prepared by dissolving, dispersing or otherwise mixing all components singularly or in suitable combinations together in water, then, where appropriate, agitating with a mechanical stirrer until all of the components have been solubilized or adequately dispersed or mixed. The nutritional supplement components may be added to the beverage formulation in a powdered form that is completely soluble in water. In some such embodiments, the desired amount of powdered nutritional supplement is stirred or mixed into the liquid formulation. The desired amount may vary depending on the age the subject.

According to some embodiments, the nutritional supplement components may be combined with an effervescent material prior to addition to the beverage formulation. Effervescent materials may include compounds such as, but not limited to, alkali metal carbonates (e.g., sodium and potassium carbonate), alkali metal hydrogen carbonates (e.g. sodium and potassium hydrogen carbonate), and ammonium carbonates. In some such embodiments, the effervescing materials include, but are not limited to, sodium carbonate, sodium hydrogen carbonate and ammonium carbonate. An effervescent layer comprises at least one effervescent material, which may be mixed with other materials.

In another embodiment, the nutritional supplement components may be combined with a diluent, such as, but not limited to, water, and stored in an ampule.

In another embodiment, the beverage component of the beverage formulation is prepared separately from the nutritional supplement component. Fruit juice beverage concentrates, for example, typically comprise fruit concentrates, color dyes, vitamins, flavorings, and, optionally, preservatives. The concentrates then are mixed with a diluent, such as, but not limited to, water, sweeteners and other beverage ingredients to form a beverage component. Beverage formulations and beverage concentrates may require a unit operation which will produce microbial inactivation and microbial reduction for safe production of marketable, high quality shelf-stable and refrigerated extended shelf-life products before product packaging. Shelf-stable beverages include products that achieve commercial sterility yielding at least 1 to 12 months shelf stability at room temperature without refrigeration. Various microbial inactivation/reduction methods may be utilized, including, for example: thermal processing, ultraviolet (UV) ray treatment, ultra-high pressure, pulsed electric fields and electric sterilization. Thermal processing is a commercially accepted method for pasteurized and aseptic (ultra-high-temperature) processing. Pasteurization involves direct or indirect heating of the beverage formulation followed by a period of cooling. Aseptic processing of acid beverages requires heating at higher temperatures than thermal processing followed by a period of cooling.

According to another embodiment, the nutritional supplement further comprises a masking agent composition. According to some embodiments, the masking agent composition comprises a masking agent effective amount of a flavoring agent.

According to another embodiment, the liquid nutritional supplement is a solution, syrup or suspension for oral administration to adult and pediatric patients comprising a set of nutritional supplement components and a masking agent composition.

According to another embodiment, the masking agent composition comprises a masking effective amount of a flavoring agent. According to some such embodiments, the flavoring agent is an artificial sweetener.

According to another embodiment, the total amount of the masking agent composition present in a liquid pharmaceutical composition comprises from about 70% to about 90% weight to volume of the total liquid composition. According to some such embodiments, the total amount of the masking agent composition present in a liquid pharmaceutical composition comprises from about 80% weight to volume. The beverage nutritional supplement liquid formulation is not limited to this amount but rather to a masking agent effective amount, such that any unpalatable taste of the nutritional supplement is masked and the nutritional supplement liquid formulation is palatable to the intended subject, such as a pediatric or adult subject in need thereof. For example, the use of a highly intense artificial sweetener would require a lower amount of a sweetening agent compared to the use of a sugar sweetener to achieve a masking agent effective amount. The masking agent effective amount required varies with the amount of the nutritional supplement components used and the intensity of the unpalatable taste.

Masking agents may include artificial sweeteners. Artificial sweeteners include, but are not limited to, aspartame, acesulfame potassium, cyclamate, saccharin, saccharin sodium, sucralose, maltitol, fructooligosaccharides, also referred to as oligofructose or oligofructan or mixtures thereof. The masking agent effective amount of an artificial sweetener is the amount whereby any unpalatable taste of the nutritional supplement is masked and the nutritional supplement liquid formulation is palatable. Aspartame, for example, is used as a table-top sweetener and in beverage and food products and pharmaceutical and vitamin preparations to enhance flavor systems and to mask some unpleasant taste characteristics. Comparatively, aspartame has approximately 180-200 times the sweetening power of sucrose. The masking agent effective amount of aspartame ranges from about 0.15 grams per 100 mL to about 8 grams per 100 mL. Acesulfame potassium also is used as a table-top sweetener and in cosmetics, beverage and food products and pharmaceutical and vitamin preparations to enhance flavor systems and to mask some unpleasant taste characteristics. Comparatively, acesulfame potassium has approximately 180-200 times the sweetening power of sucrose. The masking agent effective amount of acesulfame potassium ranges from about 0.15 grams per 100 mL to about 8 grams per 100 mL. Cyclamate (marketed under the tradename Sweet'N Low® is used as a table-top sweetener and in beverage and food products. Comparatively, cyclamate has approximately 30 times the sweetening power of sucrose. The masking agent effective amount of cyclamate ranges from about 1 gram per 100 mL to about 50 grams per 100 mL. Saccharin is used to enhance flavor systems and to mask some unpleasant taste characteristics and has approximately 500 times the sweetening power of sucrose. The masking agent effective amount of saccharin ranges from about 0.08 grams per 100 mL to about 3 grams per 100 mL. Saccharin sodium is considerably more soluble than saccharin, is used more frequently in pharmaceutical formulations and has approximately 300 times the sweetening power of sucrose. The masking agent effective amount of saccharin sodium ranges from about 0.1 grams per 100 mL to about 5 grams per 100 mL. Sucralose (marketed under the tradename Splenda®) is a compound characterized as an intensely sweet, trichlorinated carbohydrate, structurally similar to sucrose, having approximately 600 times the sweetening power of sucrose. Fructo-oligosaccharides (FOS) also sometimes called oligofructose or oligofructan, are a class of oligosaccharides used as an artificial or alternative sweetener. FOS exhibits sweetness levels between 30 and 50 percent of sugar in commercially-prepared syrups.

According to some embodiments, mixtures of artificial sweeteners, such as, for example, a ratio of 10 parts cyclamate to 1 part saccharin, have been found to have synergistic sweetening properties and improve taste characteristics.

According to another embodiment, the masking agent composition comprises a masking agent effective amount of the artificial sweetener sucralose. In some such embodiments, the amount of sucralose used causes sucralose to mask any unpalatible taste of the nutritional supplement. According to some such embodiments, sucralose may be used in a masking agent effective amount in a plurality of nutritional supplement liquid formulations wherein the nutritional supplement is bitter tasting to make the nutritional supplement liquid formulation palatable.

According to another embodiment, the masking agent effective amount of sucralose ranges from about 0.05 grams per 100 mL to about 2.5 grams per 100 mL. According to another embodiment, the masking agent effective amount of sucralose ranges from about 0.45 grams per 100 mL to about 13 grams per 100 mL. According to another embodiment, the masking agent effective amount of sucralose is about 1 gram per 100 mL.

According to another embodiment, the masking agent composition further comprises a masking agent effective amount of an artificial sweetener and at least one flavoring agent.

The flavoring agent may be of the type and amount desired to enhance the palatability of the particular nutritional supplement liquid formulation to the intended subject. Flavoring agents that may be used include, and are not limited to, natural flavors, natural fruit flavors, artificial flavors, artificial fruit flavors, flavor enhancers or mixtures thereof. Natural flavors, artificial flavors or mixtures thereof include, but are not limited to, mint (such as peppermint or spearmint), menthol, cinnamon, vanilla, artificial vanilla, chocolate, artificial chocolate or bubblegum. Natural fruit flavors, artificial fruit flavors or mixtures thereof include, but are not limited to, cherry, grape, orange, strawberry, cranberry, banana, blackberry, raspberry, watermelon, cantaloupe, honeydew or lemon. Flavor enhancers include, but are not limited to, citric acid. In some such embodiments, at least one flavoring agent is added. In some such embodiments, up to two flavoring agents may be added. In some such embodiments, a flavoring agent used in the masking agent composition ranges from about 0.02 grams per 100 mL to about 0.06 grams per 100 mL. In some such embodiments, a flavoring agent is present in a range of from about 0.03 grams per 100 mL to about 0.04 grams per 100 mL.

According to another embodiment, the masking agent composition further comprises a masking agent effective amount of an artificial sweetener, at least one flavoring agent, an optional sweetening agent and an optional debittering agent or mixtures thereof.

Optional sweetening agents include, but are not limited to, sugar sweeteners such as monosaccharides, disaccharides and polysaccharides. Examples of suitable sugar sweeteners include but are not limited to xylose, ribose, glucose, mannose, galactose, fructose, dextrose, sucrose, maltose, partially hydrolyzed starch (such as maltitol syrup) or corn syrup solids and sugar alcohols such as sorbitol, xylitol, mannitol, glycerin and combination thereof. In some embodiments, the sugar sweetener is high fructose corn syrup. The amount of sugar sweetener used in the masking agent composition will vary depending on the degree of palatability desired for the liquid pharmaceutical composition. Generally the total amount of sugar sweetener used ranges from 0 grams per 100 mL to about 120 grams per 100 mL. In some embodiments, the amount of sugar sweetener used ranges from about 50 grams per 100 mL to about 110 grams per 100 mL.

Optional sweetening agents include artificial sweeteners used in addition to sugar sweeteners. Other artificial sweeteners include, but are not limited to, aspartame, acesulfame potassium, cyclamate, saccharin, saccharin sodium, sucralose, maltitol, FOS, or mixtures thereof. The optional amount of artificial sweeteners used in the masking agent composition will vary depending on the degree of palatability desired for the liquid pharmaceutical composition. Generally, the amount of an optional artificial sweetener used in the masking agent composition ranges from about 0 grams per 100 mL to about 1.5 grams per 100 mL.

According to another embodiment, an optional debittering agent is employed in a masking agent composition. Optional debittering agents include, and but not limited to, natural debittering agents, artificial debittering agents or debittering agents that inhibit a chemosensory response in the mouth or nose or mixtures thereof. Commercially available debittering agents include, but are not limited to, those marketed under the names Prosweet FL N&A K (by Virginia Dare), Bitterness Modifier 36734 (by Bush, Boake and Allen, Inc.), Natural Taste Masker 501.441/A and Special Taste Masker Compound 501.437/A (by Firmenich, Inc.); other debittering agents may be identified by those skilled in the art. In some such embodiments, the amount of a natural debittering agent, artificial debittering agent or chemosensory response inhibitor agent present in the taste masking composition ranges from about 0 grams per 100 mL to about 1 gram per 100 mL. In some such embodiments, a debittering agent ranges from about 0.01 grams per 100 mL to about 0.2 grams per 100 mL. In some such embodiments, a debittering agent ranges from about 0.03 grams per 100 mL to about 0.05 grams per 100 mL.

According to another embodiment, the masking agent composition further comprises a masking agent effective amount of an artificial sweetener and at least one flavoring agent.

According to another embodiment, the masking agent composition further comprises a masking agent effective amount of an artificial sweetener, at least one flavoring agent, an optional sweetening agent and an optional debittering agent or mixtures thereof.

According to another embodiment, the nutritional supplement liquid formulation comprises a polysaccharide gum and a microcrystalline cellulose or a carboxymethylcellulose or a mixture thereof.

According to another embodiment, the nutritional supplement liquid formulation comprises a polysaccharide gum selected from a high molecular weight polysaccharide gum and a microcrystalline cellulose or a carboxymethylcellulose selected from carboxymethylcellulose or a metal salt thereof, wherein the metal salt is selected from calcium, sodium or potassium.

According to another embodiment, the nutritional supplement liquid formulation comprises a high molecular weight polysaccharide gum selected from xanthan, tragacanth, guar or carrageenan and a microcrystalline cellulose or a carboxymethylcellulose selected from carboxymethylcellulose or a metal salt thereof, wherein the metal salt is selected from calcium, sodium or potassium.

According to another embodiment, the nutritional supplement liquid formulation comprises a xanthan gum and a mixture of microcrystalline cellulose and sodium carboxymethylcellulose.

According to some such embodiments, a polysaccharide gum for use in nutritional supplement liquid formulation is xanthan gum, a high molecular weight polysaccharide gum produced by *Xanthomonas campestris*. Techniques and strains for producing this polysaccharide are described in U.S. Pat. Nos. 4,752,580 and 3,485,719 (the disclosures of which are hereby incorporated by reference). In some such embodiments, the gum used should have a viscosity in a 1% salt solution of from about 1000 cP to about 1700 cP (mPa-sec), as measured at 25° C. with an LV model Brookfield Synchro-Lectric viscometer at 60 rpm, no. 3 spindle. In some such embodiments, the amount of xanthan gum present ranges from about 0.05 grams per 100 mL to about 0.25 grams per 100 mL. In some such embodiments, the amount of xanthan gum present ranges from about 0.09 grams per 100 mL to about 0.20 grams per 100 mL. In some such embodiments, the amount of xanthan gum present is about 0.14 grams per 100 mL.

According to another embodiment, the nutritional supplement liquid formulation comprises a polysaccharide gum and a mixture of microcrystalline cellulose and a carboxymethylcellulose. In some such embodiments, the mixture of microcrystalline cellulose and a carboxymethylcellulose comprises a commercially available dried coprecipitated microcrystal of cellulose in a mixture with sodium carboxymethylcellulose. Sodium carboxymethylcellulose commonly is used as the coprecipitate in microcrystalline cellulose. In some such embodiments, the amount of sodium carboxymethylcellulose ranges from about 8 weight percent to about 19 weight percent of the total weight of the mixture of microcrystalline cellulose and sodium carboxymethylcellulose. In some such embodiments, the amount of sodium carboxymethylcellulose present in the microcrystalline cellulose and sodium carboxymethylcellulose mixtures ranges from about 8 weight percent to about 14 weight percent. Such mixtures are commercially available from, for example, but not limited to, FMC as Avicel™ CL-611, Avicel™ RC-581 and Avicel™ RC-591. In such some embodiments, Avicel™ RC-591, the mixture of microcrystalline cellulose and sodium carboxymethylcellulose for use in the suspension, contains about 8.3 weight percent to about 13.8 weight percent sodium carboxymethylcellulose, with the remainder being microcrystalline cellulose.

According to some embodiments, the amount of the mixture of microcrystalline cellulose and sodium carboxymethylcellulose ranges from about 0.4 grams per 100 mL to about 1.0 gram per 100 mL. In some such embodiments, the amount of the mixture ranges of from about 0.6 grams per 100 mL to about 0.8 gram per 100 mL. In some such embodiments, the mixture of microcrystalline cellulose and sodium carboxymethylcellulose is about 0.7 grams per 100 mL.

According to another embodiment, the nutritional supplement liquid formulation comprises a xanthan gum expressed as a weight ratio to the mixture of microcrystalline cellulose and sodium carboxymethylcellulose wherein the weight ratio is maintained between about 1:4 to about 1:8. In some such embodiments, the weight ratio is maintained in a range of about 1:6.

According to another embodiment, the nutritional supplement liquid formulation comprises limiting the amount of water present to that amount necessary to hydrate the xanthan gum and the mixture of microcrystalline cellulose and sodium carboxymethylcellulose while providing a sufficient aqueous base to impart the desired degree of viscosity.

According to another embodiment, the total amount of water present in the nutritional supplement liquid formulation has a range of from about 5 grams to about 60 grams per 100 mL. In another embodiment, the total amount of present water ranges from about 10 grams per 100 mL to about 30 grams per 100 mL. In another embodiment, the total amount of water present ranges from about 10 grams per 100 mL to about 20 grams per 100 mL. In another embodiment, the total amount of water present is about 15 grams of per 100 mL of liquid formulation.

According to another embodiment, the nutritional supplement liquid formulation may optionally contain pH stabilizers (such as, but not limited to, citric acid, ascorbic acid, potassium phosphate or sodium phosphate), pH buffers (such as, but not limited to, citric acid, ascorbic acid, potassium phosphate or sodium phosphate), wetting agents (such as, but not limited to, sodium laurel sulfate or docusate sodium), preservatives, coloring agents (such as, but not limited to, dyes, lake dyes or natural coloring), defoaming agents (such as, but not limited to, simethicone), surfactants (such as, but not limited to, sorbitan oleate ester or polyoxyethylene sorbitan monooleate), electrolytes (such as, but not limited to, sodium chloride, potassium chloride or sodium bicarbonate) or sequestering agents (such as, but not limited to, EDTA (ethylene diamine tetraacetic acid and the salts thereof)).

A pH stabilizer such as citric acid may be optionally added to the nutritional supplement liquid formulation to stabilize pH and prevent microbial growth. In some such embodiments, citric acid is advantageously added since a lower pH will prevent microbial growth and add to the stability of the product.

A pH buffer may be optionally added to the nutritional supplement liquid formulation to maintain pH in a desired range or to enhance the solubility of the pharmaceutically active agent. Suitable buffers are those that are not chemically reactive with other ingredients and are present in amounts sufficient to provide the desired degree of pH buffering.

According to another embodiment, when the nutritional supplement liquid formulation is a suspension, the solubility of the pharmaceutically active agent is reduced by maintaining pH in a range of from about pH 6 to about pH 8. In some such embodiments, the pH is about pH 7. In another embodiment, an optional buffering agent is present in an amount ranging from 0 to about 1 gram per 100 mL. In another embodiment, a buffering agent is not present in a suspension since the nutritional supplement acts as an autobuffering agent to stabilize pH at about pH 7.

According to another embodiment, when the nutritional supplement liquid formulation is a solution, the solubility of the pharmaceutically active agent is increased by maintaining pH in a range of from about pH 3 to about pH 6. According some such embodiments, the pH is about pH 5. According to some such embodiments, an optional buffering agent is present in an amount of from 0.01 gram per 100 mL to 1 gram per 100 mL.

Wetting agents may be employed in the nutritional supplement liquid formulation to facilitate the dispersion of hydrophobic nutritional supplement components. In some embodiments, a minimal concentration of wetting agents is selected to achieve optimum dispersion of the nutritional supplement components. It should be appreciated that an excess concentration of wetting agent may cause flocculation. Those skilled in the art are well versed in suitable empirical methods to determine the appropriate wetting agents and concentrations to achieve optimum dispersion and avoid flocculation. Suitable wetting agents are listed in the U.S. Pharmacoepia XXI, incorporated in its entirety herein by reference.

Preservatives useful in the described invention include, but are not limited, to sodium benzoate, potassium sorbate, salts of edetate (also known as salts of ethylenediaminetetraacetic acid, or EDTA, such as disodium edetate), parabens (such as methyl, ethyl, propyl and butyl p-hydroxybenzoic acids esters or mixtures thereof) or mixtures thereof. Methods for evaluating the efficacy of preservatives in liquid compositions are known to those skilled in the art. In some embodiments, the preservatives incorporated into the beverage formulation include sodium benzoate, propylparaben, butylparaben or mixtures thereof and may be added to a taste masked liquid pharmaceutical composition although other pharmaceutically acceptable preservatives may be substituted therefor. In another embodiment, preservatives may be present in amounts of up to about 1 gram per 100 mL. In another embodiment, an individual preservative may be present in an amount ranging from about 0.015 grams per 100 mL to about 0.5 grams per 100 mL. In another embodiment, a preservative such as propylparaben, butylparaben or mixtures thereof is present in an amount ranging from about 0.01 grams per 100 mL to about 0.05 grams per 100 mL. In another embodiment, about 0.006 grams per 100 mL of a preservative selected from propylparaben, butylparaben or mixtures thereof is present. In another embodiment, a preservative such as sodium benzoate optionally may be present in a range of from about 0.1 grams per 100 mL to about 0.5 grams per 100 mL. In some such embodiments, about 0.2 grams per 100 mL sodium benzoate is present.

Coloring agents also may be incorporated to provide an appealing color to the taste masked nutritional supplement liquid formulation. Suitable coloring agents are well known to those skilled in the art and are those that avoid chemical incompatibilities with other ingredients.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the described invention, the preferred methods and materials are now described. All publications mentioned herein are incorporated herein by reference to disclose and describe the methods and/or materials in connection with the publications are cited.

It must also be noted that as used herein and in the appended claims, the singular forms "a," "and" and "the" include plural referents unless the context clearly dictates otherwise. All technical and scientific terms used herein have the same meaning.

The publications discussed herein are provided solely for their disclosure prior to the filing date of the present application. Nothing herein is to be construed as an admission that the described invention is not entitled to antedate such publication by virtue of prior invention. Further, the dates of publication provided may be different from the actual publication dates which may need to be independently confirmed.

It should be understood by those skilled in the art that various changes may be made and equivalents may be substituted without departing from the true spirit and scope of the Invention. In addition, many modifications may be made to adapt a particular situation, material, composition of matter, process, process step or steps, to the objective, spirit and scope of the described invention. All such modifications are intended to be within the scope of the claims appended hereto.

EXAMPLES

The following examples are put forth so as to provide those of ordinary skill in the art with a complete disclosure and description of how to make and use the described invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Overview of the Process for Development of Fortified Foods and Beverages with at least the Nutritional Equivalency of Fruits and Vegetables Fortified foods and beverages with a nutritional equivalency of a serving(s) of fruits and vegetables are provided by the following steps:

1) listing the nutritional components and their respective quantities in accordance with the Standard Equivalent Unit of the Nutritional Value of 1 Serving of Fruits & Vegetables ("SFV") (as described in Example 2); and, as described in Example 3, 2) multiplying the SFV of the nutritional components of step (1) by the targeted number of equivalency (for example, 3 servings) to arrive at a target quantity for each nutritional component;

3) listing the nutritional component values of the base food to be fortified side-by-side with the SFV target multiple with its respective nutritional components and their quantities of step (2) (for example, if the base food contains vitamin A, vitamin B12, vitamin C, and vitamin D, the nutritional components values of this base food would be listed side by side with the SFV target multiple for vitamin A, vitamin B12, vitamin C and vitamin D, respectively) (as shown below in tables 2-6, below);

4) conducting a gap analysis by subtracting the base food nutritional component quantities of step (3) from the respective targeted multiple SFV like component of step (2); wherein the resulting gap indicates which components and in what quantities the base food is missing the necessary nutritional components to reach the targeted total nutritional value (shown as "fortification needs" in Table 48, below); and 5) adding the deficient nutritional components to the base food for which gaps have been identified in step (4).

with the proviso that (i) nutritional components (for example, those whose over-consumption generally is associated with an unhealthy diet, such as, but not limited to, calories, sodium, lipids (fatty acids, cholesterol), and carbohydrates (such as, sugars and starchs)) are to be excluded from the fortification process and are not added to the base food; and optionally (ii) fortification of the base food will not result in a final product content above the RDI for a particular nutritional component.

The final fortification composition is determined by the individual nutrient component(s) selected and the amount of the nutrient component(s) required to fill the nutritional gap(s). These nutrient component(s) may have different organoleptic properties, including, but not limited to, appearance, odor, aroma, fragrance, consistency, and texture. The final fortification composition optionally includes agents, such as, but not limited to, a flavoring agent and/or a masking agent, to provide organoleptic properties of the fortified base food equivalent to the organoleptic properties of the nonfortified base food.

Example 2

Determination of Standard Equivalent Unit (Step 1)

The standard equivalent unit for fruits and vegetables can be determined utilizing the total weight of fruits and vegetables consumed by humans within a geographic area; determining the percentage contribution of each fruit and vegetables to the total weight consumed in the geographic area; determining a portion size of each fruit and vegetable within that geographic area; determining the total nutritional content of the portion size; and calculating a standard equivalent unit of the nutritional value of one portion of at least one fruit and at least one vegetable based on the portion size, the total nutritional content and the weighted contribution of each fruit and vegetable consumed in the geographic area. Table 22 shows the publicly available nutrient database number (NDB) and name of various fruits and vegetables consumed in the United States; the recommended daily allowance (RDA); the serving size used; weight (g); percentage of each fruit and vegetable (FV) consumed (related to all the fruits and vegetable consumed); the percentage of edible and refuse of each portion of each fruit and vegetable; and the calories in each serving of each fruit and vegetable. The NDB is maintained and provided by the United States Department of Agriculture.

TABLE 22

| Oranges, Apples, Bananas, Grapes And Grapefruit | | | | | |
|---|---|---|---|---|---|
| | Oranges | Apples | Bananas | Grapes | Grapefruit |
| NDB No. | 09202 | 09003 | 09040 | 09132 | 09236 |
| RDA serving | 1 med | 1 med | 1 med | handfull, bunch | half |
| NDB Serving Used | 1 fruit (2-7/8" dia) | 1 medium (3" dia) | 1 medium (7" to 7-7/8" long) | NLEA Serv | 0.5 fruit (3-3/4" dia) |
| Weight (g) | 140 | 182 | 118 | 126 | 123 |
| % Total FV Consumption | 14.2 | 7.3 | 4.5 | 3.1 | 2.2 |
| % Edible Portion | 68 | 90 | 64 | 96 | 51 |
| % Refuse | 32 | 10 | 36 | 4 | 49 |
| Calories (kcal) | 69 | 95 | 105 | 87 | 52 |

| Peaches, Lemons, Pears, Strawberries, Plums | | | | | |
|---|---|---|---|---|---|
| | Peaches | Lemons | Pears | Strawberry | Plums |
| NDB No. | 09236 | 09152 | 09252 | 09316 | 09279 |
| RDA serving | 1 med | not established | 1 med | 7 | 2 |
| NDB Serving Used | 1 medium (2-2/3" dia) | 1 wedge yield | 1 medium | 7 medium (1-1/4" dia) | 2 fruits (2-1/8" dia) |
| Weight (g) | 150 | 5.9 | 178 | 84 | 132 |
| % Total FV Consumption | 1.6 | 1.1 | 1.0 | 1.0 | 0.5 |
| % Edible Portion | 96 | 100 | 90 | 94 | 94 |
| % Refuse | 4 | 0 | 10 | 6 | 6 |
| Calories (kcal) | 58 | 1 | 103 | 27 | 61 |

| Avocados, Melons, Cherries, Kiwis, and Potatoes | | | | | |
|---|---|---|---|---|---|
| | Avocado | Melon | Cherries | Kiwi | Potatoes |
| NDB No. | 09037 | 09181 | 09070 | 09148 | 11356 |
| RDA serving | 0.5 | 1 lg slice | 14 | 2 | not established |
| NDB Serving Used | 0.5 avocado, NS as to FL or CA | 1 wedge, medium (1/8 of medium melon) | 14 cherries | 2 fruits without skin, medium | 1 potato small (1-3/" to 2-1/2" dia) |
| Weight (g) | 100.5 | 69 | 114.8 | 138 | 138 |
| % Total FV Consumption | 0.4 | 0.3 | 0.3 | 0.1 | 23.3 |
| % Edible Portion | 74 | 51 | 92 | 76 | 100 |
| % Refuse | 26 | 49 | 8 | 24 | 0 |
| Calories (kcal) | 161 | 23 | 72 | 84 | 134 |

| Tomatoes, Sweet Corn, Lettuce, Onions, Carrots | | | | | |
|---|---|---|---|---|---|
| | Tomatoes | Sweet Corn | Lettuce | Onions | Carrots |
| NDB No. | 11529 | 11178 | 11251 | 11252 | 11124 |
| RDA serving | 1 med | 1/2 cup | 1 cup | 1 med | 1 lg |
| NDB Serving Used | 1 medium whole (2-3/5" dia) | 0.5 cup | 1 cup shredded | 1 small | 1 cup chopped |

TABLE 22-continued

| | | | | | |
|---|---|---|---|---|---|
| Weight (g) | 123 | 68 | 47 | 70 | 128 |
| % Total FV Consumption | 14 | 4.6 | 4.0 | 3.2 | 2.4 |
| % Edible Portion | 100 | 100 | 94 | 90 | 89 |
| % Refuse | 0 | 0 | 6 | 10 | 11 |
| Calories (kcal) | 22 | 60 | 8 | 28 | 52 |

Cabbage, Snap Beans, Broccoli, Bell Peppers, Celery

| | Cabbage | Snap beans | Broccoli | Peppers | Celery |
|---|---|---|---|---|---|
| NDB No. | 11109 | 11052 | 11090 | 11951 | 11143 |
| RDA serving | 0.5 cup | 0.5 cup | 2 florets | not established | 3 stalks |
| NDB Serving Used | 1 cup, chopped 0.5" pcs | 1 cup | 1 cup, chopped | 10 strips | 3 stalks, medium (7.5"-8" long) |
| Weight (g) | 89 | 100 | 91 | 52 | 120 |
| % Total FV Consumption | 1.7 | 1.3 | 1.3 | 1.1 | 1.1 |
| % Edible Portion | 80 | 88 | 61 | 82 | 89 |
| % Refuse | 20 | 12 | 39 | 18 | 11 |
| Calories (kcal) | 22 | 31 | 31 | 14 | 19 |

Pumpkin, Squash, Sweet Potato, Mushrooms, Garlic

| | Pumpkin | Squash | Sweet Potato | Mushrooms | Garlic |
|---|---|---|---|---|---|
| NDB No. | 11422 | 11477 | 11508 | 11260 | 11215 |
| RDA serving | not established | not established | not established | 14 caps | not established |
| NDB Serving Used | 1 cup (1" cubes) | 1 cup, sliced | 1 small | 1 cup, pieces or slices | 1 clove |
| Weight (g) | 116 | 113 | 60 | 70 | 3 |
| % Total FV Consumption | 0.8 | 0.7 | 0.7 | 0.7 | 0.4 |
| % Edible Portion | 70 | 95 | 78 | 97 | 87 |
| % Refuse | 30 | 5 | 22 | 3 | 13 |
| Calories (kcal) | 30 | 19 | 54 | 15 | 4 |

Cauliflower, Spinach, Asparagus, Radish

| | Cauliflower | Spinach | Asparagus | Radish |
|---|---|---|---|---|
| NDB No. | 11135 | 11457 | 11011 | 11429 |
| RDA serving | not established | 0.5 cup | 5 spears | not established |
| NDB Serving Used | 1 cup chopped | 1 cup | 5 spears, medium (5.25" to 7" long) | 1 cup, slices |
| Weight (g) | 107 | 30 | 80 | 116 |
| % Total FV Consumption | 0.4 | 0.3 | 0.2 | 0.1 |
| % Edible Portion | 39 | 72 | 53 | 90 |
| % Refuse | 61 | 28 | 47 | 10 |
| Calories (kcal) | 27 | 7 | 16 | 19 |

Table 23 shows the amount (g) of protein nutritive components, including the amounts of the amino acid nutritive components, within various fruits and vegetables consumed within the United States. The amounts (g) of the nutritive components, as shown in Table 23, can be obtained from publicly available databases, such as, for example, the Nutrient Database (NDB) which is maintained and provided by the U.S. Department of Agriculture.

TABLE 23

Amount (g) Of Protein Nutritive Components, Within Oranges, Apples, Bananas, Grapes and Grapefruit Consumed Within The United States And Standard Equivalent Unit Provided By Each Nutritive Component From All Fruits And Vegetables.

|  | Oranges | Apples | Bananas | Grapes | Grapefruit |
|---|---|---|---|---|---|
| Protein | 1.27 | 0.47 | 1.29 | 0.91 | 0.95 |
| Tryptophan | 0.013 | 0.002 | 0.011 | 0.014 | 0.010 |
| Threonine | 0.025 | 0.011 | 0.033 | 0.028 | 0.016 |
| Isoleucine | 0.024 | 0.011 | 0.033 | 0.014 | 0.010 |
| Leucine | 0.041 | 0.024 | 0.080 | 0.028 | 0.018 |
| Lysine | 0.053 | 0.022 | 0.059 | 0.034 | 0.023 |
| Methionine | 0.013 | 0.002 | 0.009 | 0.011 | 0.009 |
| Cysteine | 0.014 | 0.002 | 0.011 | 0.013 | 0.010 |
| Phenylalanine | 0.074 | 0.011 | 0.058 | 0.024 | 0.057 |
| Tyrosine | 0.018 | 0.002 | 0.011 | 0.013 | 0.010 |
| Valine | 0.036 | 0.002 | 0.055 | 0.028 | 0.018 |
| Arginine | 0.161 | 0.011 | 0.058 | 0.164 | 0.107 |
| Histidine | 0.018 | 0.009 | 0.091 | 0.028 | 0.010 |
| Alanine | 0.045 | 0.020 | 0.047 | 0.028 | 0.030 |
| Aspartic acid | 0.195 | 0.127 | 0.146 | 0.048 | 0.170 |
| Glutamic acid | 0.346 | 0.045 | 0.179 | 0.102 | 0.242 |
| Glycine | 0.032 | 0.016 | 0.045 | 0.020 | 0.018 |
| Proline | 0.253 | 0.011 | 0.033 | 0.101 | 0.077 |
| Serine | 0.052 | 0.018 | 0.047 | 0.028 | 0.034 |

Amount (g) Of Protein Nutritive Components, Within Peaches, Lemons, Pears, Strawberries, Plums Consumed Within The United States And Standard Equivalent Unit Provided By Each Nutritive Component From All Fruits And Vegetables.

|  | Peaches | Lemons | Pears | Strawberry | Plums |
|---|---|---|---|---|---|
| Protein | 1.36 | 0.02 | 0.68 | 0.56 | 0.92 |
| Tryptophan | 0.015 | 0.000 | 0.004 | 0.007 | 0.012 |
| Threonine | 0.024 | 0.000 | 0.020 | 0.017 | 0.013 |
| Isoleucine | 0.026 | 0.000 | 0.020 | 0.013 | 0.018 |
| Leucine | 0.041 | 0.000 | 0.034 | 0.029 | 0.020 |
| Lysine | 0.045 | 0.000 | 0.030 | 0.022 | 0.021 |
| Methionine | 0.015 | 0.000 | 0.004 | 0.002 | 0.011 |
| Cysteine | 0.018 | 0.000 | 0.004 | 0.005 | 0.003 |
| Phenylalanine | 0.029 | 0.000 | 0.020 | 0.016 | 0.018 |
| Tyrosine | 0.021 | 0.000 | 0.004 | 0.018 | 0.011 |
| Valine | 0.033 | 0.000 | 0.030 | 0.016 | 0.021 |
| Arginine | 0.027 | 0.000 | 0.018 | 0.024 | 0.012 |
| Histidine | 0.019 | 0.000 | 0.004 | 0.010 | 0.012 |
| Alanine | 0.042 | 0.000 | 0.025 | 0.028 | 0.037 |
| Aspartic acid | 0.627 | 0.000 | 0.187 | 0.125 | 0.465 |
| Glutamic acid | 0.084 | 0.000 | 0.053 | 0.082 | 0.046 |
| Glycine | 0.032 | 0.000 | 0.023 | 0.022 | 0.012 |
| Proline | 0.027 | 0.000 | 0.037 | 0.017 | 0.036 |
| Serine | 0.048 | 0.000 | 0.027 | 0.021 | 0.030 |

Amount (g) Of Protein Nutritive Components, Within Avocados, Melons, Cherries, Kiwis, and Potatoes Consumed Within The United States And Standard Equivalent Unit Provided By Each Nutritive Component From All Fruits And Vegetables.

|  | Avocado | Melon | Cherries | Kiwi | Potatoes |
|---|---|---|---|---|---|
| Protein | 2.01 | 0.058 | 1.22 | 1.57 | 3.63 |
| Tryptophan | 0.025 | 0.001 | 0.010 | 0.021 | 0.035 |
| Threonine | 0.073 | 0.012 | 0.025 | 0.065 | 0.102 |
| Isoleucine | 0.084 | 0.014 | 0.023 | 0.070 | 0.106 |
| Leucine | 0.144 | 0.020 | 0.034 | 0.091 | 0.150 |
| Lysine | 0.133 | 0.021 | 0.037 | 0.084 | 0.175 |
| Methionine | 0.038 | 0.008 | 0.011 | 0.033 | 0.047 |
| Cysteine | 0.027 | 0.001 | 0.011 | 0.043 | 0.037 |
| Phenylalanine | 0.233 | 0.016 | 0.028 | 0.061 | 0.241 |
| Tyrosine | 0.049 | 0.010 | 0.016 | 0.047 | 0.097 |
| Valine | 0.108 | 0.023 | 0.028 | 0.079 | 0.171 |
| Arginine | 0.088 | 0.020 | 0.021 | 0.112 | 0.155 |
| Histidine | 0.049 | 0.010 | 0.017 | 0.037 | 0.057 |
| Alanine | 0.110 | 0.066 | 0.030 | 0.073 | 0.095 |
| Aspartic acid | 0.237 | 0.094 | 0.653 | 0.174 | 0.799 |
| Glutamic acid | 0.288 | 0.144 | 0.095 | 0.254 | 0.773 |

TABLE 23-continued

| | | | | | |
|---|---|---|---|---|---|
| Glycine | 0.105 | 0.018 | 0.026 | 0.083 | 0.087 |
| Proline | 0.098 | 0.013 | 0.045 | 0.061 | 0.112 |
| Serine | 0.115 | 0.029 | 0.024 | 0.073 | 0.119 |

Amount (g) Of Protein Nutritive Components, Within Tomatoes, Sweet Corn, Lettuce, Onions and Carrots Consumed Within The United States And Standard Equivalent Unit Provided By Each Nutritive Component From All Fruits And Vegetables.

|  | Tomatoes | Sweet Corn | Lettuce | Onions | Carrots |
|---|---|---|---|---|---|
| Protein | 1.08 | 2.05 | 0.58 | 0.77 | 1.19 |
| Tryptophan | 0.007 | 0.018 | 0.005 | 0.010 | 0.015 |
| Threonine | 0.033 | 0.060 | 0.020 | 0.015 | 0.244 |
| Isoleucine | 0.022 | 0.063 | 0.021 | 0.010 | 0.099 |
| Leucine | 0.031 | 0.247 | 0.036 | 0.018 | 0.131 |
| Lysine | 0.033 | 0.186 | 0.030 | 0.027 | 0.129 |
| Methionine | 0.007 | 0.046 | 0.007 | 0.001 | 0.026 |
| Cysteine | 0.011 | 0.031 | 0.003 | 0.003 | 0.106 |
| Phenylalanine | 0.082 | 0.092 | 0.031 | 0.018 | 0.078 |
| Tyrosine | 0.017 | 0.077 | 0.012 | 0.010 | 0.055 |
| Valine | 0.022 | 0.093 | 0.026 | 0.015 | 0.088 |
| Arginine | 0.026 | 0.083 | 0.025 | 0.073 | 0.116 |
| Histidine | 0.017 | 0.054 | 0.010 | 0.010 | 0.051 |
| Alanine | 0.033 | 0.160 | 0.026 | 0.015 | 0.145 |
| Aspartic acid | 0.166 | 0.139 | 0.065 | 0.064 | 0.243 |
| Glutamic acid | 0.0530 | 0.392 | 0.084 | 0.181 | 0.468 |
| Glycine | 0.023 | 0.072 | 0.023 | 0.018 | 0.060 |
| Proline | 0.018 | 0.249 | 0.021 | 0.008 | 0.069 |
| Serine | 0.032 | 0.110 | 0.024 | 0.015 | 0.069 |

Amount (g) Of Protein Nutritive Components, Within Cabbage, Snap Beans, Broccoli, Bell Peppers and Celery Consumed Within The United States And Standard Equivalent Unit Provided By Each Nutritive Component From All Fruits And Vegetables.

|  | Cabbage | Snap beans | Broccoli | Bell Peppers | Celery |
|---|---|---|---|---|---|
| Protein | 1.14 | 1.83 | 2.57 | 0.52 | 0.83 |
| Tryptophan | 0.010 | 0.019 | 0.030 | 0.007 | 0.011 |
| Threonine | 0.031 | 0.079 | 0.080 | 0.019 | 0.024 |
| Isoleucine | 0.027 | 0.066 | 0.072 | 0.017 | 0.025 |
| Leucine | 0.036 | 0.112 | 0.117 | 0.027 | 0.038 |
| Lysine | 0.039 | 0.088 | 0.123 | 0.023 | 0.032 |
| Methionine | 0.011 | 0.022 | 0.035 | 0.006 | 0.006 |
| Cysteine | 0.010 | 0.018 | 0.025 | 0.010 | 0.005 |
| Phenylalanine | 0.028 | 0.067 | 0.106 | 0.016 | 0.024 |
| Tyrosine | 0.017 | 0.042 | 0.045 | 0.011 | 0.011 |
| Valine | 0.037 | 0.090 | 0.114 | 0.022 | 0.032 |
| Arginine | 0.067 | 0.073 | 0.174 | 0.025 | 0.024 |
| Histidine | 0.020 | 0.034 | 0.054 | 0.010 | 0.014 |
| Alanine | 0.037 | 0.084 | 0.095 | 0.021 | 0.028 |
| Aspartic acid | 0.109 | 0.255 | 0.296 | 0.074 | 0.140 |
| Glutamic acid | 0.262 | 0.187 | 0.493 | 0.069 | 0.108 |
| Glycine | 0.027 | 0.065 | 0.081 | 0.019 | 0.025 |
| Proline | 0.043 | 0.068 | 0.100 | 0.023 | 0.022 |
| Serine | 0.047 | 0.099 | 0.110 | 0.021 | 0.024 |

Amount (g) Of Protein Nutritive Components, Within Pumpkin, Squash, Sweet Potato, Mushrooms and Garlic Consumed Within The United States And Standard Equivalent Unit Provided By Each Nutritive Component From All Fruits And Vegetables.

|  | Pumpkin | Squash | Sweet Potato | Mushrooms | Garlic |
|---|---|---|---|---|---|
| Protein | 1.16 | 1.37 | 1.21 | 2.16 | 0.19 |
| Tryptophan | 0.014 | 0.011 | 0.024 | 0.025 | 0.002 |
| Threonine | 0.034 | 0.033 | 0.064 | 0.075 | 0.005 |
| Isoleucine | 0.036 | 0.050 | 0.042 | 0.053 | 0.007 |
| Leucine | 0.053 | 0.080 | 0.071 | 0.084 | 0.009 |
| Lysine | 0.063 | 0.076 | 0.050 | 0.075 | 0.008 |
| Methionine | 0.013 | 0.020 | 0.022 | 0.022 | 0.002 |
| Cysteine | 0.003 | 0.014 | 0.017 | 0.008 | 0.002 |
| Phenylalanine | 0.037 | 0.049 | 0.068 | 0.060 | 0.005 |
| Tyrosine | 0.049 | 0.036 | 0.026 | 0.031 | 0.002 |
| Valine | 0.041 | 0.061 | 0.066 | 0.162 | 0.009 |
| Arginine | 0.063 | 0.058 | 0.042 | 0.055 | 0.019 |

TABLE 23-continued

| | | | | | |
|---|---|---|---|---|---|
| Histidine | 0.019 | 0.029 | 0.023 | 0.040 | 0.003 |
| Alanine | 0.032 | 0.071 | 0.059 | 0.139 | 0.004 |
| Aspartic acid | 0.118 | 0.166 | 0.293 | 0.137 | 0.015 |
| Glutamic acid | 0.213 | 0.146 | 0.119 | 0.240 | 0.024 |
| Glycine | 0.031 | 0.052 | 0.049 | 0.064 | 0.006 |
| Proline | 0.030 | 0.042 | 0.040 | 0.053 | 0.003 |
| Serine | 0.051 | 0.055 | 0.068 | 0.066 | 0.006 |

Amount (g) Of Protein Nutritive Components, Within Cauliflower, Spinach, Asparagus, Radish Consumed Within The United States And Standard Equivalent Unit Provided By Each Nutritive Component From All Fruits And Vegetables

| | Cauliflower | Spinach | Asparagus | Radish |
|---|---|---|---|---|
| Protein | 2.05 | 0.86 | 1.76 | 0.79 |
| Tryptophan | 0.021 | 0.012 | 0.022 | 0.010 |
| Threonine | 0.081 | 0.037 | 0.067 | 0.027 |
| Isoleucine | 0.076 | 0.044 | 0.060 | 0.023 |
| Leucine | 0.113 | 0.067 | 0.102 | 0.036 |
| Lysine | 0.232 | 0.052 | 0.083 | 0.038 |
| Methionine | 0.021 | 0.016 | 0.025 | 0.012 |
| Cysteine | 0.021 | 0.011 | 0.025 | 0.012 |
| Phenylalanine | 0.070 | 0.039 | 0.060 | 0.042 |
| Tyrosine | 0.055 | 0.032 | 0.042 | 0.010 |
| Valine | 0.134 | 0.048 | 0.092 | 0.041 |
| Arginine | 0.092 | 0.049 | 0.073 | 0.044 |
| Histidine | 0.060 | 0.019 | 0.039 | 0.015 |
| Alanine | 0.124 | 0.043 | 0.092 | 0.030 |
| Aspartic acid | 0.189 | 0.072 | 0.406 | 0.074 |
| Glutamic acid | 0.275 | 0.103 | 0.186 | 0.182 |
| Glycine | 0.076 | 0.040 | 0.074 | 0.030 |
| Proline | 0.076 | 0.034 | 0.057 | 0.026 |
| Serine | 0.092 | 0.031 | 0.085 | 0.031 |

The standard equivalent unit is calculated as follows: (1) the amount (g) of each nutritive component present in each of the fruits and vegetables consumed in the U.S. is obtained (as shown in Table 23); (2) the amount (g) of the nutritive component present in each fruit and vegetable consumed in the U.S. is multiplied by the percentage that fruit or vegetable, respectively, represents of the total fruits and vegetables consumed in the U.S. (as shown in Table 22); and (3) the weighted values of each nutritive component independently as determined in Step (2) from all of the fruits and vegetables consumed in the U.S. are added to obtain the standard equivalent unit of each nutritive component for all fruits and vegetables consumed in the U.S.

For example, to determine the standard equivalent unit for tryptophan First, the amount (g) of tryptophan present in each of the fruits and vegetables consumed in the U.S. is obtained from public databases, such as, for example, the Nutrient Database maintained and provided by the U.S. Department of Agriculture. Table 24 shows the amounts (g) of tryptophan present in each of the fruits and vegetables consumed in the U.S.

TABLE 24

| Fruit/Vegetable | Amount (g) Tryptophan |
|---|---|
| Oranges | 0.013 |
| Apples | 0.002 |
| Bananas | 0.011 |
| Grapes | 0.014 |
| Grapefruits | 0.010 |
| Peaches | 0.015 |
| Lemons | 0 |
| Pears | 0.004 |
| Strawberries | 0.007 |
| Plums | 0.012 |

TABLE 24-continued

| Fruit/Vegetable | Amount (g) Tryptophan |
|---|---|
| Avocado | 0.025 |
| Melon | 0.001 |
| Cherries | 0.010 |
| Kiwi | 0.021 |
| Potato | 0.035 |
| Tomato | 0.007 |
| Sweet corn | 0.018 |
| Lettuce | 0.005 |
| Onions | 0.010 |
| Carrots | 0.015 |
| Cabbage | 0.010 |
| Snap beans | 0.019 |
| Broccoli | 0.030 |
| Bell peppers | 0.007 |
| Celery | 0.011 |
| Pumpkin | 0.014 |
| Squash | 0.011 |
| Sweet Potato | 0.024 |
| Mushrooms | 0.025 |
| Garlic | 0.002 |
| Cauliflower | 0.021 |
| Spinach | 0.012 |
| Asparagus | 0.022 |
| Radish | 0.010 |

Second, the amount (g) of tryptophan present in each fruit or vegetable consumed in the U.S. is multiplied by the percentage that that fruit or vegetable, respectively, is of the total fruits and vegetables consumed in the U.S. The percentage of each fruit and vegetable consumed of the total amounts of fruits and vegetables consumed in the U.S. is available from public databases, such as, for example, the Nutrient Database (NDB). The NDB indicates that oranges, for example, contain 0.013 g of tryptophan and comprise 14.2% (0.142) of the total amount of fruits and vegetables consumed in the U.S. Thus, 0.013 according to this example is multiplied by 0.142 to yield 0.001846. Table 26 shows the weighted values of tryptophan for all the fruits and vegetables consumed in the U.S.

TABLE 25

| Fruit/Vegetable | Amount (g) Tryptophan | % of Total Fruits and Vegetables Consumed | Weighted Value of Tryptophan (amount of Tryptophan) * (% of total fruits and vegetables consumed) (g) |
|---|---|---|---|
| Oranges | 0.013 | 14.2 | 0.001846 |
| Apples | 0.002 | 7.3 | 0.000146 |
| Bananas | 0.011 | 4.5 | 0.000495 |
| Grapes | 0.014 | 3.1 | 0.000434 |
| Grapefruits | 0.010 | 2.2 | 0.00022 |
| Peaches | 0.015 | 1.6 | 0.00024 |
| Lemons | 0 | 1.1 | 0 |
| Pears | 0.004 | 1.0 | 0.00004 |
| Strawberries | 0.007 | 1.0 | 0.00007 |
| Plums | 0.012 | 0.5 | 0.00006 |
| Avocado | 0.025 | 0.4 | 0.0001 |
| Melon | 0.001 | 0.3 | 0.000003 |
| Cherries | 0.010 | 0.3 | 0.00003 |
| Kiwi | 0.021 | 0.1 | 0.000021 |
| Potato | 0.035 | 23.3 | 0.008155 |
| Tomato | 0.007 | 14.0 | 0.00098 |
| Sweet corn | 0.018 | 4.6 | 0.000828 |
| Lettuce | 0.005 | 4.0 | 0.0002 |
| Onions | 0.010 | 3.2 | 0.00032 |
| Carrots | 0.015 | 2.4 | 0.00036 |
| Cabbage | 0.010 | 1.7 | 0.00017 |

TABLE 25-continued

| Fruit/Vegetable | Amount (g) Tryptophan | % of Total Fruits and Vegetables Consumed | Weighted Value of Tryptophan (amount of Tryptophan) * (% of total fruits and vegetables consumed) (g) |
|---|---|---|---|
| Snap beans | 0.019 | 1.3 | 0.000247 |
| Broccoli | 0.030 | 1.3 | 0.00039 |
| Bell peppers | 0.007 | 1.1 | 0.000077 |
| Celery | 0.011 | 1.1 | 0.000121 |
| Pumpkin | 0.014 | 0.8 | 0.000112 |
| Squash | 0.011 | 0.7 | 0.000077 |
| Sweet Potato | 0.024 | 0.7 | 0.000168 |
| Mushrooms | 0.025 | 0.7 | 0.000175 |
| Garlic | 0.002 | 0.4 | 0.000008 |
| Cauliflower | 0.021 | 0.4 | 0.000084 |
| Spinach | 0.012 | 0.3 | 0.000036 |
| Asparagus | 0.022 | 0.2 | 0.000044 |
| Radish | 0.010 | 0.1 | 0.00001 |

Third, the weighted values of tryptophan from all the fruits and vegetables consumed in the U.S. are added to obtain the standard equivalent unit of tryptophan for all fruits and vegetables consumed in the U.S. Table 26 shows the standard equivalent unit of tryptophan.

TABLE 26

| Fruit/Vegetable | Weighted Value of Tryptophan (amount of Tryptophan) * (% of total fruits and vegetables consumed) (g) |
|---|---|
| Oranges | 0.001846 |
| Apples | 0.000146 |
| Bananas | 0.000495 |
| Grapes | 0.000434 |
| Grapefruits | 0.00022 |
| Peaches | 0.00024 |
| Lemons | 0 |
| Pears | 0.00004 |
| Strawberries | 0.00007 |
| Plums | 0.00006 |
| Avocado | 0.0001 |
| Melon | 0.000003 |
| Cherries | 0.00003 |
| Kiwi | 0.000021 |
| Potato | 0.008155 |
| Tomato | 0.00098 |
| Sweet corn | 0.000828 |
| Lettuce | 0.0002 |
| Onions | 0.00032 |
| Carrots | 0.00036 |
| Cabbage | 0.00017 |
| Snap beans | 0.000247 |
| Broccoli | 0.00039 |
| Bell peppers | 0.000077 |
| Celery | 0.000121 |
| Pumpkin | 0.000112 |
| Squash | 0.000077 |
| Sweet Potato | 0.000168 |
| Mushrooms | 0.000175 |
| Garlic | 0.000008 |
| Cauliflower | 0.000084 |
| Spinach | 0.000036 |

TABLE 26-continued

| Fruit/Vegetable | Weighted Value of Tryptophan (amount of Tryptophan) * (% of total fruits and vegetables consumed) (g) |
|---|---|
| Asparagus | 0.000044 |
| Radish | 0.00001 |
| Sum of Weighted Values of Tryptophan = Standard Equivalent Unit | 0.016267 grams |

Thus, the standard equivalent unit of tryptophan of fruits and vegetables consumed in the U.S. is calculated to be 0.01627 g.

Table 27 shows the standard equivalent units provided by each of the above nutritive components from all of the above fruits and vegetables.

TABLE 27

Standard Equivalent Unit based on values for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 22 and 23 above (g)

| | Standard Equivalent Unit based on values for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 22 and 23 above (g) |
|---|---|
| Protein | 1.52 |
| Tryptophan | 0.016 |
| Threonine | 0.052 |
| Isoleucine | 0.047 |
| Leucine | 0.078 |
| Lysine | 0.082 |
| Methionine | 0.020 |
| Cysteine | 0.020 |
| Phenylalanine | 0.099 |
| Tyrosine | 0.039 |
| Valine | 0.069 |
| Arginine | 0.092 |
| Histidine | 0.032 |
| Alanine | 0.059 |
| Aspartic acid | 0.312 |
| Glutamic acid | 0.389 |
| Glycine | 0.045 |
| Proline | 0.093 |
| Serine | 0.061 |

Table 28 shows the amounts of calorie nutritive component (kcal), carbohydrate nutritive component (including sugars and starch) (g), fiber nutritive component (g), and lipid nutritive component (including fatty acids (g) and cholesterol (mg)) within various fruits and vegetables consumed within the United States, as provided by the NDB. It further shows the standard equivalent unit provided by each of these nutritive components from all of the fruits and vegetables.

TABLE 28

Amounts of calorie nutritive component (kcal), carbohydrate nutritive component (including sugars and starch) (g), fiber nutritive component (g), and lipid nutritive component (including fatty acids (g) and cholesterol (mg)) within oranges, apples, bananas, grapes, and grapefruit.

|  | Oranges | Apples | Bananas | Grapes | Grapefruit |
|---|---|---|---|---|---|
| Calories (kcal) | 69 | 95 | 105 | 87 | 52 |
| Carbohydrates | 17.560 | 25.130 | 26.950 | 22.810 | 13.110 |
| Sugars | 11.900 | 18.910 | 14.430 | 19.5 | 8.470 |
| Starch | 0.000 | 0.090 | 6.350 | 0.000 | 0.000 |
| Fiber, total dietary | 3.1 | 4.4 | 3.1 | 1.1 | 2.0 |
| Lipids (Fats). total | 0.210 | 0.310 | 0.390 | 0.200 | 0.170 |
| Fatty acids, total saturated | 0.024 | 0.051 | 0.132 | 0.068 | 0.026 |
| Fatty acids, total monounsaturated | 0.042 | 0.013 | 0.038 | 0.009 | 0.025 |
| Fatty acids, total polyunsaturated | 0.043 | 0.093 | 0.086 | 0.060 | 0.044 |
| Cholesterol (mg) | 0.000 | 0.000 | 0.000 | 0.000 | 0.000 |
| Phytosterols (mg) | 34.000 | 22.000 | 19.000 | 5.000 | 0.000 |

Amounts of calorie nutritive component (kcal), carbohydrate nutritive component (including sugars and starch) (g), fiber nutritive component (g), and lipid nutritive component (including fatty acids (g) and cholesterol (mg)) within Peaches, Lemons, Pears, Strawberries, and Plums.

|  | Peaches | Lemons | Pears | Strawberry | Plums |
|---|---|---|---|---|---|
| Calories (kcal) | 58 | 1 | 103 | 27 | 61 |
| Carbohydrates | 14.310 | 0.510 | 27.520 | 6.450 | 15.070 |
| Sugars | 12.590 | 0.140 | 17.440 | 4.110 | 13.090 |
| Starch | 0.000 | 0.000 | 0.000 | 0.030 | 0.000 |
| Fiber, total dietary | 2.2 | 0.0 | 5.5 | 1.7 | 1.8 |
| Lipids (Fats). total | 0.380 | 0.000 | 0.210 | 0.250 | 0.370 |
| Fatty acids, total saturated | 0.029 | 0.000 | 0.011 | 0.013 | 0.022 |
| Fatty acids, total monounsaturated | 0.101 | 0.000 | 0.046 | 0.036 | 0.177 |
| Fatty acids, total polyunsaturated | 0.129 | 0.000 | 0.052 | 0.130 | 0.058 |
| Cholesterol (mg) | 0.000 | 0.000 | 0.000 | 0.000 | 0.000 |
| Phytosterols (mg) | 15.000 | 0.000 | 14.000 | 10.000 | 9.000 |

Amounts of calorie nutritive component (kcal), carbohydrate nutritive component (including sugars and starch) (g), fiber nutritive component (g), and lipid nutritive component (including fatty acids (g) and cholesterol (mg)) within Avocados, Melons, Cherries, Kiwis, and Potatoes.

|  | Avocado | Melon | Cherries | Kiwi | Potatoes |
|---|---|---|---|---|---|
| Calories (kcal) | 161 | 23 | 72 | 84 | 134 |
| Carbohydrates | 8.570 | 5.630 | 18.380 | 20.230 | 29.560 |
| Sugars | 0.660 | 5.420 | 14.720 | 12.410 | 1.490 |
| Starch | 0.110 | 0.020 | 0.000 | 0.000 | 24.080 |
| Fiber, total dietary | 6.7 | 0.6 | 2.4 | 4.1 | 3.2 |
| Lipids (Fats). total | 14.730 | 0.130 | 0.230 | 0.720 | 0.180 |
| Fatty acids, total saturated | 2.137 | 0.035 | 0.044 | 0.040 | 0.035 |
| Fatty acids, total monounsaturated | 9.848 | 0.002 | 0.054 | 0.065 | 0.003 |
| Fatty acids, total polyunsaturated | 1.825 | 0.056 | 0.060 | 0.396 | 0.058 |
| Cholesterol (mg) | 0.000 | 0.000 | 0.000 | 0.000 | 0.000 |
| Phytosterols (mg) | 83.000 | 7.000 | 14.000 | 0.000 | 0.000 |

Amounts of calorie nutritive component (kcal), carbohydrate nutritive component (including sugars and starch) (g), fiber nutritive component (g), and lipid nutritive component (including fatty acids(g) and cholesterol (mg)) within Tomatoes, Sweet Corn, Lettuce, Onions, and Carrots.

|  | Tomatoes | Sweet Corn | Lettuce | Onions | Carrots |
|---|---|---|---|---|---|
| Calories (kcal) | 22 | 60 | 8 | 28 | 52 |
| Carbohydrates | 4.820 | 14.080 | 1.550 | 6.540 | 12.260 |
| Sugars | 3.230 | 1.700 | 0.560 | 2.970 | 6.070 |
| Starch | 0.000 | 10.270 | 0.000 | 0.000 | 1.830 |

TABLE 28-continued

| | | | | | |
|---|---|---|---|---|---|
| Fiber, total dietary | 1.5 | 1.4 | 1.0 | 1.2 | 3.6 |
| Lipids (Fats). | 0.250 | 0.530 | 0.140 | 0.070 | 0.310 |
| Fatty acids, total saturated | 0.034 | 0.081 | 0.018 | 0.029 | 0.047 |
| Fatty acids, total monounsaturated | 0.038 | 0.154 | 0.006 | 0.009 | 0.018 |
| Fatty acids, total polyunsaturated | 0.102 | 0.249 | 0.075 | 0.012 | 0.150 |
| Cholesterol (mg) | 0.000 | 0.000 | 0.000 | 0.000 | 0.000 |
| Phytosterols (mg) | 9.000 | 0.000 | 0.000 | 10.000 | 0.000 |

Amounts of calorie nutritive component (kcal), carbohydrate nutritive component (including sugars and starch) (g), fiber nutritive component (g), and lipid nutritive component (including fatty acids(g) and cholesterol (mg)) within Cabbage, Snap Beans, Broccoli, Bell Peppers, and Celery.

| | Cabbage | Snap beans | Broccoli | Bell Peppers | Celery |
|---|---|---|---|---|---|
| Calories (kcal) | 22 | 31 | 31 | 14 | 19 |
| Carbohydrates | 5.160 | 6.970 | 6.040 | 3.290 | 3.560 |
| Sugars | 2.850 | 3.260 | 1.550 | 0.000 | 2.200 |
| Starch | 0.000 | 0.880 | 0.000 | 0.000 | 0.000 |
| Fiber, total dietary | 2.2 | 2.7 | 2.4 | 0.5 | 1.9 |
| Lipids (Fats). total | 0.090 | 0.220 | 0.340 | 0.110 | 0.200 |
| Fatty acids, total saturated | 0.030 | 0.050 | 0.035 | 0.016 | 0.050 |
| Fatty acids, total monounsaturated | 0.015 | 0.010 | 0.010 | 0.000 | 0.038 |
| Fatty acids, total polyunsaturated | 0.015 | 0.113 | 0.035 | 0.000 | 0.095 |
| Cholesterol (mg) | 0.000 | 0.000 | 0.000 | 0.000 | 0.000 |
| Phytosterols (mg) | 10.000 | 0.000 | 0.000 | 0.000 | 7.000 |

Amounts of calorie nutritive component (kcal), carbohydrate nutritive component (including sugars and starch) (g), fiber nutritive component (g), and lipid nutritive component (including fatty acids(g) and cholesterol (mg)) within Pumpkin, Squash, Sweet Potato, Mushrooms, and Garlic.

| | Pumpkin | Squash | Sweet Potato | Mushrooms | Garlic |
|---|---|---|---|---|---|
| Calories (kcal) | 30 | 19 | 54 | 15 | 4 |
| Carbohydrates | 7.540 | 3.510 | 12.430 | 2.280 | 0.990 |
| Sugars | 1.580 | 2.830 | 3.890 | 1.390 | 0.030 |
| Starch | 0.000 | 0.000 | 4.230 | 0.000 | 0.000 |
| Fiber, total dietary | 0.6 | 1.1 | 2.0 | 0.7 | 0.1 |
| Lipids (Fats). total | 0.120 | 0.360 | 0.090 | 0.240 | 0.010 |
| Fatty acids, total saturated | 0.060 | 0.095 | 0.020 | 0.035 | 0.003 |
| Fatty acids, total monounsaturated | 0.015 | 0.012 | 0.001 | 0.000 | 0.000 |
| Fatty acids, total polyunsaturated | 0.006 | 0.103 | 0.038 | 0.112 | 0.007 |
| Cholesterol (mg) | 0.000 | 0.000 | 0.000 | 0.000 | 0.000 |
| Phytosterols (mg) | 14.000 | 0.000 | 0.000 | 1.000 | 0.000 |

Amounts of calorie nutritive component (kcal), carbohydrate nutritive component (including sugars and starch) (g), fiber nutritive component (g), and lipid nutritive component (including fatty acids(g) and cholesterol (mg)) within Cauliflower, Spinach, Asparagus, and Radish.

| | Cauliflower | Spinach | Asparagus | Radish |
|---|---|---|---|---|
| Calories (kcal) | 27 | 7 | 16 | 19 |
| Carbohydrates | 5.320 | 1.090 | 3.100 | 3.940 |
| Sugars | 2.040 | 0.130 | 1.500 | 2.160 |
| Starch | 0.000 | 0.000 | 0.000 | 0.000 |
| Fiber, total dietary | 2.1 | .07 | 1.7 | 1.9 |
| Lipids (Fats). total | 0.300 | 0.120 | 0.100 | 0.120 |
| Fatty acids, total saturated | 0.068 | 0.019 | 0.032 | 0.037 |
| Fatty acids, total monounsaturated | 0.018 | 0.003 | 0.000 | 0.020 |

TABLE 28-continued

| | | | | |
|---|---|---|---|---|
| Fatty acids, total polyunsaturated | 0.016 | 0.050 | 0.040 | 0.056 |
| Cholesterol (mg) | 0.000 | 0.000 | 0.000 | 0.000 |
| Phytosterols (mg) | 19.000 | 3.000 | 19.000 | 8.000 |

The standard equivalent unit is calculated as follows: (1) the amount (g) of each nutritive component present in each of the fruits and vegetables consumed in the U.S. is obtained (as shown in Table 28); (2) the amount (g) of the nutritive component present in each fruit and vegetable consumed in the U.S. is multiplied by the percentage of that that fruit or vegetable, respectively, is of the total fruits and vegetables consumed in the U.S. (as shown in Table 22); and (3) the weighted values of each nutritive component independently as determined in Step (2) from all of the fruits and vegetables consumed in the U.S. are added to obtain the standard equivalent unit of each nutritive component for all fruits and vegetables consumed in the U.S.

For example, to determine the standard equivalent unit for fiber (total dietary), first, the amount (g) of fiber (total dietary) present in each of the fruits and vegetables consumed in the U.S. is obtained from public databases, such as, for example, the Nutrient Database maintained and provided by the U.S. Department of Agriculture. Table 29 shows the amounts (g) of fiber (total dietary) present in each of the fruits and vegetables consumed in the U.S.

TABLE 29

Amounts (g) of fiber (total dietary) present in each of the fruits and vegetables consumed in the U.S.

| Fruit/Vegetable | Amount (g) fiber (total dietary) |
|---|---|
| Oranges | 3.1 |
| Apples | 4.4 |
| Bananas | 3.1 |
| Grapes | 1.1 |
| Grapefruits | 2.0 |
| Peaches | 2.2 |
| Lemons | 0 |
| Pears | 5.5 |
| Strawberries | 1.7 |
| Plums | 1.8 |
| Avocado | 6.7 |
| Melon | 0.6 |
| Cherries | 2.4 |
| Kiwi | 4.1 |
| Potato | 3.2 |
| Tomato | 1.5 |
| Sweet corn | 1.4 |
| Lettuce | 1.0 |
| Onions | 1.2 |
| Carrots | 3.6 |
| Cabbage | 2.2 |
| Snap beans | 2.7 |
| Broccoli | 2.4 |
| Bell peppers | 0.5 |
| Celery | 1.9 |
| Pumpkin | 0.6 |
| Squash | 1.1 |
| Sweet Potato | 2.0 |
| Mushrooms | 0.7 |
| Garlic | 0.1 |
| Cauliflower | 2.1 |
| Spinach | 0.7 |
| Asparagus | 1.7 |
| Radish | 1.9 |

Second, the amount (g) of fiber (total dietary) present in each fruit or vegetable consumed in the U.S. is multiplied by the percentage that that fruit or vegetable, respectively, is of the total fruits and vegetables consumed in the U.S. The percentage of each fruit and vegetable consumed of the total amounts of fruits and vegetables consumed in the U.S. is available from public databases, such as, for example, the Nutrient Database (NDB). The NDB indicates that oranges, for example, contain 3.1 g of fiber (total dietary) and comprise 14.2% (0.142) of the total amount of fruits and vegetables consumed in the U.S. Thus, multiply 3.1 by 0.142 to yield 0.4402. Table 30 shows these weighted values of fiber (total dietary) for all the fruits and vegetables consumed in the U.S.

TABLE 30

Weighted values of fiber (total dietary) for all the fruits and vegetables consumed in the United States

| Fruit/Vegetable | Amount (g) fiber (total dietary) | % of Total Fruits and Vegetables Consumed | Weighted Value of fiber (amount of fiber (total dietary (g))) * (% of total fruits and vegetables consumed) |
|---|---|---|---|
| Oranges | 3.1 | 14.2 | 0.4402 |
| Apples | 4.4 | 7.3 | 0.3212 |
| Bananas | 3.1 | 4.5 | 0.1395 |
| Grapes | 1.1 | 3.1 | 0.0341 |
| Grapefruits | 2.0 | 2.2 | 0.044 |
| Peaches | 2.2 | 1.6 | 0.0352 |
| Lemons | 0 | 1.1 | 0 |
| Pears | 5.5 | 1.0 | 0.055 |
| Strawberries | 1.7 | 1.0 | 0.017 |
| Plums | 1.8 | 0.5 | 0.009 |
| Avocado | 6.7 | 0.4 | 0.0268 |
| Melon | 0.6 | 0.3 | 0.0018 |
| Cherries | 2.4 | 0.3 | 0.0072 |
| Kiwi | 4.1 | 0.1 | 0.0041 |
| Potato | 3.2 | 23.3 | 0.7456 |
| Tomato | 1.5 | 14.0 | 0.21 |
| Sweet corn | 1.4 | 4.6 | 0.0644 |
| Lettuce | 1.0 | 4.0 | 0.04 |
| Onions | 1.2 | 3.2 | 0.0384 |
| Carrots | 3.6 | 2.4 | 0.0864 |
| Cabbage | 2.2 | 1.7 | 0.0374 |
| Snap beans | 2.7 | 1.3 | 0.0351 |
| Broccoli | 2.4 | 1.3 | 0.0312 |
| Bell peppers | 0.5 | 1.1 | 0.0055 |
| Celery | 1.9 | 1.1 | 0.0209 |
| Pumpkin | 0.6 | 0.8 | 0.0048 |
| Squash | 1.1 | 0.7 | 0.0077 |
| Sweet Potato | 2.0 | 0.7 | 0.014 |
| Mushrooms | 0.7 | 0.7 | 0.0049 |
| Garlic | 0.1 | 0.4 | 0.0004 |
| Cauliflower | 2.1 | 0.4 | 0.0084 |
| Spinach | 0.7 | 0.3 | 0.0021 |
| Asparagus | 1.7 | 0.2 | 0.0034 |
| Radish | 1.9 | 0.1 | 0.0019 |

Third, the weighted values of fiber (total dietary) from all the fruits and vegetables consumed in the U.S. to obtain the standard equivalent unit of fiber (total dietary) for all fruits and vegetables consumed in the U.S. are added Table 31 shows the standard equivalent unit of fiber (total dietary).

TABLE 31

Standard Equivalent Unit of Fiber (Total Dietary)

| Fruit/Vegetable | Weighted Value of fiber (amount (g) of fiber (total dietary)) * (% of total fruits and vegetables consumed) |
|---|---|
| Oranges | 0.4402 |
| Apples | 0.3212 |
| Bananas | 0.1395 |
| Grapes | 0.0341 |
| Grapefruits | 0.044 |
| Peaches | 0.0352 |
| Lemons | 0 |
| Pears | 0.055 |
| Strawberries | 0.017 |
| Plums | 0.009 |
| Avocado | 0.0268 |
| Melon | 0.0018 |
| Cherries | 0.0072 |
| Kiwi | 0.0041 |
| Potato | 0.7456 |
| Tomato | 0.21 |
| Sweet corn | 0.0644 |
| Lettuce | 0.04 |
| Onions | 0.0384 |
| Carrots | 0.0864 |
| Cabbage | 0.0374 |
| Snap beans | 0.0351 |
| Broccoli | 0.0312 |
| Bell peppers | 0.0055 |
| Celery | 0.0209 |
| Pumpkin | 0.0048 |
| Squash | 0.0077 |
| Sweet Potato | 0.014 |
| Mushrooms | 0.0049 |
| Garlic | 0.0004 |
| Cauliflower | 0.0084 |
| Spinach | 0.0021 |
| Asparagus | 0.0034 |
| Radish | 0.0019 |
| Sum of Weighted Values of fiber (total dietary) = Standard Equivalent Unit | 2.4976 grams |

Thus, the standard equivalent unit of fiber (total dietary) of fruits and vegetables consumed in the U.S. is calculated to be 2.4976 grams.

Table 32. shows the standard equivalent unit provided by each of the above nutritive components from all of the above fruits and vegetables.

TABLE 32

Standard Equivalent Unit Based on Values for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 23 and 29 above

| | Standard Equivalent Unit based on values for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 23 and 29 above |
|---|---|
| Calories (kcal) | 71 |
| Carbohydrates (g) | 16.647 |
| Sugars (g) | 6.429 |
| Starch (g) | 6.5 |
| Fiber, total dietary (g) | 2.5 |
| Lipids (Fats). total | 0.290 |
| Fatty acids, total saturated (g) | 0.049 |
| Fatty acids, total monounsaturated (g) | 0.068 |
| Fatty acids, total polyunsaturated (g) | 0.083 |
| Cholesterol (mg) | 0.000 |
| Phytosterols (mg) | 10.441 |

Table 33 shows the amounts (g) of mineral nutritive components of within various fruits and vegetables consumed within the United States; it further shows the standard equivalent unit provided by each of these mineral nutritive components from all of the fruits and vegetables.

TABLE 33

Amounts of mineral nutritive components in Oranges, Apples, Bananas, Grapes And Grapefruit.

| | Oranges | Apples | Bananas | Grapes | Grapefruit |
|---|---|---|---|---|---|
| Calcium (mg) | 60 | 11 | 6 | 13 | 27 |
| Iron (mg) | 0.18 | 0.22 | 0.31 | 0.45 | 0.1 |
| Magnesium (mg) | 15 | 9 | 32 | 9 | 11 |
| Phosphorous (mg) | 32 | 20 | 26 | 25 | 22 |
| Potassium (mg) | 232 | 195 | 422 | 241 | 166 |
| Sodium (mg) | 1 | 2 | 1 | 3 | 0 |
| Zinc (mg) | 0.11 | 0.07 | 0.18 | 0.09 | 0.26 |
| Copper (mg) | 0.055 | 0.049 | 0.092 | 0.160 | 0.039 |
| Manganese (mg) | 0.041 | 0.064 | 0.319 | 0.089 | 0.027 |
| Fluoride (µg) | 0.0 | 6.0 | 2.6 | 9.8 | 0.0 |
| Selenium (µg) | 0.0 | 0.0 | 1.2 | 0.1 | 0.1 |

Amounts of mineral nutritive components in Peaches, Lemons, Pears, Strawberries, and Plums.

| | Peaches | Lemons | Pears | Strawberry | Plums |
|---|---|---|---|---|---|
| Calcium (mg) | 9 | 0 | 16 | 13 | 8 |
| Iron (mg) | 0.38 | 0 | 0.3 | 0.34 | 0.22 |

TABLE 33-continued

| | | | | | |
|---|---|---|---|---|---|
| Magnesium (mg) | 14 | 0 | 12 | 11 | 9 |
| Phosphorous (mg) | 30 | 0 | 20 | 20 | 21 |
| Potassium (mg) | 285 | 0 | 212 | 129 | 207 |
| Sodium (mg) | 0 | 7 | 2 | 1 | 0 |
| Zinc (mg) | 0.26 | 0.00 | 0.18 | 0.12 | 0.13 |
| Copper (mg) | 0.102 | 0.000 | 0.146 | 0.040 | 0.075 |
| Manganese (mg) | 0.091 | 0.002 | 0.087 | 0.324 | 0.069 |
| Fluoride (μg) | 6.0 | 0.0 | 3.9 | 3.7 | 2.6 |
| Selenium (μg) | 0.1 | 0.0 | 0.2 | 0.3 | 0.0 |

Amounts of mineral nutritive components in Avocados, Melons, Cherries, Kiwis, and Potatoes.

| | Avocado | Melon | Cherries | Kiwi | Potatoes |
|---|---|---|---|---|---|
| Calcium (mg) | 12 | 6 | 15 | 47 | 25 |
| Iron (mg) | 0.55 | 0.14 | 0.41 | 0.43 | 1.48 |
| Magnesium (mg) | 29 | 8 | 13 | 23 | 41 |
| Phosphorous (mg) | 52 | 10 | 24 | 47 | 98 |
| Potassium (mg) | 487 | 184 | 255 | 431 | 759 |
| Sodium (mg) | 7 | 11 | 0 | 4 | 19 |
| Zinc (mg) | 0.64 | 0.12 | 0.08 | 0.19 | 0.48 |
| Copper (mg) | 0.191 | 0.028 | 0.069 | 0.179 | 0.148 |
| Manganese (mg) | 0.143 | 0.028 | 0.080 | 0.135 | 0.315 |
| Fluoride (μg) | 7.0 | 0.7 | 2.3 | 0.0 | 62.4 |
| Selenium (μg) | 0.4 | 0.3 | 0.0 | 0.3 | 0.7 |

Amounts of mineral nutritive components in Tomatoes, Sweet Corn, Lettuce, Onions, and Carrots.

| | Tomatoes | Sweet Corn | Lettuce | Onions | Carrots |
|---|---|---|---|---|---|
| Calcium (mg) | 12 | 3 | 16 | 16 | 42 |
| Iron (mg) | 0.33 | 0.29 | 0.46 | 0.15 | 0.38 |
| Magnesium (mg) | 14 | 12 | 7 | 7 | 15 |
| Phosphorous (mg) | 30 | 48 | 14 | 20 | 45 |
| Potassium (mg) | 292 | 145 | 116 | 102 | 410 |
| Sodium (mg) | 6 | 2 | 4 | 3 | 88 |
| Zinc (mg) | 0.21 | 0.26 | 0.11 | 0.12 | 0.31 |
| Copper (mg) | 0.073 | 0.024 | 0.023 | 0.027 | 0.058 |
| Manganese (mg) | 0.140 | 0.084 | 0.073 | 0.090 | 0.183 |
| Fluoride (μg) | 2.8 | 9.9 | 0.0 | 0.8 | 4.1 |
| Selenium (μg) | 0.0 | 0.5 | 0.2 | 0.3 | 0.1 |

Amounts of mineral nutritive components in Cabbage, Snap beans, Broccoli, Bell Peppers, and Celery.

| | Cabbage | Snap beans | Broccoli | Bell Peppers | Celery |
|---|---|---|---|---|---|
| Calcium (mg) | 36 | 37 | 43 | 6 | 48 |
| Iron (mg) | 0.42 | 1.03 | 0.66 | 0.24 | 0.24 |
| Magnesium (mg) | 11 | 25 | 19 | 6 | 13 |
| Phosphorous (mg) | 23 | 38 | 60 | 12 | 29 |
| Potassium (mg) | 151 | 211 | 288 | 110 | 312 |
| Sodium (mg) | 16 | 6 | 30 | 1 | 96 |
| Zinc (mg) | 0.16 | 0.24 | 0.37 | 0.09 | 0.16 |
| Copper (mg) | 0.017 | 0.069 | 0.045 | 0.056 | 0.042 |
| Manganese (mg) | 0.142 | 0.216 | 0.191 | 0.061 | 0.124 |
| Fluoride (μg) | 0.9 | 19.0 | 0.0 | 0.0 | 4.8 |
| Selenium (μg) | 0.3 | 0.6 | 2.3 | 0.2 | 0.5 |

Amounts of mineral nutritive components in Pumpkin, Squash, Sweet Potato, Mushrooms, and Garlic.

| | Pumpkin | Squash | Sweet Potato | Mushrooms | Garlic |
|---|---|---|---|---|---|
| Calcium (mg) | 24 | 18 | 23 | 2 | 5 |
| Iron (mg) | 0.93 | 0.42 | 0.41 | 0.35 | 0.05 |
| Magnesium (mg) | 14 | 20 | 16 | 6 | 1 |
| Phosphorous (mg) | 51 | 43 | 32 | 60 | 5 |
| Potassium (mg) | 394 | 295 | 285 | 223 | 12 |
| Sodium (mg) | 1 | 9 | 22 | 4 | 1 |
| Zinc (mg) | 0.37 | 0.36 | 0.19 | 0.36 | 0.03 |
| Copper (mg) | 0.147 | 0.060 | 0.097 | 0.223 | 0.009 |
| Manganese (mg) | 0.145 | 0.200 | 0.298 | 0.033 | 0.50 |
| Fluoride (μg) | 0.0 | 0.0 | 0.0 | 0.0 | 0.0 |
| Selenium (μg) | 0.3 | 0.2 | 0.1 | 6.5 | 0.4 |

TABLE 33-continued

Amounts of mineral nutritive components in Cauliflower, Spinach, Asparagus and Radish.

|  | Cauliflower | Spinach | Asparagus | Radish |
|---|---|---|---|---|
| Calcium (mg) | 24 | 30 | 19 | 29 |
| Iron (mg) | 0.45 | 0.81 | 1.71 | 0.39 |
| Magnesium (mg) | 16 | 24 | 11 | 12 |
| Phosphorous (mg) | 47 | 15 | 42 | 23 |
| Potassium (mg) | 320 | 167 | 162 | 270 |
| Sodium (mg) | 32 | 24 | 2 | 45 |
| Zinc (mg) | 0.29 | 0.16 | 0.43 | 0.32 |
| Copper (mg) | 0.042 | 0.039 | 0.151 | 0.058 |
| Manganese (mg) | 0.166 | 0.269 | 0.126 | 0.080 |
| Fluoride (µg) | 1.1 | 0.0 | 0.0 | 7.0 |
| Selenium (µg) | 0.6 | 0.3 | 1.8 | 0.7 |

The standard equivalent unit is calculated as follows: (1) the amount (g) of each nutritive component present in each of the fruits and vegetables consumed in the U.S. is obtained (as shown in Table 33); (2) the amount (g) of the nutritive component present in each fruit and vegetable consumed in the U.S. is multiplied by the percentage of that that fruit or vegetable, respectively, is of the total fruits and vegetables consumed in the U.S. (as shown in Table 22); and (3) the weighted values of each nutritive component independently as determined in Step (2) from all of the fruits and vegetables consumed in the U.S. are added to obtain the standard equivalent unit of each nutritive component for all fruits and vegetables consumed in the U.S.

For example, to determine the standard equivalent unit for calcium, first, obtain the amount (g) of calcium present in each of the fruits and vegetables consumed in the U.S. from public databases, such as, for example, the Nutrient Database maintained and provided by the U.S. Department of Agriculture. Table 34 shows the amounts (mg) of calcium present in each of the fruits and vegetables consumed in the U.S.

TABLE 34

Amounts (mg) of Calcium Present in Each of the Fruits and Vegetables Consumed in the United States

| Fruit/Vegetable | Amount (mg) calcium |
|---|---|
| Oranges | 60 |
| Apples | 11 |
| Bananas | 6 |
| Grapes | 13 |
| Grapefruits | 27 |
| Peaches | 9 |
| Lemons | 0 |
| Pears | 16 |
| Strawberries | 13 |
| Plums | 8 |
| Avocado | 12 |
| Melon | 6 |
| Cherries | 15 |
| Kiwi | 47 |
| Potatoes | 25 |
| Tomatoes | 12 |
| Sweet corn | 3 |
| Lettuce | 16 |
| Onions | 16 |
| Carrots | 42 |
| Cabbage | 36 |
| Snap beans | 37 |
| Broccoli | 43 |
| Bell peppers | 6 |
| Celery | 48 |

TABLE 34-continued

Amounts (mg) of Calcium Present in Each of the Fruits and Vegetables Consumed in the United States

| Fruit/Vegetable | Amount (mg) calcium |
|---|---|
| Pumpkin | 24 |
| Squash | 18 |
| Sweet Potato | 23 |
| Mushrooms | 2 |
| Garlic | 5 |
| Cauliflower | 24 |
| Spinach | 30 |
| Asparagus | 19 |
| Radish | 29 |

Second, the amount (g) of calcium present in each fruit or vegetable consumed in the U.S. is multiplied by the percentage that that fruit or vegetable, respectively, represents of the total fruits and vegetables consumed in the U.S. The percentage of each fruit and vegetable consumed of the total amounts of fruits and vegetables consumed in the U.S. is available from public databases, such as, for example, the Nutrient Database (NDB). The NDB indicates that oranges, for example, contain 60 g of calcium and comprise 14.2% (0.142) of the total amount of fruits and vegetables consumed in the U.S. Thus, 60 times 0.142 yields the value 8.52. Table 35 shows these weighted values of calcium for all the fruits and vegetables consumed in the U.S.

TABLE 35

Weighted Value Of Calcium For All Fruits And Vegetables Consumed In The United States.

| Fruit/Vegetable | Amount (mg) calcium | % of Total Fruits and Vegetables Consumed | Weighted Value of calcium (amount of calcium) * (% of total fruits and vegetables consumed) |
|---|---|---|---|
| Oranges | 60 | 14.2 | 8.52 |
| Apples | 11 | 7.3 | 0.803 |
| Bananas | 6 | 4.5 | 0.27 |
| Grapes | 13 | 3.1 | 0.403 |
| Grapefruits | 27 | 2.2 | 0.594 |
| Peaches | 9 | 1.6 | 0.144 |
| Lemons | 0 | 1.1 | 0 |
| Pears | 16 | 1.0 | 0.16 |
| Strawberries | 13 | 1.0 | 0.13 |
| Plums | 8 | 0.5 | 0.04 |

TABLE 35-continued

Weighted Value Of Calcium For All Fruits And Vegetables Consumed In The United States.

| Fruit/Vegetable | Amount (mg) calcium | % of Total Fruits and Vegetables Consumed | Weighted Value of calcium (amount of calcium) * (% of total fruits and vegetables consumed) |
|---|---|---|---|
| Avocado | 12 | 0.4 | 0.048 |
| Melon | 6 | 0.3 | 0.018 |
| Cherries | 15 | 0.3 | 0.045 |
| Kiwi | 47 | 0.1 | 0.047 |
| Potato | 25 | 23.3 | 5.825 |
| Tomato | 12 | 14.0 | 1.68 |
| Sweet corn | 3 | 4.6 | 0.138 |
| Lettuce | 16 | 4.0 | 0.64 |
| Onions | 16 | 3.2 | 0.512 |
| Carrots | 42 | 2.4 | 1.008 |
| Cabbage | 36 | 1.7 | 0.612 |
| Snap beans | 37 | 1.3 | 0.481 |
| Broccoli | 43 | 1.3 | 0.559 |
| Bell peppers | 6 | 1.1 | 0.066 |
| Celery | 48 | 1.1 | 0.528 |
| Pumpkin | 24 | 0.8 | 0.192 |
| Squash | 18 | 0.7 | 0.126 |
| Sweet Potato | 23 | 0.7 | 0.161 |
| Mushrooms | 2 | 0.7 | 0.014 |
| Garlic | 5 | 0.4 | 0.02 |
| Cauliflower | 24 | 0.4 | 0.096 |
| Spinach | 30 | 0.3 | 0.09 |
| Asparagus | 19 | 0.2 | 0.038 |
| Radish | 29 | 0.1 | 0.029 |

Third, the weighted values of calcium from all the fruits and vegetables consumed in the U.S. to obtain the standard equivalent unit of calcium for all fruits and vegetables consumed in the U.S. are added. Table 36 shows the standard equivalent unit of calcium.

TABLE 36

Standard Equivalent Unit of Calcium

| Fruit/Vegetable | Weighted Value of calcium (amount (mg) of calcium) * (% of total fruits and vegetables consumed) |
|---|---|
| Oranges | 8.52 |
| Apples | 0.803 |
| Bananas | 0.27 |
| Grapes | 0.403 |
| Grapefruits | 0.594 |
| Peaches | 0.144 |
| Lemons | 0 |
| Pears | 0.16 |
| Strawberries | 0.13 |
| Plums | 0.04 |
| Avocado | 0.048 |
| Melon | 0.018 |
| Cherries | 0.045 |
| Kiwi | 0.047 |
| Potato | 5.825 |
| Tomato | 1.68 |
| Sweet corn | 0.138 |
| Lettuce | 0.64 |
| Onions | 0.512 |
| Carrots | 1.008 |
| Cabbage | 0.612 |
| Snap beans | 0.481 |
| Broccoli | 0.559 |

TABLE 36-continued

Standard Equivalent Unit of Calcium

| Fruit/Vegetable | Weighted Value of calcium (amount (mg) of calcium) * (% of total fruits and vegetables consumed) |
|---|---|
| Bell peppers | 0.066 |
| Celery | 0.528 |
| Pumpkin | 0.192 |
| Squash | 0.126 |
| Sweet Potato | 0.161 |
| Mushrooms | 0.014 |
| Garlic | 0.02 |
| Cauliflower | 0.096 |
| Spinach | 0.09 |
| Asparagus | 0.038 |
| Radish | 0.029 |
| Sum of Weighted Values of calcium = Standard Equivalent Unit | 24.037 mg |

Thus, the standard equivalent unit of calcium of fruits and vegetables consumed in the U.S. is calculated to be 24.037.

Table 37. shows the standard equivalent unit provided by each of the above nutritive components from all of the above fruits and vegetables.

TABLE 37

Standard Equivalent Unit based on values (mg) for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 22 and 33 above

| | Standard Equivalent Unit based on values (mg) for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 22 and 33 above |
|---|---|
| Calcium | 24.037 |
| Iron | 0.585 |
| Magnesium | 19.926 |
| Phosphorous | 45.126 |
| Potassium | 357.026 |
| Sodium | 10.638 |
| Zinc | 0.239 |
| Copper | 0.083 |
| Manganese | 0.159 |
| Fluoride (μg) | 16.918 |
| Selenium | 0.385 |

Table 38 shows the amounts (g) of vitamin nutritive components of within various fruits and vegetables consumed within the United States; it further shows the standard equivalent unit provided by each of these vitamin nutritive components from all of the fruits and vegetables.

TABLE 38

Amounts of vitamin nutritive components including vitamin C (mg), thiamine (mg), riboflavin (mg), niacin (mg), pantothenic acid (mg), vitamin B6 (mg), folate (μg), choline (mg), betaine (mg), vitamin B12 (μg), vitamin A (μg), retinol (μg), β-carotene (μg), α-carotene (μg), cryptoxanthin (β) (μg), vitamin A (IU), lycopene (μg), lutein + zeaxanthin (μg), vitamin E (α-tocopherol) (mg), β-tocopherol (mg), γ-tocopherol (mg), δ-tocopherol (mg), vitamin D (IU), and vitamin K (μg) in Oranges, Apples, Bananas, Grapes And Grapefruit.

|  | Oranges | Apples | Bananas | Grapes | Grapefruit |
|---|---|---|---|---|---|
| Vitamin C, total ascorbic acid | 82.7 | 8.4 | 10.3 | 13.6 | 38.4 |
| Thiamine | 0.095 | 0.031 | 0.037 | 0.087 | 0.053 |
| Riboflavin | 0.071 | 0.047 | 0.086 | 0.088 | 0.038 |
| Niacin | 0.595 | 0.166 | 0.785 | 0.237 | 0.251 |
| Pantothenic acid | 0.365 | 0.111 | 0.394 | 0.063 | 0.322 |
| Vitamin B6 | 0.111 | 0.075 | 0.433 | 0.108 | 0.065 |
| Folate, food | 48 | 5 | 24 | 3 | 16 |
| Choline, total | 11.8 | 6.2 | 11.6 | 7.1 | 9.5 |
| Betaine | 0.1 | 0.2 | 0.1 | 0.1 | 0.1 |
| Vitamin B12 | 0.00 | 0.00 | 0.00 | 0.00 | 0.00 |
| Vitamin A | 17 | 5 | 4 | 4 | 71 |
| Retinol | 0 | 0 | 0 | 0 | 0 |
| Carotene, β | 122 | 49 | 31 | 49 | 844 |
| Carotene, α | 10 | 0 | 30 | 1 | 4 |
| Cryptoxanthin, β | 162 | 30 | 0 | 0 | 7 |
| Vitamin A (IU) | 346 | 98 | 76 | 83 | 1414 |
| Lycopene | 0 | 0 | 0 | 0 | 1745 |
| Lutein + zeaxanthin | 181 | 53 | 26 | 91 | 6 |
| Vitamin E (α-tocopherol) | 0.21 | 0.33 | 0.12 | 0.24 | 0.16 |
| Tocopherol, β | 0.00 | 0.00 | 0.00 | 0.00 | 0.00 |
| Tocopherol, γ | 0.00 | 0.00 | 0.00 | 0.09 | 0.00 |
| Tocopherol, δ | 0.00 | 0.00 | 0.00 | 0.00 | 0.00 |
| Vitamin D | 0 | 0 | 0 | 0 | 0 |
| Vitamin K | 0.0 | 4.0 | 0.6 | 18.4 | 0.0 |

Amounts of vitamin nutritive components including vitamin C (μg), thiamine (mg), riboflavin (mg), niacin (mg), pantothenic acid (mg), vitamin B6 (mg), folate (μg), choline (mg), betaine (mg), vitamin B12 (μg), vitamin A (μg), retinol (μg), β-carotene (μg), α-carotene (μg), cryptoxanthin (β) (μg), vitamin A (IU), lycopene (μg), lutein + zeaxanthin (μg), vitamin E (α-tocopherol) (mg), β-tocopherol (mg), γ-tocopherol (mg), δ-tocopherol (mg), vitamin D (IU), and vitamin K (μg) in Peaches, Lemons, Pears, Strawberries, and Plums.

|  | Peaches | Lemons | Pears | Strawberry | Plums |
|---|---|---|---|---|---|
| Vitamin C, total ascorbic acid | 9.9 | 2.7 | 7.5 | 49.4 | 12.5 |
| Thiamine | 0.036 | 0.002 | 0.021 | 0.020 | 0.037 |
| Riboflavin | 0.047 | 0.001 | 0.045 | 0.018 | 0.034 |
| Niacin | 1.209 | 0.006 | 0.279 | 0.324 | 0.550 |
| Pantothenic acid | 0.229 | 0.006 | 0.085 | 0.105 | 0.178 |
| Vitamin B6 | 0.037 | 0.003 | 0.050 | 0.039 | 0.038 |
| Folate, food | 6 | 1 | 12 | 20 | 7 |
| Choline, total | 9.2 | 0.3 | 9.1 | 4.8 | 2.5 |
| Betaine | 0.5 | 0.0 | 0.4 | 0.2 | 0.0 |
| Vitamin B12 | 0.00 | 0.00 | 0.00 | 0.00 | 0.00 |
| Vitamin A | 24 | 0 | 2 | 1 | 22 |
| Retinol | 0 | 0 | 0 | 0 | 0 |
| Carotene, β | 243 | 0 | 23 | 6 | 251 |
| Carotene, α | 0 | 0 | 0 | 0 | 0 |
| Cryptoxanthin, β | 100 | 1 | 4 | 0 | 46 |
| Vitamin A (IU) | 489 | 1 | 41 | 10 | 455 |
| Lycopene | 0 | 0 | 0 | 0 | 0 |
| Lutein + zeaxanthin | 136 | 1 | 80 | 22 | 96 |
| Vitamin E (α-tocopherol) | 1.09 | 0.10 | 0.21 | 0.24 | 0.34 |
| Tocopherol, β | 0.00 | 0.00 | 0.00 | 0.01 | 0.00 |
| Tocopherol, γ | 0.30 | 0.00 | 0.05 | 0.07 | 0.11 |
| Tocopherol, δ | 0.00 | 0.00 | 0.00 | 0.01 | 0.00 |
| Vitamin D | 0 | 0 | 0 | 0 | 0 |
| Vitamin K | 3.9 | 0.0 | 8.0 | 1.8 | 8.4 |

TABLE 38-continued

Amounts of vitamin nutritive components including vitamin C (µg), thiamine (mg), riboflavin (mg), niacin (mg), pantothenic acid (mg), vitamin B6 (mg), folate (µg), choline (mg), betaine (mg), vitamin B12 (µg), vitamin A (µg), retinol (µg), β-carotene (µg), α-carotene (µg), cryptoxanthin (β) (µg), vitamin A (IU), lycopene (µg), lutein + zeaxanthin (µg), vitamin E (α-tocopherol) (mg), β-tocopherol (mg), γ-tocopherol (mg), δ-tocopherol (mg), vitamin D (IU), and vitamin K (µg) in Avocados, Melons, Cherries, Kiwis, and Potatoes.

|  | Avocado | Melon | Cherries | Kiwi | Potatoes |
| --- | --- | --- | --- | --- | --- |
| Vitamin C, total ascorbic acid | 10.1 | 25.3 | 8.0 | 127.9 | 17.8 |
| Thiamine | 0.067 | 0.028 | 0.031 | 0.037 | 0.092 |
| Riboflavin | 0.131 | 0.013 | 0.038 | 0.035 | 0.066 |
| Niacin | 1.747 | 0.506 | 0.177 | 0.471 | 1.860 |
| Pantothenic acid | 1.396 | 0.072 | 0.228 | 0.253 | 0.524 |
| Vitamin B6 | 0.258 | 0.050 | 0.056 | 0.087 | 0.489 |
| Folate, food | 81 | 14 | 5 | 34 | 36 |
| Choline, total | 14.3 | 5.2 | 7.0 | 10.8 | 20.7 |
| Betaine | 0.7 | 0.0 | 0.0 | 0.7 | 0.3 |
| Vitamin B12 | 0.00 | 0.00 | 0.00 | 0.00 | 0.00 |
| Vitamin A | 7 | 117 | 0 | 6 | 1 |
| Retinol | 0 | 0 | 0 | 0 | 0 |
| Carotene, β | 62 | 1394 | 44 | 72 | 8 |
| Carotene, α | 24 | 11 | 0 | 0 | 0 |
| Cryptoxanthin, β | 28 | 1 | 0 | 0 | 0 |
| Vitamin A (IU) | 147 | 2334 | 73 | 120 | 14 |
| Lycopene | 0 | 0 | 0 | 0 | 0 |
| Lutein + zeaxanthin | 272 | 18 | 98 | 168 | 28 |
| Vitamin E (α-tocopherol) | 2.08 | 0.03 | 0.08 | 2.01 | 0.06 |
| Tocopherol, β | 0.50 | 0.00 | 0.01 | 0.00 | 0.00 |
| Tocopherol, γ | 0.33 | 0.08 | 0.05 | 0.04 | 0.00 |
| Tocopherol, δ | 0.02 | 0.00 | 0.00 | 0.00 | 0.00 |
| Vitamin D | 0 | 0 | 0 | 0 | 0 |
| Vitamin K | 21.1 | 1.7 | 2.4 | 55.6 | 2.8 |

Amounts of vitamin nutritive components including vitamin C (µg), thiamine (mg), riboflavin (mg), niacin (mg), pantothenic acid (mg), vitamin B6 (mg), folate (µg), choline (mg), betaine (mg), vitamin B12 (µg), vitamin A (µg), retinol (µg), β-carotene (µg), α-carotene (µg), cryptoxanthin (β) (µg), vitamin A (IU), lycopene (µg), lutein + zeaxanthin (µg), vitamin E (α-tocopherol) (mg), β-tocopherol (mg), γ-tocopherol (mg), δ-tocopherol (mg), vitamin D (IU), and vitamin K (µg) in Tomatoes, Sweet Corn, Lettuce, Onions, and Carrots.

|  | Tomatoes | Sweet Corn | Lettuce | Onions | Carrots |
| --- | --- | --- | --- | --- | --- |
| Vitamin C, total ascorbic acid | 15.6 | 4.4 | 11.3 | 5.2 | 7.6 |
| Thiamine | 0.046 | 0.056 | 0.034 | 0.032 | 0.084 |
| Riboflavin | 0.023 | 0.046 | 0.031 | 0.019 | 0.074 |
| Niacin | 0.731 | 1.183 | 0.147 | 0.081 | 1.258 |
| Pantothenic acid | 0.109 | 0.245 | 0.067 | 0.086 | 0.349 |
| Vitamin B6 | 0.098 | 0.114 | 0.035 | 0.084 | 0.177 |
| Folate, food | 18 | 24 | 64 | 13 | 24 |
| Choline, total | 8.2 | 16.3 | 4.7 | 4.3 | 11.3 |
| Betaine | 0.1 | 0.0 | 0.0 | 0.1 | 0.5 |
| Vitamin B12 | 0.00 | 0.00 | 0.00 | 0.00 | 0.00 |
| Vitamin A | 52 | 7 | 205 | 0 | 1069 |
| Retinol | 0 | 0 | 0 | 0 | 0 |
| Carotene, β | 552 | 33 | 2456 | 1 | 10605 |
| Carotene, α | 124 | 12 | 0 | 0 | 4451 |
| Cryptoxanthin, β | 0 | 82 | 0 | 0 | 0 |
| Vitamin A (IU) | 1025 | 133 | 4094 | 1 | 21384 |
| Lycopene | 3165 | 0 | 0 | 0 | 27 |
| Lutein + zeaxanthin | 151 | 457 | 1087 | 3 | 328 |
| Vitamin E (α-tocopherol) | 0.66 | 0.05 | 0.06 | 0.01 | 0.84 |
| Tocopherol, β | 0.01 | 0.00 | 0.00 | 0.00 | 0.01 |
| Tocopherol, γ | 0.15 | 0.10 | 0.17 | 0.00 | 0.00 |
| Tocopherol, δ | 0.00 | 0.00 | 0.00 | 0.00 | 0.00 |
| Vitamin D | 0 | 0 | 0 | 0 | 0 |
| Vitamin K | 9.7 | 0.2 | 48.2 | 0.3 | 16.9 |

TABLE 38-continued

Amounts of vitamin nutritive components including vitamin C (µg), thiamine (mg),
riboflavin (mg), niacin (mg), pantothenic acid (mg), vitamin B6 (mg), folate (µg), choline (mg),
betaine (mg), vitamin B12 (µg), vitamin A (µg), retinol (µg), β-carotene (µg), α-carotene (µg),
cryptoxanthin (β) (µg), vitamin A (IU), lycopene (µg), lutein + zeaxanthin (µg), vitamin E (α-tocopherol)
(mg), β-tocopherol (mg), γ-tocopherol (mg), δ-tocopherol (mg), vitamin D (IU), and vitamin K (µg)
in Cabbage, Snap Beans, Broccoli, Bell Peppers, and Celery.

|  | Cabbage | Snap beans | Broccoli | Bell Peppers | Celery |
| --- | --- | --- | --- | --- | --- |
| Vitamin C, total ascorbic acid | 32.6 | 12.2 | 81.2 | 95.4 | 3.7 |
| Thiamine | 0.054 | 0.082 | 0.065 | 0.015 | 0.025 |
| Riboflavin | 0.036 | 0.104 | 0.106 | 0.013 | 0.068 |
| Niacin | 0.208 | 0.734 | 0.581 | 0.463 | 0.384 |
| Pantothenic acid | 0.189 | 0.225 | 0.521 | 0.087 | 0.295 |
| Vitamin B6 | 0.110 | 0.141 | 0.159 | 0.087 | 0.089 |
| Folate, food | 38 | 33 | 54 | 14 | 43 |
| Choline, total | 9.5 | 15.3 | 17.0 | 0.0 | 7.3 |
| Betaine | 0.4 | 0.1 | 0.1 | 0.0 | 0.1 |
| Vitamin B12 | 0.00 | 0.00 | 0.00 | 0.00 | 0.00 |
| Vitamin A | 4 | 35 | 28 | 5 | 26 |
| Retinol | 0 | 0 | 0 | 0 | 0 |
| Carotene, β | 37 | 379 | 329 | 62 | 324 |
| Carotene, α | 29 | 69 | 23 | 0 | 0 |
| Cryptoxanthin, β | 0 | 0 | 1 | 0 | 0 |
| Vitamin A (IU) | 87 | 690 | 567 | 104 | 539 |
| Lycopene | 0 | 0 | 0 | 0 | 0 |
| Lutein + zeaxanthin | 27 | 640 | 1277 | 0 | 340 |
| Vitamin E (α-tocopherol) | 0.13 | 0.41 | 0.71 | 0.00 | 0.32 |
| Tocopherol, β | 0.00 | 0.00 | 0.01 | 0.00 | 0.00 |
| Tocopherol, γ | 0.00 | 0.00 | 0.15 | 0.00 | 0.00 |
| Tocopherol, δ | 0.00 | 0.00 | 0.00 | 0.00 | 0.00 |
| Vitamin D | 0 | 0 | 0 | 0 | 0 |
| Vitamin K | 67.6 | 14.4 | 92.5 | 0.0 | 35.2 |

Amounts of vitamin nutritive components including vitamin C (µg), thiamine (mg),
riboflavin (mg), niacin (mg), pantothenic acid (mg), vitamin B6 (mg), folate (µg), choline (mg),
betaine (mg), vitamin B12 (µg), vitamin A (µg), retinol (µg), β-carotene (µg), α-carotene (µg),
cryptoxanthin (β) (µg), vitamin A (IU), lycopene (µg), lutein + zeaxanthin (µg), vitamin E (α-tocopherol)
(mg), β-tocopherol (mg), γ-tocopherol (mg), δ-tocopherol (mg), vitamin D (IU), and vitamin K (µg)
in Pumpkin, Squash, Sweet Potato, Mushrooms, and Garlic.

|  | Pumpkin | Squash | Sweet Potato | Mushrooms | Garlic |
| --- | --- | --- | --- | --- | --- |
| Vitamin C, total ascorbic acid | 10.4 | 20.2 | 11.8 | 1.5 | 0.9 |
| Thiamine | 0.058 | 0.051 | 0.064 | 0.057 | 0.006 |
| Riboflavin | 0.128 | 0.106 | 0.064 | 0.281 | 0.003 |
| Niacin | 0.696 | 0.510 | 0.892 | 2.525 | 0.021 |
| Pantothenic acid | 0.346 | 0.230 | 0.530 | 1.048 | 0.018 |
| Vitamin B6 | 0.071 | 0.184 | 0.172 | 0.073 | 0.037 |
| Folate, food | 19 | 27 | 4 | 11 | 0 |
| Choline, total | 9.5 | 10.7 | 7.9 | 12.1 | 0.7 |
| Betaine | 0.0 | 0.0 | 20.8 | 6.6 | 0.0 |
| Vitamin B12 | 0.00 | 0.00 | 0.00 | 0.03 | 0.00 |
| Vitamin A | 428 | 11 | 577 | 0 | 0 |
| Retinol | 0 | 0 | 0 | 0 | 0 |
| Carotene, β | 3596 | 136 | 6905 | 0 | 0 |
| Carotene, α | 597 | 0 | 26 | 0 | 0 |
| Cryptoxanthin, β | 2488 | 0 | 0 | 0 | 0 |
| Vitamin A (IU) | 8565 | 226 | 11531 | 0 | 0 |
| Lycopene | 0 | 0 | 0 | 0 | 0 |
| Lutein + zeaxanthin | 1740 | 2401 | 0 | 0 | 0 |
| Vitamin E (α-tocopherol) | 1.23 | 0.14 | 0.43 | 0.01 | 0.00 |
| Tocopherol, β | 0.00 | 0.00 | 0.00 | 0.01 | 0.00 |
| Tocopherol, γ | 0.00 | 0.00 | 0.01 | 0.01 | 0.00 |
| Tocopherol, δ | 0.00 | 0.00 | 0.00 | 0.01 | 0.00 |
| Vitamin D | 0 | 0 | 0 | 13 | 0 |
| Vitamin K | 1.3 | 4.9 | 1.4 | 0.0 | 0.1 |

TABLE 38-continued

Amounts of vitamin nutritive components including vitamin C (μg), thiamine (mg), riboflavin (mg), niacin (mg), pantothenic acid (mg), vitamin B6 (mg), folate (μg), choline (mg), betaine (mg), vitamin B12 (μg), vitamin A (μg), retinol (μg), β-carotene (μg), α-carotene (μg), cryptoxanthin (β) (μg), vitamin A (IU), lycopene (μg), lutein + zeaxanthin (μg), vitamin E (α-tocopherol) (mg), β-tocopherol (mg), γ-tocopherol (mg), δ-tocopherol (mg), vitamin D (IU), and vitamin K (μg) in Cauliflower, Spinach, Asparagus and Radish.

|  | Cauliflower | Spinach | Asparagus | Radish |
|---|---|---|---|---|
| Vitamin C, total ascorbic acid | 51.6 | 8.4 | 4.5 | 17.2 |
| Thiamine | 0.054 | 0.023 | 0.114 | 0.014 |
| Riboflavin | 0.064 | 0.057 | 0.113 | 0.045 |
| Niacin | 0.542 | 0.217 | 0.782 | 0.295 |
| Pantothenic acid | 0.714 | 0.020 | 0.219 | 0.191 |
| Vitamin B6 | 0.197 | 0.059 | 0.073 | 0.082 |
| Folate, food | 61 | 58 | 42 | 29 |
| Choline, total | 47.4 | 5.4 | 12.8 | 7.5 |
| Betaine | 0.0 | 165.1 | 0.5 | 0.1 |
| Vitamin B12 | 0.00 | 0.00 | 0.00 | 0.00 |
| Vitamin A | 0 | 141 | 30 | 0 |
| Retinol | 0 | 0 | 0 | 0 |
| Carotene, β | 0 | 1688 | 359 | 5 |
| Carotene, α | 0 | 0 | 7 | 0 |
| Cryptoxanthin, β | 0 | 0 | 0 | 0 |
| Vitamin A (IU) | 0 | 2813 | 605 | 8 |
| Lycopene | 0 | 0 | 0 | 0 |
| Lutein + zeaxanthin | 1 | 3659 | 568 | 12 |
| Vitamin E (α-tocopherol) | 0.09 | 0.61 | 0.90 | 0.00 |
| Tocopherol, β | 0.00 | 0.00 | 0.00 | 0.00 |
| Tocopherol, γ | 0.21 | 0.05 | 0.07 | 0.00 |
| Tocopherol, δ | 0.00 | 0.00 | 0.00 | 0.00 |
| Vitamin D | 0 | 0 | 0 | 0 |
| Vitamin K | 16.6 | 144.9 | 33.3 | 1.5 |

The standard equivalent unit is calculated as follows: (1) the amount (g) of each nutritive component present in each of the fruits and vegetables consumed in the U.S. is obtained (as shown in Table 38); (2) the amount (g) of the nutritive component present in each fruit and vegetable consumed in the U.S. is multiplied by with the percentage of that that fruit or vegetable, respectively, represents of the total fruits and vegetables consumed in the U.S. (as shown in Table 22); and (3) the weighted values of each nutritive component independently as determined in Step (2) from all of the fruits and vegetables consumed in the U.S. are added to obtain the standard equivalent unit of each nutritive component for all fruits and vegetables consumed in the U.S.

For example, to determine the standard equivalent unit for thiamine, first, the amount (g) of thiamine present in each of the fruits and vegetables consumed in the U.S. is obtained from public databases, such as, for example, the Nutrient Database maintained and provided by the U.S. Department of Agriculture. Table 39 shows the amounts (mg) of thiamine present in each of the fruits and vegetables consumed in the U.S.

TABLE 39

Amounts (mg) of Thiamine Present in Each of the Fruits and Vegetables Consumed in the United States

| Fruit/Vegetable | Amount (mg) thiamine |
|---|---|
| Oranges | 0.095 |
| Apples | 0.031 |
| Bananas | 0.037 |
| Grapes | 0.087 |
| Grapefruits | 0.053 |
| Peaches | 0.036 |
| Lemons | 0.002 |
| Pears | 0.021 |

TABLE 39-continued

Amounts (mg) of Thiamine Present in Each of the Fruits and Vegetables Consumed in the United States

| Fruit/Vegetable | Amount (mg) thiamine |
|---|---|
| Strawberries | 0.020 |
| Plums | 0.037 |
| Avocado | 0.067 |
| Melon | 0.028 |
| Cherries | 0.031 |
| Kiwi | 0.037 |
| Potatoes | 0.092 |
| Tomatoes | 0.046 |
| Sweet corn | 0.056 |
| Lettuce | 0.034 |
| Onions | 0.032 |
| Carrots | 0.084 |
| Cabbage | 0.054 |
| Snap beans | 0.082 |
| Broccoli | 0.065 |
| Bell peppers | 0.015 |
| Celery | 0.025 |
| Pumpkin | 0.058 |
| Squash | 0.051 |
| Sweet Potato | 0.064 |
| Mushrooms | 0.057 |
| Garlic | 0.006 |
| Cauliflower | 0.054 |
| Spinach | 0.023 |
| Asparagus | 0.114 |
| Radish | 0.014 |

Second, the amount (mg) of thiamine present in each fruit or vegetable consumed in the U.S. is multiplied by the percentage that fruit or vegetable, respectively, represents of the total fruits and vegetables consumed in the U.S. The percentage of each fruit and vegetable consumed of the total amounts of fruits and vegetables consumed in the U.S. is available from public databases, such as, for example, the Nutrient Database (NDB). The NDB indicates that oranges, for example, contain 0.095 mg of thiamine and comprise 14.2% (0.142) of the total amount of fruits and vegetables consumed in the U.S. Thus, 0.095 is multiplied by 0.142 to get 0.01349. Table 40 shows these weighted values of thiamine for all the fruits and vegetables consumed in the U.S.

TABLE 40

Weighted Values of Thiamine for All Fruits and Vegetables Consumed in the United States

| Fruit/Vegetable | Amount (mg) thiamine | % of Total Fruits and Vegetables Consumed | Weighted Value of thiamine (amount of thiamine (mg)) * (% of total fruits and vegetables consumed) |
|---|---|---|---|
| Oranges | 0.095 | 14.2 | 0.01349 |
| Apples | 0.031 | 7.3 | 0.002263 |
| Bananas | 0.037 | 4.5 | 0.001665 |
| Grapes | 0.087 | 3.1 | 0.002697 |
| Grapefruits | 0.053 | 2.2 | 0.001166 |
| Peaches | 0.036 | 1.6 | 0.000576 |
| Lemons | 0.002 | 1.1 | 0.000022 |
| Pears | 0.021 | 1.0 | 0.00021 |
| Strawberries | 0.020 | 1.0 | 0.0002 |
| Plums | 0.037 | 0.5 | 0.000185 |
| Avocado | 0.067 | 0.4 | 0.000268 |
| Melon | 0.028 | 0.3 | 0.000084 |
| Cherries | 0.031 | 0.3 | 0.000093 |
| Kiwi | 0.037 | 0.1 | 0.000037 |
| Potato | 0.092 | 23.3 | 0.021436 |
| Tomato | 0.046 | 14.0 | 0.00644 |
| Sweet corn | 0.056 | 4.6 | 0.002576 |
| Lettuce | 0.034 | 4.0 | 0.00136 |
| Onions | 0.032 | 3.2 | 0.001024 |
| Carrots | 0.084 | 2.4 | 0.002016 |
| Cabbage | 0.054 | 1.7 | 0.000918 |
| Snap beans | 0.082 | 1.3 | 0.001066 |
| Broccoli | 0.065 | 1.3 | 0.000845 |
| Bell peppers | 0.015 | 1.1 | 0.000165 |
| Celery | 0.025 | 1.1 | 0.000275 |
| Pumpkin | 0.058 | 0.8 | 0.000464 |
| Squash | 0.051 | 0.7 | 0.000357 |
| Sweet Potato | 0.064 | 0.7 | 0.000448 |
| Mushrooms | 0.057 | 0.7 | 0.000399 |
| Garlic | 0.006 | 0.4 | 0.000024 |
| Cauliflower | 0.054 | 0.4 | 0.000216 |
| Spinach | 0.023 | 0.3 | 0.000069 |
| Asparagus | 0.114 | 0.2 | 0.000228 |
| Radish | 0.014 | 0.1 | 0.000014 |

Third, the weighted values of thiamine from all the fruits and vegetables consumed in the U.S. are added to obtain the standard equivalent unit of thiamine for all fruits and vegetables consumed in the U.S. Table 41 shows the standard equivalent unit of thiamine.

TABLE 41

Standard Equivalent Unit of Thiamine

| Fruit/Vegetable | Weighted Value of thiamine (amount of thiamine (mg)) * (% of total fruits and vegetables consumed) |
|---|---|
| Oranges | 0.01349 |
| Apples | 0.002263 |
| Bananas | 0.001665 |
| Grapes | 0.002697 |
| Grapefruits | 0.001166 |
| Peaches | 0.000576 |

TABLE 41-continued

Standard Equivalent Unit of Thiamine

| Fruit/Vegetable | Weighted Value of thiamine (amount of thiamine (mg)) * (% of total fruits and vegetables consumed) |
|---|---|
| Lemons | 0.000022 |
| Pears | 0.00021 |
| Strawberries | 0.0002 |
| Plums | 0.000185 |
| Avocado | 0.000268 |
| Melon | 0.000084 |
| Cherries | 0.000093 |
| Kiwi | 0.000037 |
| Potato | 0.021436 |
| Tomato | 0.00644 |
| Sweet corn | 0.002576 |
| Lettuce | 0.00136 |
| Onions | 0.001024 |
| Carrots | 0.002016 |
| Cabbage | 0.000918 |
| Snap beans | 0.001066 |
| Broccoli | 0.000845 |
| Bell peppers | 0.000165 |
| Celery | 0.000275 |
| Pumpkin | 0.000464 |
| Squash | 0.000357 |
| Sweet Potato | 0.000448 |
| Mushrooms | 0.000399 |
| Garlic | 0.000024 |
| Cauliflower | 0.000216 |
| Spinach | 0.000069 |
| Asparagus | 0.000228 |
| Radish | 0.000014 |
| Sum of Weighted Values of calcium = Standard Equivalent Unit | 0.063296 mg |

Thus, the standard equivalent unit of thiamine of fruits and vegetables consumed in the U.S. is calculated to be 0.063296 mg.

Table 42. shows the standard equivalent unit provided by each of the above nutritive components from all of the above fruits and vegetables.

TABLE 42

Standard equivalent unit based on values for oranges, apples, bananas, grapes, grapefruit peaches, lemons, pears, strawberries, plums, avocado, melon, cherries, kiwi, potato, tomatoes, sweet corn, lettuce, onions, carrots cabbage, snap beans, broccoli, bell peppers, celery pumpkin, squash, sweet potato, mushrooms, garlic cauliflower, spinach, asparagus and radish in tables 22 and 38 above

| | Standard Equivalent Unit based on values for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 22 and 38 above |
|---|---|
| Vitamin C, total ascorbic acid | 25.9 |
| Thiamine | 0.063 |
| Riboflavin | 0.057 |
| Niacin | 0.879 |
| Pantothenic acid | 0.299 |
| Vitamin B6 | 0.202 |
| Folate, food | 28.567 |

TABLE 42-continued

Standard equivalent unit based on values for oranges, apples, bananas, grapes, grapefruit peaches, lemons, pears, strawberries, plums, avocado, melon, cherries, kiwi, potato, tomatoes, sweet corn, lettuce, onions, carrots cabbage, snap beans, broccoli, bell peppers, celery pumpkin, squash, sweet potato, mushrooms, garlic cauliflower, spinach, asparagus and radish in tables 22 and 38 above

| | Standard Equivalent Unit based on values for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 22 and 38 above |
|---|---|
| Choline, total | 11.998 |
| Betaine | 0.854 |
| Vitamin B12 | 0.000 |
| Vitamin A | 56.496 |
| Retinol | 0.000 |
| Carotene, β | 583.825 |
| Carotene, α | 134.415 |
| Cryptoxanthin, β | 53.303 |
| Vitamin A (IU) | 1127.193 |
| Lycopene | 482.138 |
| Lutein + zeaxanthin | 211.095 |
| Vitamin E (α-tocopherol) | 0.275 |
| Tocopherol, β | 0.004 |
| Tocopherol, γ | 0.047 |
| Tocopherol, δ | 0.005 |
| Vitamin D | 0.091 |
| Vitamin K | 9.157 |

Table 43 shows the oxygen radical absorbance capacity (ORAC) (antioxidants) of various fruits and vegetables consumed within the United States; it further shows the standard equivalent unit provided by each of these nutritive components from all of the fruits and vegetables.

TABLE 43

Oxygen radical absorbance capacity (ORAC) (antioxidants) of Oranges, Apples, Bananas, Grapes And Grapefruit

| | Oranges | Apples | Bananas | Grapes | Grapefruit |
|---|---|---|---|---|---|
| Total ORAC | 2547 | 5609 | 1037 | 1588 | 1904 |

Oxygen radical absorbance capacity (ORAC) (antioxidants) of Peaches, Lemons, Pears, Strawberries, and Plums.

| | Peaches | Lemons | Pears | Strawberry | Plums |
|---|---|---|---|---|---|
| Total ORAC | 2721 | 72 | 5235 | 3005 | 8262 |

Oxygen radical absorbance capacity (ORAC) (antioxidants) of Avocados, Melons, Cherries, Kiwis, and Potatoes.

| | Avocado | Melon | Cherries | Kiwi | Potatoes |
|---|---|---|---|---|---|
| Total ORAC | 1943 | 217 | 3863 | 1217 | 2318 |

Oxygen radical absorbance capacity (ORAC) (antioxidants) of Tomatoes, Sweet Corn, Lettuce, Onions, and Carrots.

| | Tomatoes | Sweet Corn | Lettuce | Onions | Carrots |
|---|---|---|---|---|---|
| Total ORAC | 451 | 355 | 453 | 724 | 852 |

TABLE 43-continued

Oxygen radical absorbance capacity (ORAC) (antioxidants) of Cabbage, Snap beans, Broccoli, Bell Peppers, and Celery.

| | Cabbage | Snap beans | Broccoli | Bell Peppers | Celery |
|---|---|---|---|---|---|
| Total ORAC | 452 | 759 | 1239 | 502 | 596 |

Oxygen radical absorbance capacity (ORAC) (antioxidants) of Pumpkin, Squash, Sweet Potato, Mushrooms, and Garlic.

| | Pumpkin | Squash | Sweet Potato | Mushrooms | Garlic |
|---|---|---|---|---|---|
| Total ORAC | 560 | 447 | 1269 | 483 | 160 |

Oxygen radical absorbance capacity (ORAC) (antioxidants) of Cauliflower, Spinach, Asparagus and Radish.

| | Cauliflower | Spinach | Asparagus | Radish |
|---|---|---|---|---|
| Total ORAC | 887 | 455 | 1720 | 2014 |

The standard equivalent unit is calculated as follows: (1) the amount (ORAC) of each nutritive component present in each of the fruits and vegetables consumed in the U.S. (as shown in Table 43) is obtained; (2) the amount (ORAC) of the nutritive component present in each fruit and vegetable consumed in the U.S. is multiplied by the percentage of that that fruit or vegetable, respectively, is of the total fruits and vegetables consumed in the U.S. (as shown in Table 22); and (3) the weighted values of each nutritive component independently as determined in Step (2) from all of the fruits and vegetables consumed in the U.S. are added to obtain the standard equivalent unit of each nutritive component for all fruits and vegetables consumed in the U.S.

For example, to determine the standard equivalent unit for ORAC, first, the amount of ORAC present in each of the fruits and vegetables consumed in the U.S. is obtained from public databases, such as, for example, the Nutrient Database maintained and provided by the U.S. Department of Agriculture, and reference literature (such as, but not limited to, Dubost, N. J., et al. Quantification of polyphenols and ergothioneine in cultivated mushrooms and correlation of total antioxidant capacity. 2007. Food Chemistry. 105(2):727-735, the contents of which are incorporated herein by reference in their entirety). Table 44 shows the amounts of ORAC present in each of the fruits and vegetables consumed in the U.S.

TABLE 44

Amounts of ORAC Present in Each of the Fruits and Vegetables Consumed in the United States

| Fruit/Vegetable | Amount ORAC |
|---|---|
| Oranges | 2547 |
| Apples | 5609 |
| Bananas | 1037 |
| Grapes | 1588 |
| Grapefruits | 1904 |
| Peaches | 2721 |
| Lemons | 72 |
| Pears | 5235 |
| Strawberries | 3005 |
| Plums | 8262 |
| Avocado | 1943 |
| Melon | 217 |
| Cherries | 3863 |
| Kiwi | 1217 |
| Potatoes | 2318 |
| Tomatoes | 451 |

TABLE 44-continued

Amounts of ORAC Present in Each of the Fruits and Vegetables Consumed in the United States

| Fruit/Vegetable | Amount ORAC |
|---|---|
| Sweet corn | 355 |
| Lettuce | 453 |
| Onions | 724 |
| Carrots | 852 |
| Cabbage | 452 |
| Snap beans | 759 |
| Broccoli | 1239 |
| Bell peppers | 502 |
| Celery | 596 |
| Pumpkin | 560 |
| Squash | 447 |
| Sweet Potato | 1269 |
| Mushrooms | 483 |
| Garlic | 160 |
| Cauliflower | 887 |
| Spinach | 455 |
| Asparagus | 1720 |
| Radish | 2014 |

Second, the amount of ORAC present in each fruit or vegetable consumed in the U.S. is multiplied by the percentage that that fruit or vegetable, respectively, is of the total fruits and vegetables consumed in the U.S. The percentage of each fruit and vegetable consumed of the total amounts of fruits and vegetables consumed in the U.S. is available from public databases, such as, for example, the Nutrient Database (NDB). The NDB indicates that oranges, for example, 2547 ORAC and comprise 14.2% (0.142) of the total amount of fruits and vegetables consumed in the U.S. Thus, 2547 is multiplied by 0.142 to yield 361.674. Table 45 shows these weighted values of ORAC for all the fruits and vegetables consumed in the U.S.

TABLE 45

Weighted Values of ORAC for All the Fruits and Vegetables consumed in the United States

| Fruit/Vegetable | Amount ORAC | % of Total Fruits and Vegetables Consumed | Weighted Value of ORAC (amount of ORAC) * (% of total fruits and vegetables consumed) |
|---|---|---|---|
| Oranges | 2547 | 14.2 | 361.674 |
| Apples | 5609 | 7.3 | 409.457 |
| Bananas | 1037 | 4.5 | 46.665 |
| Grapes | 1588 | 3.1 | 49.228 |
| Grapefruits | 1904 | 2.2 | 41.888 |
| Peaches | 2721 | 1.6 | 43.536 |
| Lemons | 72 | 1.1 | 0.792 |
| Pears | 5235 | 1.0 | 52.35 |
| Strawberries | 3005 | 1.0 | 30.05 |
| Plums | 8262 | 0.5 | 41.31 |
| Avocado | 1943 | 0.4 | 7.772 |
| Melon | 217 | 0.3 | 00.651 |
| Cherries | 3863 | 0.3 | 11.589 |
| Kiwi | 1217 | 0.1 | 1.127 |
| Potato | 2318 | 23.3 | 540.094 |
| Tomato | 451 | 14.0 | 63.14 |
| Sweet corn | 355 | 4.6 | 16.33 |
| Lettuce | 453 | 4.0 | 18.12 |
| Onions | 724 | 3.2 | 23.168 |
| Carrots | 852 | 2.4 | 20.448 |
| Cabbage | 452 | 1.7 | 7.684 |
| Snap beans | 759 | 1.3 | 9.867 |
| Broccoli | 1239 | 1.3 | 16.107 |
| Bell peppers | 502 | 1.1 | 5.522 |
| Celery | 596 | 1.1 | 6.556 |
| Pumpkin | 560 | 0.8 | 4.48 |
| Squash | 447 | 0.7 | 3.129 |
| Sweet Potato | 1269 | 0.7 | 8.883 |
| Mushrooms | 483 | 0.7 | 3.381 |
| Garlic | 160 | 0.4 | 0.64 |
| Cauliflower | 887 | 0.4 | 3.548 |
| Spinach | 455 | 0.3 | 1.365 |
| Asparagus | 1720 | 0.2 | 3.44 |
| Radish | 2014 | 0.1 | 2.014 |

Third, the weighted values of ORAC from all the fruits and vegetables consumed in the U.S. are added to obtain the standard equivalent unit of ORAC for all fruits and vegetables consumed in the U.S. Table 46 shows the standard equivalent unit of ORAC.

TABLE 46

Standard Equivalent Unit of ORAC.

| Fruit/Vegetable | Weighted Value of ORAC (amount of ORAC) * (% of total fruits and vegetables consumed) |
|---|---|
| Oranges | 361.674 |
| Apples | 409.457 |
| Bananas | 46.665 |
| Grapes | 49.228 |
| Grapefruits | 41.888 |
| Peaches | 43.536 |
| Lemons | 0.792 |
| Pears | 52.35 |
| Strawberries | 30.05 |
| Plums | 41.31 |
| Avocado | 7.772 |
| Melon | 00.651 |
| Cherries | 11.589 |
| Kiwi | 1.127 |
| Potato | 540.094 |
| Tomato | 63.14 |
| Sweet corn | 16.33 |
| Lettuce | 18.12 |
| Onions | 23.168 |
| Carrots | 20.448 |
| Cabbage | 7.684 |
| Snap beans | 9.867 |
| Broccoli | 16.107 |
| Bell peppers | 5.522 |
| Celery | 6.556 |
| Pumpkin | 4.48 |
| Squash | 3.129 |
| Sweet Potato | 8.883 |
| Mushrooms | 3.381 |
| Garlic | 0.64 |
| Cauliflower | 3.548 |
| Spinach | 1.365 |

TABLE 46-continued

Standard Equivalent Unit of ORAC.

| Fruit/Vegetable | Weighted Value of ORAC (amount of ORAC) * (% of total fruits and vegetables consumed) |
|---|---|
| Asparagus | 3.44 |
| Radish | 2.014 |
| Sum of Weighted Values of ORAC = Standard Equivalent Unit | 1856.207 |

Thus, the standard equivalent unit of ORAC of fruits and vegetables consumed in the U.S. is calculated to be 1852.714.

Table 47. shows the standard equivalent unit provided by each of the above nutritive components from all of the above fruits and vegetables.

TABLE 47

Standard Equivalent Unit based on values for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce,Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 23 and 47 above

| | Standard Equivalent Unit based on values for Oranges, Apples, Bananas, Grapes, Grapefruit Peaches, Lemons, Pears, Strawberries, Plums, Avocado, Melon, Cherries, Kiwi, Potato, Tomatoes, Sweet Corn, Lettuce, Onions, Carrots Cabbage, Snap Beans, Broccoli, Bell Peppers, Celery Pumpkin, Squash, Sweet Potato, Mushrooms, Garlic Cauliflower, Spinach, Asparagus and Radish in Tables 23 and 47 above |
|---|---|
| Total ORAC | 1856 |

Example 3

Determination of Fortification Needs of a Base Food (Steps 2-5)

The method further comprises the steps:

Step 2: multiplying the SFV of the nutritional components of step (1) by the targeted number of equivalency (for example, 3 servings) to arrive at a target quantity for each nutritional component;

Step 3: listing the nutritional component values of the base food to be fortified side-by-side with the SFV target multiple with its respective nutritional components and their quantities of step (2) (for example, if the base food contains vitamin A, vitamin B12, vitamin C, and vitamin D, the nutritional components values of this base food would be listed side by side with the SFV target multiple for vitamin A, vitamin B12, vitamin C and vitamin D, respectively) (as shown below in tables 23-47);

Step 4: conducting a gap analysis by subtracting the base food nutritional component quantities of step (3) from the respective targeted multiple SFV like component of step (2); wherein the resulting gap indicates which components and in what quantities the base food is missing the necessary nutritional components to reach the targeted total nutritional value (shown as "fortification needs" in Table 48, below); and Step 5: adding the deficient nutritional components to the base food for which gaps have been identified in step (4).

The fortification needs of a base product with the standard equivalent unit of three servings of fruits and vegetables is determined as follows.

First, the standard equivalent unit of (i) the nonfortified base product (for example, a 16-ounce product) and (ii) each nutritive component of one serving of each fruit and vegetable is calculated (as illustrated in Example 2).

Second, a target standard equivalent unit of the one serving of fruits and vegetables is determined (for example, 3 times the standard equivalent unit of one serving of fruits and vegetables).

Third, the calculated standard equivalent unit of one serving of each fruit and vegetable is subtracted from the target standard equivalent unit to determine a nutritional gap.

Fourth, the base food is fortified by adding the nutritive components in amounts equal to the nutritional gap.

All of the nutritive components are fortified at least to the level of the targeted standard equivalent unit of fruits and vegetables to allow for the fortified product to be considered as of that respective targeted standard equivalent unit of nutrition for fruits and vegetables. For example, if a product is fortified to "3" standard equivalent units of nutrition of fruits and vegetables, and the protein component, fiber component, vitamin component and mineral component are at least to the level of "3" standard equivalent units of nutrition for fruits and vegetables while the ORAC component is at least to the level of "2" standard equivalent units of nutrition for fruits and vegetables, then the product is considered to be at least "2" standard equivalent units of nutrition for fruits and vegetables. Thus, when categorizing the final product as of a final targeted standard equivalent unit of nutrition of fruits and vegetables, each nutritive component of the fortified product must have at least a standard equivalent unit of nutrition of fruits and vegetables that is of the same whole integer as the targeted standard equivalent unit of fruits and vegetables, i.e., fractional equivalents are not considered.

According to some embodiments, the amounts of nutritive components added to the base food optionally are such that the final amounts of each nutritive component within the fortified base food do not exceed the RDI of each component. Further, nutritive components whose over-consumption generally are associated with an unhealthy diet are not added to the base food; for example, certain carbohydrate nutritive components (for example, sugars and starches, but not dietary fibers) and lipid nutritive components are not added to the base food.

Table 48 illustrates the fortification needs of a base product with the standard equivalent unit of three servings of fruits and vegetables.

TABLE 48

Fortification Needs Of A Base Product With The Standard
Equivalent Unit Of Three Servings Of Fruits And Vegetables
Table 48

|  | Standard Equivalent Unit | Final Target Multiple (3×) | Nutritional Content of 16 oz. skim milk product | Nutritional Gap | RDI | Fortification Needs |
|---|---|---|---|---|---|---|
| Protein (g) | 1.52 | 5.08 | 16.5 | 11.42 | 50 | 0 |
| Tryptophan (g) | 0.016 | 0.05 | 0.196 | 0.15 | N/A | 0 |
| Threonine (g) | 0.052 | 0.16 | 0.401 | 0.25 | N/A | 0 |
| Isoleucine (g) | 0.047 | 0.14 | 0.734 | 0.59 | N/A | 0 |
| Leucine (g) | 0.078 | 0.23 | 1.601 | 1.37 | N/A | 0 |
| Lysine (g) | 0.082 | 0.25 | 1.234 | 0.99 | N/A | 0 |
| Methionine (g) | 0.020 | 0.06 | 0.304 | 0.24 | N/A | 0 |
| Cysteine (g) | 0.020 | 0.06 | 0.602 | 0.54 | N/A | 0 |
| Phenylalanine (g) | 0.099 | 0.30 | 0.71 | 0.41 | N/A | 0 |
| Tyrosine (g) | 0.039 | 0.12 | 0.725 | 0.61 | N/A | 0 |
| Valine (g) | 0.069 | 0.21 | 0.881 | 0.67 | N/A | 0 |
| Arginine (g) | 0.092 | 0.28 | 0.353 | 0.08 | N/A | 0 |
| Histidine (g) | 0.032 | 0.10 | 0.367 | 0.27 | N/A | 0 |
| Alanine (g) | 0.059 | 0.18 | 0.49 | 0.31 | N/A | 0 |
| Aspartic acid (g) | 0.312 | 0.94 | 1.19 | 0.25 | N/A | 0 |
| Glutamic acid (g) | 0.389 | 1.17 | 3.295 | 2.13 | N/A | 0 |
| Glycine (g) | 0.045 | 0.14 | 0.245 | 0.11 | N/A | 0 |
| Proline (g) | 0.093 | 0.28 | 1.679 | 1.40 | N/A | 0 |
| Serine (g) | 0.061 | 0.18 | 0.82 | 0.64 | N/A | 0 |
| Carbohydrates (g) | 16.647 | 49.94 | 24.280 |  | 300 | 0 |
| Sugars (g) | 6.429 | 19.287 | 24.920 | +5.63 | N/A | 0 |
| Starch (g) | 6.5 | 19.383 | 0.000 |  | N/A | 0 |
| Fiber, total dietary (g) | 2.5 | 7.49 | 0 | −7.49 | 25 | 7.49 |
| Lipids (Fats), total | 0.290 | 0.87 | 0.390 | −0.48 | 65 | 0 |
| Fatty acids, total saturated (g) | 0.049 | 0.15 | 0.274 | +0.13 | 20 | 0 |
| Fatty acids, total monounsaturated (g) | 0.068 | 0.20 | 0.108 | −0.10 | N/A | 0.10 |
| Fatty acids, total polyunsaturated (g) | 0.083 | 0.25 | 0.015 | −0.24 | N/A | 0.24 |
| Cholesterol (mg) | 0.000 | 0.00 | 10.000 | +10.00 | <300 | 0 |
| Phytosterols (mg) | 10.441 | 31.32 | 0.000 | −31.32 | N/A | 31.32 |
| Calcium (mg) | 24.037 | 72.11 | 597 | +524.89 | 1000 |  |
| Iron (mg) | 0.585 | 1.75 | 0.15 | −1.60 | 18.00 | 1.60 |
| Magnesium (mg) | 19.926 | 59.78 | 54 | −5.78 | 400.00 | 5.78 |
| Phosphorous (mg) | 45.126 | 135.38 | 494 | +358.62 | 1000.0 |  |
| Potassium (mg) | 357.026 | 1071.08 | 764 | −307.08 | 3500.0 | 307.08 |
| Sodium (mg) | 10.638 | 31.91 | 206 | +174.09 | 2400.0 |  |
| Zinc (mg) | 0.239 | 0.72 | 2.06 | +1.34 | 15.00 |  |
| Copper (mg) | 0.083 | 0.25 | 0.064 | −0.18 | 2.00 | 0.18 |
| Manganese (mg) | 0.159 | 0.48 | 0.015 | −0.46 | 2.00 | 0.46 |
| Fluoride (µg) | 16.918 | 50.75 | 15.2 | −35.55 | N/A | 35.55 |
| Selenium (µg) | 0.385 | 1.15 | 15.2 | +14.05 | 70.00 |  |
| Vitamin C, total ascorbic acid (mg) | 25.9 | 77.84 | 0.0 | −77.84 | 60.00 | 17.84 |
| Thiamine (mg) | 0.063 | 0.19 | 0.220 | +0.03 | 1.50 |  |
| Riboflavin (mg) | 0.057 | 0.17 | 0.891 | +0.72 | 1.70 |  |
| Niacin (mg) | 0.879 | 2.64 | 0.460 | −2.18 | 20.00 | 2.18 |
| Pantothenic acid (mg) | 0.299 | 0.90 | 1.748 | +0.85 | 10.00 |  |
| Vitamin B6 (mg) | 0.202 | 0.61 | 0.181 | −0.43 | 2.00 | 0.43 |
| Folate, food (µg) | 28.567 | 85.70 | 24 | −61.30 | 400.00 | 61.30 |
| Choline, total (mg) | 11.998 | 35.99 | 76.4 | +40.41 | N/A |  |
| Betaine (mg) | 0.854 | 2.56 | 9.3 | +6.74 | N/A |  |
| Vitamin B12 (µg) | 0.000 | 0.00 | 2.45 | +2.45 | 6.00 |  |
| Vitamin A (µg) | 56.496 | 169.49 | 299 | +129.51 |  |  |
| Retinol (µg) | 0.000 | 0.00 | 299 | +299.00 |  |  |
| Carotene, β (µg) | 583.825 | 1751.48 | 0 | −1751.48 |  | 1751.48 |
| Carotene, α (µg) | 134.415 | 403.25 | 0 | −403.25 |  | 403.25 |
| Cryptoxanthin, β (µg) | 50.303 | 150.91 | 0 | −150.91 |  | 150.91 |
| Vitamin A (IU) | 1127.193 | 3381.58 | 999 | −2382.58 | 5000.0 | 2382.58 |
| Lycopene (µg) | 482.138 | 1446.41 | 0 | −1446.41 |  | 1446.41 |
| Lutein + zeaxanthin (µg) | 211.095 | 633.29 | 0 | −633.29 |  | 633.29 |
| Vitamin E (α-tocopherol) (mg) | 0.275 | 0.83 | 0.05 | −0.78 |  | 0.78 |
| Tocopherol, β (mg) | 0.004 | 0.01 | 0.00 | −0.01 |  | 0.01 |
| Tocopherol, γ (mg) | 0.047 | 0.14 | 0.00 | −0.14 |  | 0.14 |
| Tocopherol, delta (mg) | 0.005 | 0.01 | 0.00 | −0.01 |  | 0.01 |
| Vitamin D (IU) | 0.091 | 0.27 | 230 | +229.73 | 400.00 |  |

TABLE 48-continued

Fortification Needs Of A Base Product With The Standard
Equivalent Unit Of Three Servings Of Fruits And Vegetables
Table 48

|  | Standard Equivalent Unit | Final Target Multiple (3×) | Nutritional Content of 16 oz. skim milk product | Nutritional Gap | RDI | Fortification Needs |
|---|---|---|---|---|---|---|
| Vitamin K (μg) | 9.157 | 27.47 | 0.0 | −27.47 | 80.00 | 27.47 |
| Total ORAC | 1856 | 5558 | 2526 | −3035 |  | 3035 |

The method further comprises the step of comparing the organoleptic properties of the fortified base food to the organoleptic properties of the nonfortified base food, and, where necessary, adjusting the organoleptic properties of the fortified food such that they are equivalent to the organoleptic properties of the nonfortified base food.

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto.

What is claimed:

1. A method to fortify a base food, wherein the base food is a food or a beverage fit for human consumption, the method comprising the steps:
   (a) using a computer to develop a standard equivalent unit of nutritional value for complete protein, vitamin, mineral, fiber, phytosterol and antioxidant nutrition equal to those found in a weighted average serving of fruits and vegetables sold in the United States by:
   (i) identifying the type and amount of each fruit and each vegetable consumed by humans within the United States that, when combined, represents at least 85% of a total amount of fruits and vegetables consumed by humans therein:
   (ii) determining a contribution value for each fruit and each vegetable identified in (i), expressed as a percentage of the amount of each fruit and vegetable consumed relative to the total amount of all fruits and vegetables consumed;
   (iii) determining a portion size for each fruit and each vegetable identified in (i);
   (iv) determining a nutritional content of the portion size for each fruit and each vegetable determined in (iii) pertaining to protein, vitamin, mineral, fiber, phytosterol and antioxidant nutrients,
   (v) calculating the standard equivalent unit of the protein, vitamin, mineral, fiber, phytosterol and antioxidant nutritional value of fruits and vegetables present in one serving by
   (vi) multiplying the contribution value of each fruit and each vegetable determined in (ii) by the total protein, vitamin, mineral, fiber, phytosterol and antioxidant nutritional content of the portion size of each fruit and each vegetable in (iv) to derive a weighted value for each nutritive component; and
   (vii) summing the weighted values for each nutritive component derived in (vi);
   (b) providing the base food;
   (c) using the computer to determine the content of protein, vitamin, mineral, fiber, phytosterol, and antioxidant nutrition of the base food;
   (d) using the computer to identify the amount of each protein, vitamin, mineral, fiber phytosterol, and antioxidant nutrient that the base food requires to provide the standard equivalent unit of nutritional value of protein, vitamin, mineral, fiber, phytosterol and antioxidant nutrition developed in (a);
   (e) creating a fortifying composition for nutritional supplementation of the base food, wherein the fortifying composition comprises a fortifying amount of protein, vitamin, mineral, fiber, phytosterols, and antioxidant nutrient as identified in step (d), wherein the fortifying composition comprises:
   up to 1.52 g of protein;
   up to 2.5 g of fiber;
   up to 10.441 mg of phytosterols; and
   up to 1853 ORAC units of antioxidant;
   (f) for each nutrient in the fortifying composition of step (e) which has a taste or odor which modifies the taste or odor of the base food, microencapsulating that nutrient to substantially preserve the organoleptic properties of the base food;
   (g) adding the fortifying composition of step (f) to the base food.

2. The method according to claim 1, wherein the base food is a beverage.

3. The method according to claim 1, wherein the base food is a fresh food.

4. The method according to claim 1, wherein the base food is a processed food.

5. The method according to claim 1, wherein the base food is a natural food.

6. The method according to claim 1, wherein the fortification composition is a powder.

7. The method according to claim 1, wherein at least on ingredient of the fortification composition has a color, taste or odor and is microencapsulated in order to substantially maintain organoleptic characteristics of the base food, wherein the organoleptic characteristics further comprise: color, and mouth feel.

8. The method according to claim 1, wherein the protein in step (e) comprises at least one amino acid selected from the group consisting of tryptophan, threonine, isoleucine, leucine, lysine, methionine, cysteine, phenylalanine, tyrosine, valine, arginine, histidine, alanine, aspartic acid, glutamic acid, glycine, proline, serine, and combinations thereof.

9. The method according to claim 1, wherein the vitamin component in step (e) is at least one selected from the group consisting of vitamin C, thiamine, riboflavin, niacin, pantothenic acid, vitamin B6, biotin, folate, choline, betaine, vitamin B12, vitamin A, retinol, α-carotene, β-cryptoxanthin, β-carotene, lycopene, leutein and zeaxanthin, vitamin E, α-tocopherol, β-tocopherol, γ-tocopherol, δ-tocopherol, vitamin D, vitamin K, and combinations thereof.

10. The method according to claim 1, wherein the mineral component in step (e) is at least one selected from the group consisting of calcium, iron, magnesium, phosphorus, potassium, sodium, zinc, copper, manganese, fluoride, selenium, and combinations thereof.

11. The method according to claim 8, wherein the fortifying amount of protein in the fortifying composition comprises:
 up to 0.016 g of tryptophan;
 up to 0.052 g threonine;
 up to 0.047 g isoleucine
 up to 0.078 g leucine
 up to 0.082 g lysine
 up to 0.020 g methionine
 up to 0.020 g cysteine
 up to 0.099 g phenylalanine
 up to 0.039 g tyrosine
 up to 0.069 g valine
 up to 0.092 g arginine
 up to 0.032 g histidine
 up to 0.059 g alanine
 up to 0.312 g aspartic acid
 up to 0.389 g glutamic acid
 up to 0.045 g glycine
 up to 0.093 g proline
 up to 0.061 g serine.

12. The method according to claim 9, wherein the fortifying amount of the at least one vitamin in the fortifying composition comprises:
 up to 25.9 mg vitamin C;
 up to 0.063 mg thiamine;
 up to 0.057 riboflavin;
 up to 0.879 mg niacin;
 up to 0.299 mg pantothenic acid;
 up to 0.202 mg vitamin B6;
 up to 28.567 ug folate;
 up to 11.998 mg choline;
 up to 0.854 mg betaine;
 up to 56.496 ug vitamin A;
 up to 583.835 ug beta-carotene;
 up to 134.415 ug alpha-carotene;
 up to 50.303 ug beta-cryptoxanthin;
 up to 1127.193 IU vitamin A;
 up to 482.138 ug lycopene;
 up to 211.095 ug lutein plus zeaxanthin;
 up to 0.275 mg vitamin E, alpha-tocopherol;
 up to 0.004 mg beta-tocopherol;
 up to 0.047 mg gamma-tocopherol;
 up to 0.005 mg delta-tocopherol;
 up to 0.091 IU vitamin D;
 up to 9.157 ug vitamin K;
 or a combination thereof.

13. The method according to claim 10, wherein the fortifying amount of the at least one mineral in the fortifying composition comprises:
 up to 24.037 mg calcium;
 up to 0.585 mg iron;
 up to 19.926 mg magnesium;
 up to 45.126 mg phosphorus;
 up to 357.026 mg potassium;
 up to 10.638 mg sodium;
 up to 0.239 mg zinc;
 up to 0.083 mg copper;
 up to 0.159 mg manganese;
 up to 0.385 ug selenium;
 or combinations thereof.

14. The method according to claim 1, wherein fortifying step (f) is by mixing.

15. The method according to claim 1, wherein fortifying step (f) is by blending.

16. The method according to claim 1, wherein the fortifying composition to fortify 8 oz. of skim milk so that it provides the complete protein, vitamin, mineral, fiber, phytosterol and antioxidant nutrition present in one serving of fruits and vegetables comprises:
 2.50 g of fiber;
 10.441 mg of phytosterols;
 0.505 mg of iron;
 0.053 mg of copper;
 0.149 mg of manganese;
 25.900 mg of vitamin C (total ascorbic acid);
 0.649 mg of niacin;
 0.112 mg of vitamin B6;
 16.367 μg of food folate;
 583.825 μg of beta-carotene;
 134.415 μg of alpha-carotene;
 50.303 μg of beta-cryptoxanthin;
 627.693 IU of vitamin A;
 482.138 μg of lycopene;
 211.095 μg of lutein plus zeaxanthin;
 0.245 mg of vitamin E (alpha tocopherol);
 0.004 mg of beta-tocopherol;
 0.047 mg of gamma-tocopherol;
 0.005 mg of delta-tocopherol;
 9.157 μg of vitamin K; and
 1856 units of oxygen radical absorbance capacity.

17. The method according to claim 1, wherein when the base food is water, the fortifying amount of each nutrient in the fortifying composition comprises:
 1.52 g of protein;
 2.50 g of fiber;
 10.441 mg of phytosterols;
 24.037 mg of calcium;
 0.585 mg of iron;
 19.926 mg of magnesium;
 45.126 mg of phosphorus;
 357.026 mg of potassium;
 10.638 mg of sodium;
 0.239 mg of zinc;
 0.083 mg of copper;
 0.159 mg of manganese;
 0.385 μg of selenium;
 25.900 mg of vitamin C (total ascorbic acid);
 0.063 mg of thiamin;
 0.057 mg of riboflavin;
 0.879 mg of niacin;
 0.299 mg of pantothenic acid;
 0.202 mg of vitamin B6;
 28.567 μg of food folate;
 11.998 mg of choline;
 0.854 mg of betaine;
 56.496 μg of vitamin A;
 583.825 μg of beta-carotene;
 134.415 μg of alpha-carotene;
 50.303 μg of beta-cryptoxanthin;
 1127.193 IU of vitamin A;
 482.138 μg of lycopene;
 211.095 μg of lutein plus zeaxanthin;

0.275 mg of vitamin E (alpha-tocopherol);
0.004 mg of beta-tocopherol;
0.047 mg of gamma-tocopherol;
0.005 mg of delta-tocopherol;
0.091 IU of vitamin D;
9.157 µg of vitamin K; and
1856 units of oxygen radical absorbance capacity (ORAC).

* * * * *